US012087126B2

(12) United States Patent
Shigeta

(10) Patent No.: US 12,087,126 B2
(45) Date of Patent: Sep. 10, 2024

(54) GAME TOKEN MANAGEMENT SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 322 days.

(21) Appl. No.: 17/426,724

(22) PCT Filed: Dec. 4, 2019

(86) PCT No.: PCT/JP2019/047318
§ 371 (c)(1),
(2) Date: Jul. 29, 2021

(87) PCT Pub. No.: WO2020/158177
PCT Pub. Date: Aug. 6, 2020

(65) Prior Publication Data
US 2022/0198876 A1 Jun. 23, 2022

(30) Foreign Application Priority Data

Jan. 31, 2019 (JP) ................................ 2019-028885
Feb. 21, 2019 (JP) ................................ 2019-045249
(Continued)

(51) Int. Cl.
G07F 17/32 (2006.01)
G06K 7/10 (2006.01)
G06K 19/07 (2006.01)

(52) U.S. Cl.
CPC ....... G07F 17/322 (2013.01); G06K 7/10366 (2013.01); G06K 19/0723 (2013.01);
(Continued)

(58) Field of Classification Search
CPC .... G07F 17/322; G07F 17/32; G07F 17/3237; G07F 17/3248; G07F 17/3251; G06K 7/10336
See application file for complete search history.

(56) References Cited

U.S. PATENT DOCUMENTS 5,651,548 A 7/1997 French et al.
8,616,984 B2 * 12/2013 Mattice ..................... G07F 1/06
463/43
(Continued)

FOREIGN PATENT DOCUMENTS

JP 2008188137 A 8/2008
JP 2009018021 A 1/2009
(Continued)

OTHER PUBLICATIONS

International Search Report dated Dec. 3, 2019 issued in PCT Application PCT/JP2019/036789.
(Continued)

Primary Examiner — Steve Rowland
(74) Attorney, Agent, or Firm — NORTON ROSE FULBRIGHT US LLP

(57) ABSTRACT

A management system for game tokens includes a player identification device installed at a predetermined location in a casino facility to identify a player and thereby identify that the player is at the predetermined location, a database storing information on holders of game tokens, and a management device referring to the database to determine whether there is an anomaly in the holder information, wherein the management device determines whether or not there is an abnormality in the combination of the predetermined location where the player identified by the player identification device is located and the holder information stored in the database.

15 Claims, 56 Drawing Sheets

(30) Foreign Application Priority Data

May 20, 2019 (JP) ................................ 2019-106546
Aug. 2, 2019 (WO) .................. PCT/JP2019/030491

(52) U.S. Cl.
CPC ...... *G07F 17/3237* (2013.01); *G07F 17/3248* (2013.01); *G07F 17/3251* (2013.01)

(56) References Cited

U.S. PATENT DOCUMENTS

| | | | |
|---|---|---|---|
| 9,165,420 | B1 | 10/2015 | Knust et al. |
| 9,520,025 | B2 | 12/2016 | Koyama et al. |
| 11,043,069 | B2* | 6/2021 | Oberberger ......... G07F 17/3244 |
| 11,288,923 | B1 | 3/2022 | Shigeta |
| 2007/0194931 | A1 | 8/2007 | Miller et al. |
| 2008/0113772 | A1 | 5/2008 | Burrill et al. |
| 2008/0113783 | A1 | 5/2008 | Czyzewski et al. |
| 2008/0234052 | A1* | 9/2008 | Steil .................... G07F 17/3248 463/47 |
| 2009/0117967 | A1 | 5/2009 | Koyama |
| 2009/0131151 | A1 | 5/2009 | Harris et al. |
| 2010/0093429 | A1 | 4/2010 | Mattice et al. |
| 2010/0105486 | A1 | 4/2010 | Shigeta |
| 2010/0210355 | A1 | 8/2010 | Koyama et al. |
| 2011/0204565 | A1 | 8/2011 | Gelinotte et al. |
| 2014/0370960 | A1 | 12/2014 | Mosley et al. |
| 2016/0016071 | A1 | 1/2016 | Walker |
| 2018/0075690 | A1 | 3/2018 | Moore et al. |
| 2018/0114406 | A1 | 4/2018 | Shigeta |
| 2018/0144166 | A1* | 5/2018 | Shigeta .................. A44C 21/00 |
| 2018/0357850 | A1 | 12/2018 | Moore et al. |
| 2019/0073855 | A1 | 3/2019 | Moore et al. |
| 2019/0130700 | A1 | 5/2019 | Oguchi et al. |
| 2019/0005767 | A1 | 6/2019 | Shigeta |
| 2019/0172312 | A1 | 6/2019 | Shigeta |
| 2019/0259238 | A1 | 8/2019 | Shigeta |
| 2020/0097991 | A1* | 3/2020 | Pistilli ................... G06Q 50/34 |
| 2020/0193772 | A1 | 6/2020 | Shigeta |
| 2020/0349806 | A1* | 11/2020 | Shigeta ............... G07F 17/3244 |
| 2023/0306815 | A1* | 9/2023 | Lutnick .................. G07F 17/32 463/31 |

FOREIGN PATENT DOCUMENTS

| | | |
|---|---|---|
| JP | 2010187807 A | 9/2010 |
| JP | 5249555 B2 | 7/2013 |
| JP | 5294915 B2 | 9/2013 |
| JP | 2014085778 A | 5/2014 |
| JP | 2014184034 A | 10/2014 |
| JP | 6006383 B2 | 10/2016 |
| JP | 2017018501 A | 1/2017 |
| JP | 2017211971 A | 11/2017 |
| JP | 7244457 B2 | 3/2023 |
| KR | 1020100085534 A | 7/2010 |
| WO | 2008120749 A1 | 10/2008 |
| WO | 2018025885 A1 | 2/2018 |
| WO | 2018066111 A1 | 4/2018 |
| WO | 2019021820 A1 | 1/2019 |

OTHER PUBLICATIONS

International Search Report dated Feb. 10, 2020 issued in PCT Application PCT/JP2019/047318.
US Office Action dated Jul. 25, 2023 issued for U.S. Appl. No. 17/310,244.
Japanese Office Action dated Jan. 23, 2024 issued in JP application No. 2020-007499.
"UHF RFID Extended Memory Tag Application" by Takehiro Ito, published in Mitsubishi Denki Technical Report, vol. 84, No. 8, pp. 47-50, on Aug. 25, 2010 (Submitting with English translation of Abstract).
Japanese Office Action dated Jan. 30, 2024 issued in JP application No. 2023-036389.
US Office Action dated Oct. 23, 2023 issued in U.S. Appl. No. 17/425,491.
Japanese Office Action dated Dec. 5, 2023 issued in JP Application 2020-027646.
Korean Office Action dated Apr. 12, 2024 issued in KR application No. 10-2021-7026281.

* cited by examiner

17

| ID NUMBER | CASINO NAME | TYPE | FACE VALUE | LOCATION INFORMATION HISTORY |
|---|---|---|---|---|
| ⋮ | ⋮ | ⋮ | ⋮ | ⋮ |
| apxx7216-3319 | ABC Casino | ROLLING CHIP FOR VIP | $500 | ○→○→⋯→○→○ |
| apxx7216-3320 | ABC Casino | ROLLING CHIP FOR VIP | $1,000 | ○→○→⋯→○→○ |
| apxx7216-3321 | ABC Casino | ROLLING CHIP FOR VIP | $1,000 | ○→○→⋯→○→○ |
| ⋮ | ⋮ | ⋮ | ⋮ | ⋮ |

FIG.8

| CHIP READING RESULT AT BETTING AREA | | | | |
|---|---|---|---|---|
| PLACE AND ID OF BET CHIP | ONE PIECE ON BANKER (ID3) | TWO PIECES ON BANKER (ID12 AND 13)<br>TWO PIECES ON BANKER PAIR (ID6 AND 18) | TWO PIECES ON PLAYER (ID29 AND 54) | ONE PIECE ON BANKER (ID97)<br>ONE PIECE ON PLAYER PAIR (ID68)<br>ONE PIECE ON BANKER<br>ONE PIECE ON PLAYER PAIR |
| READING RESULT BY CAMERA | ONE PIECE ON BANKER | TWO PIECE ON BANKER | TWO PIECES ON PLAYER | ONE PIECE ON BANKER PAIR (ID75)<br>ONE PIECE ON PLAYER PAIR (ID77) |
| READING RESULT BY RFID (READ ID) | ID3 | ID6, 12, 13, 18 | ID29, 54 | NONE |
| | | | | NONE |
| | | | | ID68, 97 |
| SITTING NUMBER | 6 | 5 | 3 | 2 |
| | | | | 1 |

| GAME RESULT DETERMINED BY GAME RESULT DETERMINATION DEVICE | BANKER WINS |
|---|---|
| ID THAT CHIP TRAY DETERMINATION DEVICE DETERMINES BEING INCREASED FROM BEFORE COLLECTION TO AFTER COLLECTION | ID6, 18, 29, 54, 68, 75, 77 |

FIG.12

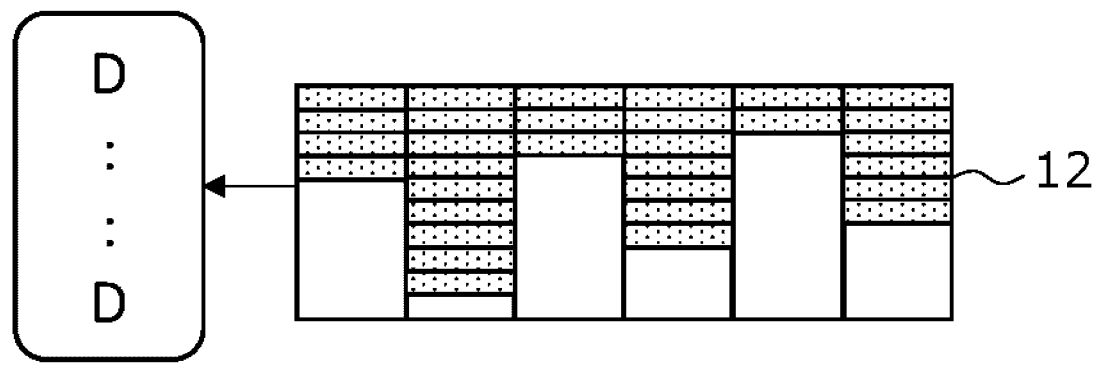
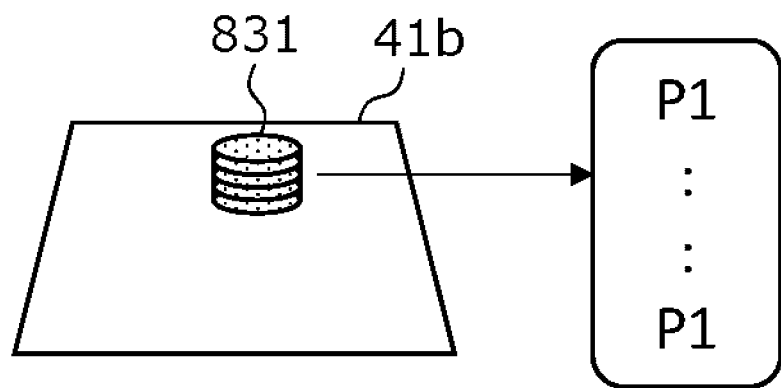
FIG.24

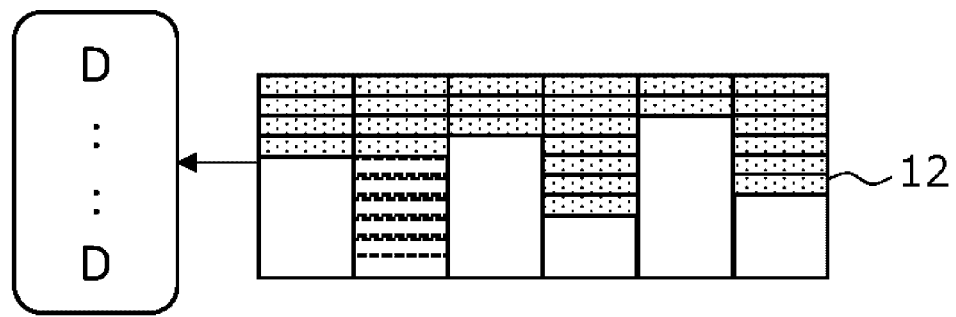
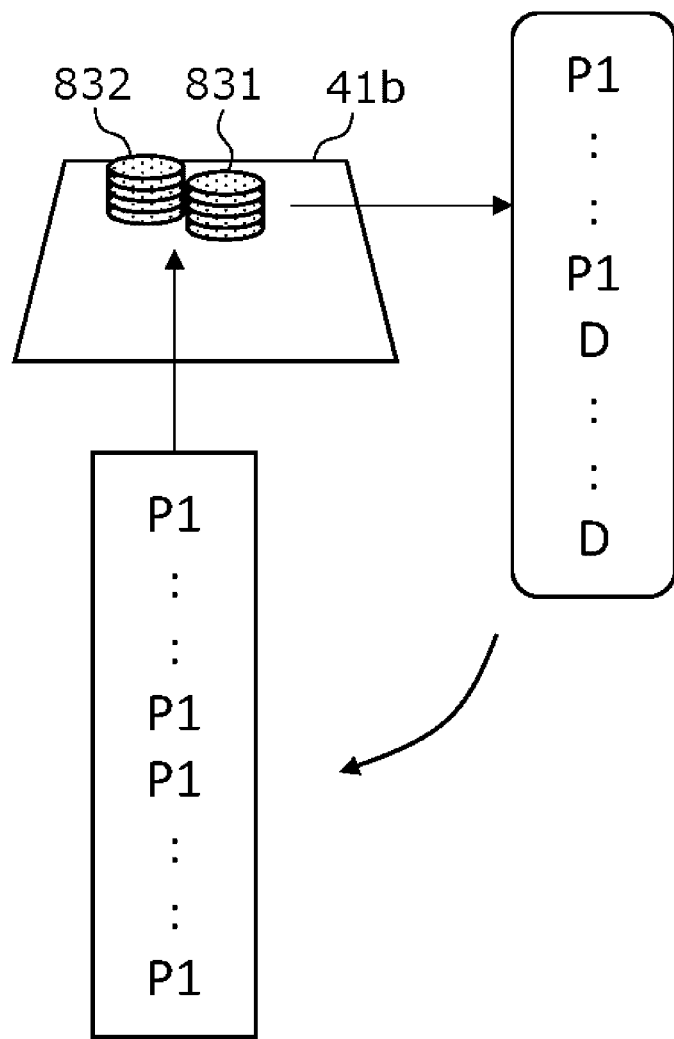
FIG.25

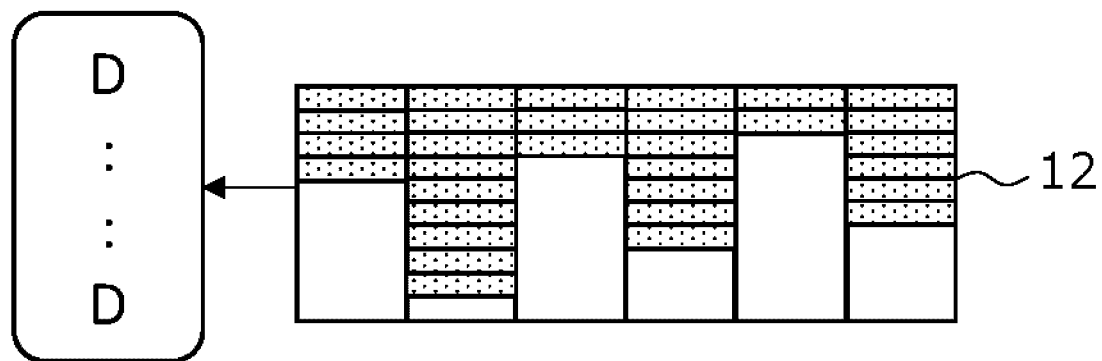
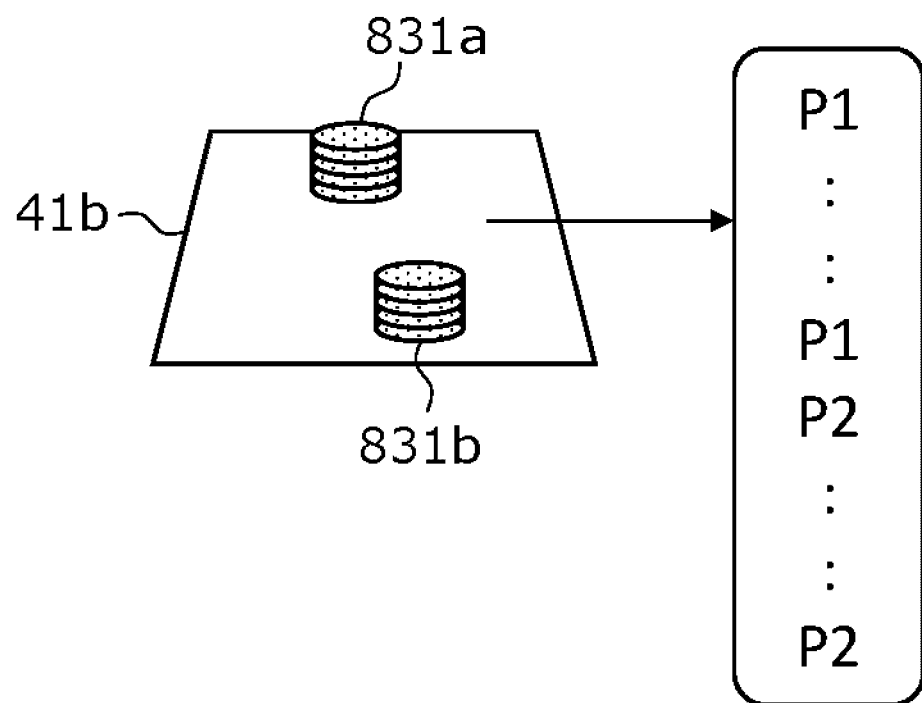
FIG.35

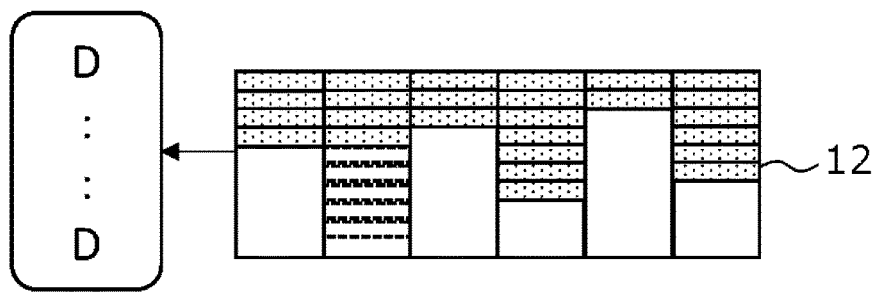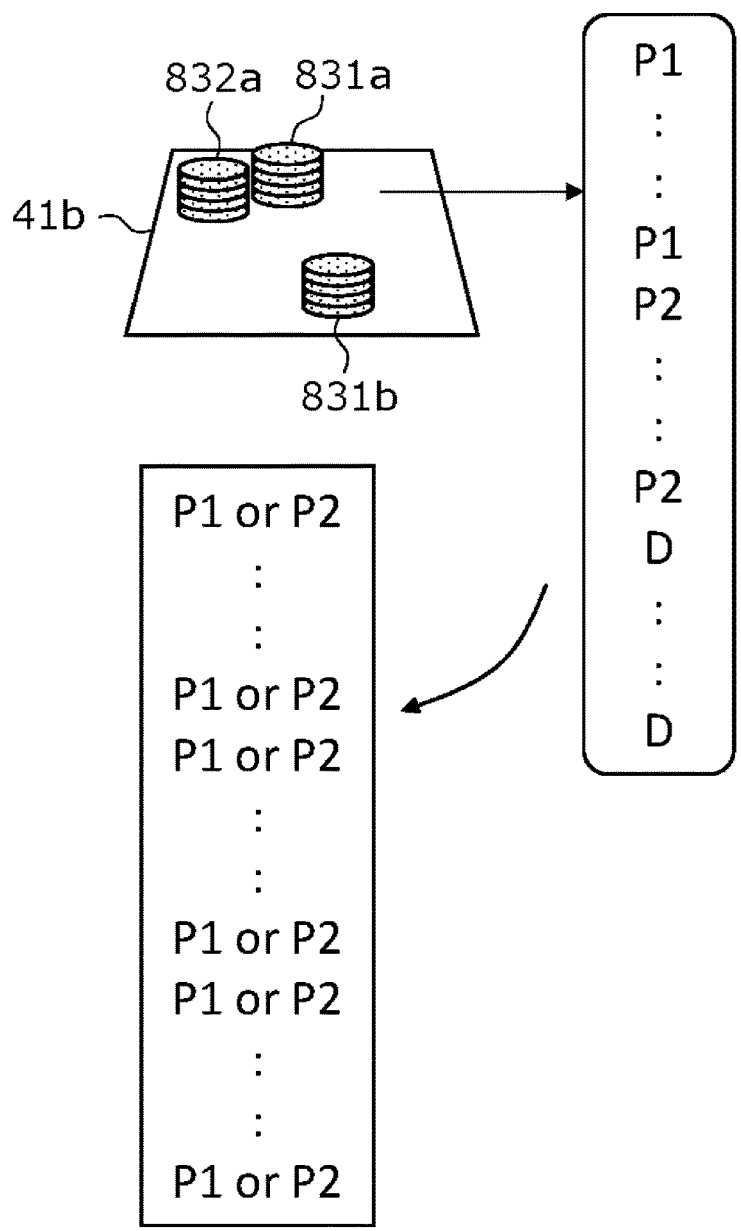
FIG.36

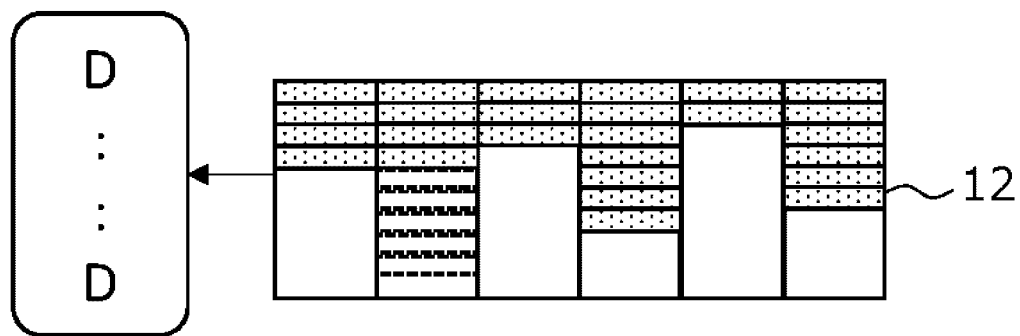
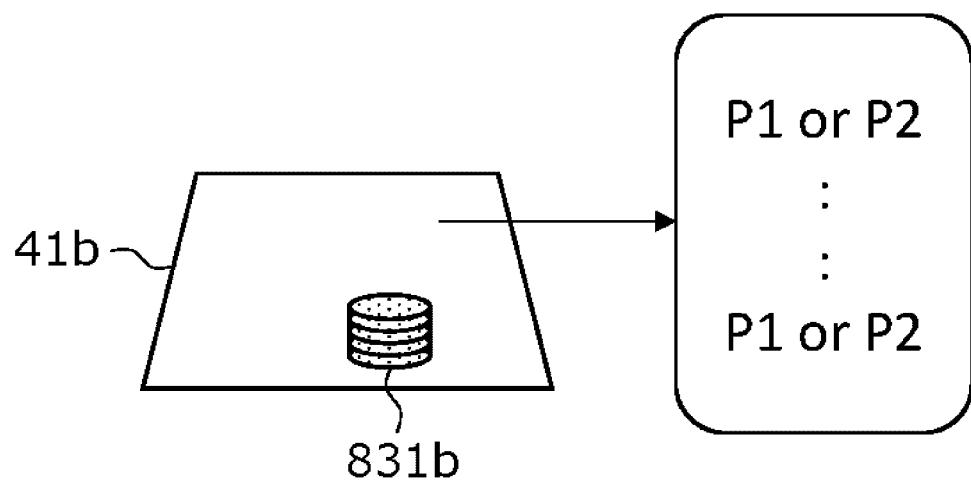
FIG.37

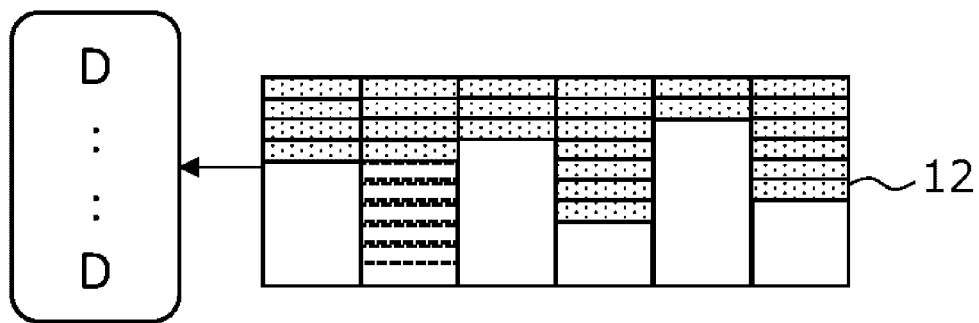
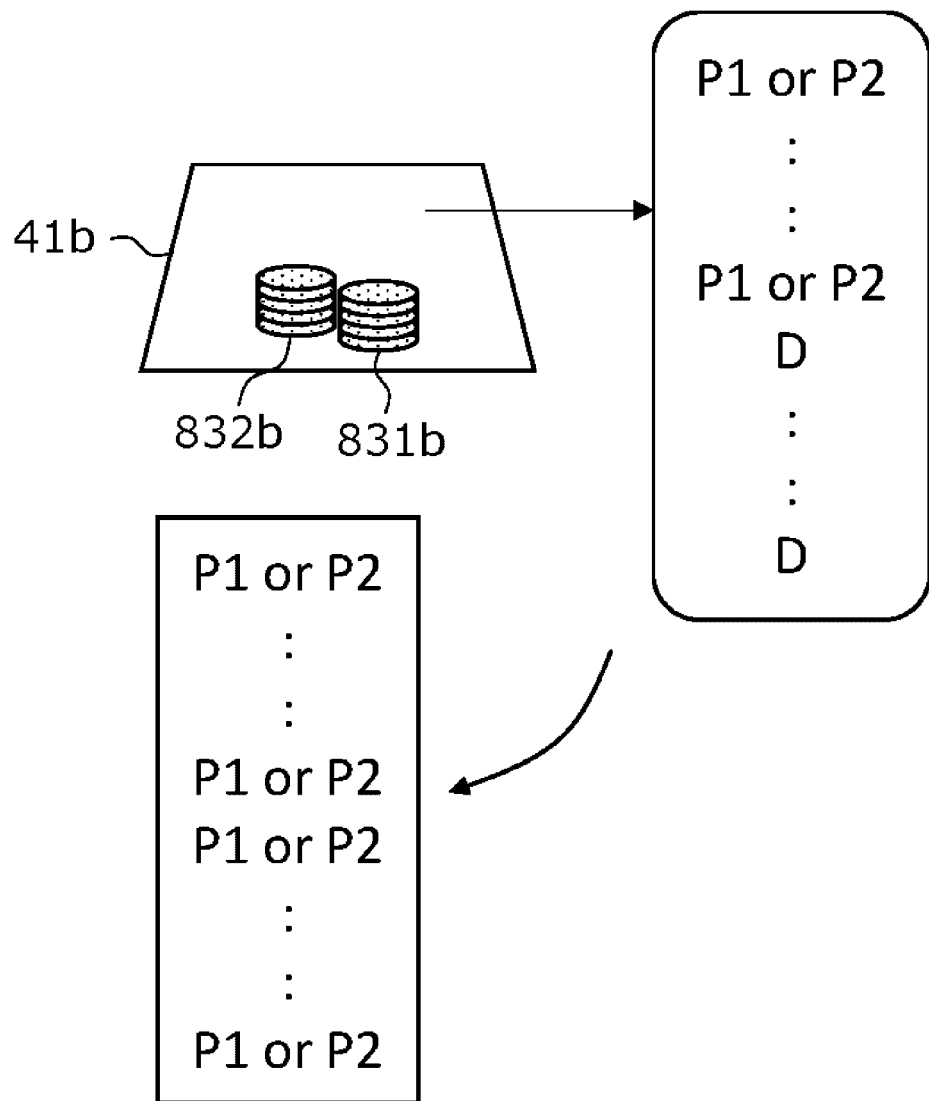
FIG.38

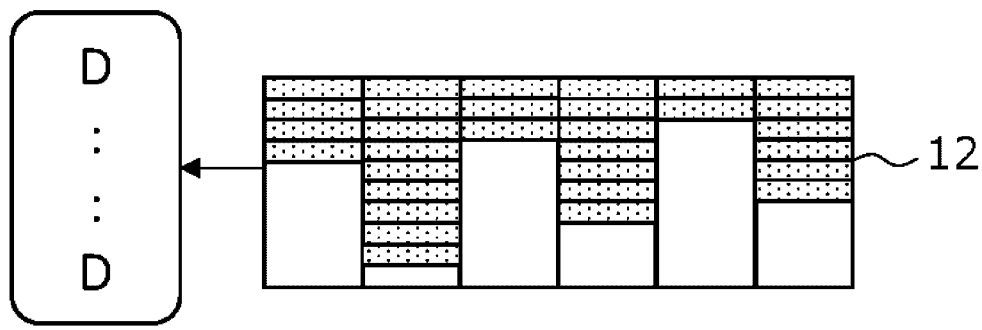
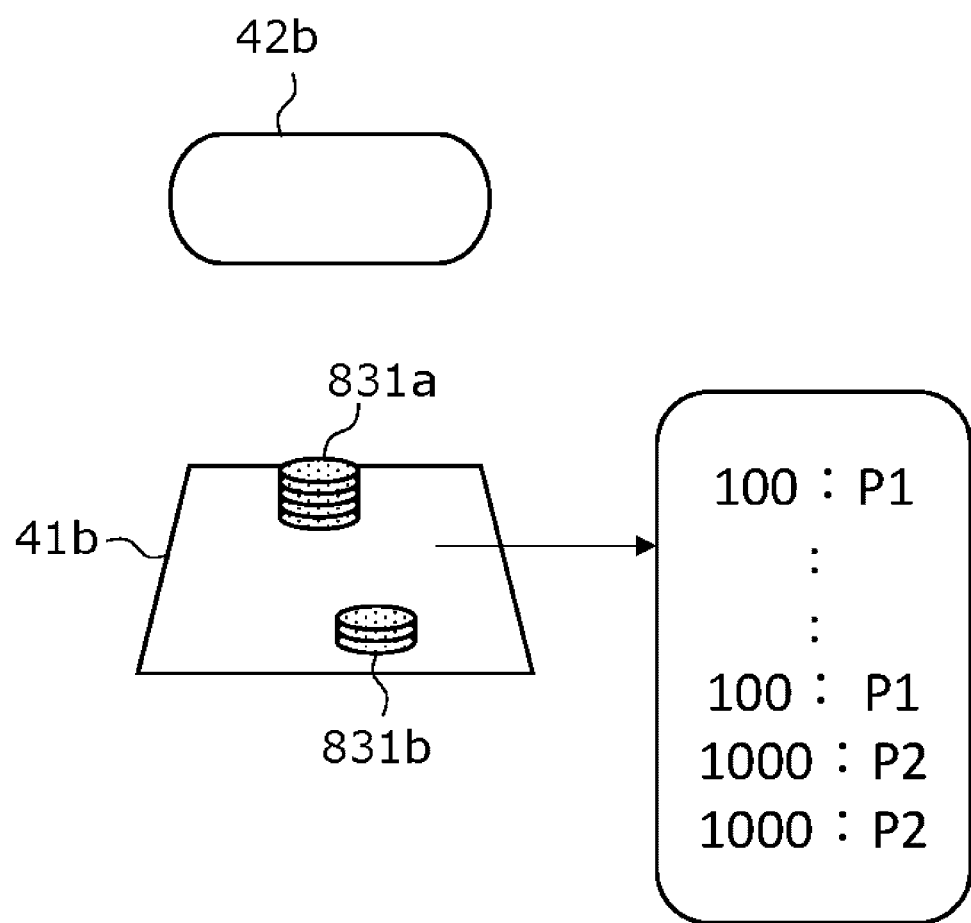
FIG.47

GAME TOKEN MANAGEMENT SYSTEM

CROSS-REFERENCE TO RELATED APPLICATIONS

This application is a national phase application under 35 U.S.C. § 371 of International Pat. App. No. PCT/JP2019/047318 filed Dec. 4, 2019, which claims priority to JP Pat. App. No. 2019-028885 filed Jan. 31, 2019, JP Pat. App. No. 2019-045249 filed Feb. 21, 2019, JP Pat. App. No. 2019-106546 filed May 20, 2019, and International Pat. App. No. PCT/JP2019/030491 filed Aug. 2, 2019, the entire contents of each disclosure is specifically incorporated by reference herein without disclaimer.

FIELD

The present invention relates to a system for managing game tokens in a casino facility.

BACKGROUND

In facilities that provide games using game tables (typically casinos), players are required to register as members and are issued a member's card. The member's card stores member information (typically, member ID) that identifies the registered member. When a player, who is a member, plays a game at a game table, he hands the member's card to an operator (typically a dealer of the game table or a pit manager who manages multiple game tables including the game table). The operator reads the member's card with a card scanner. A management device connected to the card scanner identifies the member and stores a member's playing status (e.g., number of games played, results of wins and losses, amount of bets, balance of payments, incentive points, etc.) in a storage device in association with the member information.

The member actively provides his or her member's card to the operator prior to play, motivated by the benefits obtained by the incentive points. The game provider can use the information on the members' playing status for marketing purposes instead of providing the members with benefits, and also enjoys the advantage of being able to use the information for detecting cheating.

In a casino facility, it is desirable to properly manage the game tokens possessed by players.

The present invention aims to provide a management system that can manage the game token held by players.

SUMMARY OF THE INVENTION

A management system in one aspect of the present invention determines an abnormality in holder information by referring to a database in which the holder information is stored. The management system is a management system for game token, and comprises a database configured to store the holder information of the game token; and a management device configured to determine whether or not there is an abnormality in the holder information by referring to the database.

The above management system may determine an abnormality in a combination of a location of the player and the holder information. That is, the above management system may further comprise a player identification device installed at a predetermined location of a casino facility to identify a player and thereby identify that the player is at the predetermined location, and the management device may determine whether or not there is an abnormality in the combination of the predetermined location where the player is and the holder information stored in the database.

The above management system may determine whether a carry-out rule and/or a carry-in rule is followed at the gate. That is, in the management system described above, the player identification device may be installed at a gate of the casino facility and may be configured to identify the player as being at the gate as the location, and the management device may be configured to determine whether or not there is the abnormality in accordance with a rule for taking out and/or a rule for carrying in the game token in the casino facility.

The above management system may be used when take-out is prohibited. That is, in the management system described above, the management device may be configured to determine that there is an abnormality when the player identified as being at the gate is stored in the database as the holder of the game token.

The above management system may be used in cases where a take-out limit is set. That is, in the management system described above, the database may be further configured to store information on amount of the game token, and the management device may be configured to refer to the database to identify the amount of the game token possessed by the player identified by the player identification device and determine the abnormality according to the identified amount.

The above management system may determine an abnormality by comparing a declared amount with the amount in the database. That is, in the management system described above, the management device may be configured to compare the amount of the game token declared by the player identified by the player identification device with the amount identified by referring to the database and determine the abnormality based on the result of the comparison.

The above management system may determine that there is an abnormality when the holder of the database and the actual holder differ. That is, in the management system described above, the game token may have readable identification information, the database may store the holder information of the game token and the identification information in association with each other, the management system further may comprise: a player identification device configured to identify a player; and a reading device configured to read the identification information of the game token possessed by the player identified by the player identification device, and the management device may be configured to determine that there is an abnormality when the player identified by the player identification device and the identification information read by the reader are not associated in the database.

The above management system may determine an abnormality based on the possession time. In other words, in the management system described above, the database may be configured to store, as information on the holder, possession time information indicating a time at which the holder acquired the game token or the time at which the holder is in possession of the game token, and the management device may be configured to determine whether or not there is an abnormality in the possession time information.

The above management system may determine that there is an abnormality when the possession time is too long. In other words, in the above management system, the management device may be configured to determine that there is an abnormality when a consecutive possession time of the same holder obtained by the possession time information exceeds a predetermined threshold.

The above management system may determine an abnormality in a history of a holder. That is, in the management system described above, the database may be configured to store a history of the holder as the information of the holder, and the management device may be configured to determine an abnormality of the history of the holder.

The above management system may determine that there is an abnormality when the number of cards held by the same holder is too large. In other words, in the management system described above, the management device may be configured to determine that there is an abnormality when the number of game tokens possessed by the same holder exceeds a predetermined threshold.

A management system in one aspect of the present invention is a management system for a facility that provides games using a game table having play positions, the management system comprising: a member's card having a built-in card RFID tag that stores member information; and a card RFID reader installed at the play position of the game table and is configured to read the member information from the card RFID tag.

With this configuration, the member information stored on the member's card is read at the playing position, so the member does not need to hand the member's card to the dealer, the dealer does not need to perform any operation on the member's card, and the management system knows which member arrived at which playing position.

The above management system may further comprise: a chip determination device configured to determine chip identification information of a payout chip to be paid out to the play position; a storage medium configured to store the member information and the chip identification information of the chips owned by the members corresponding to the member information in association with each other; and a control device configured to store in the storage medium the member information read at the play position and the chip identification information of the chips to be paid out that are determined at the play position in association with each other.

With this configuration, it is possible to store which member the payout chips were paid out to, so it is possible to know which player has which chip.

The above management system may further comprise: a chip determination device configured to determine value of the chips to be paid out to the play position; a storage medium configured to store the member information and the value of the chips owned by the member corresponding to the member information in association with each other; and a control device configured to store in the storage medium the member information read at the play position and the value of the chips to be paid out as determined at the play position in association with each other.

With this configuration, it is possible to store which members have been paid out chips of what amount of value, so it is possible to understand the value of the chips held by the members.

The above management system may further comprise: a storage medium configured to store the member information and a bet amount corresponding to the member information in association with each other; a chip determination device configured to determine chip identification information of betting chips bet in the play position; a database configured to store a correspondence between the chip identification information and the value of the betting chips; and a control device configured to refer to the database to determine the value corresponding to the chip identification information determined at the play position and update the bet amount associated with the member information stored in the storage medium for the member information read at the play position based on the value.

With this configuration, it is possible to store which members bet how much amount. This bet amount can be used, for example, as an incentive point for that member.

The above management system may further comprise: a storage medium configured to store the member information and bet amount associated with the member information; a chip determination device configured to determine value of betting chips bet in the play position; and a control device configured to update the bet amount associated with the member information stored in the storage medium for the member information read at the play position based on the value of the bet chips determined at the play position.

With this configuration also, it is possible to store which members bet how much amount. This bet amount can be used, for example, as an incentive point for that member.

The above management system may further comprise: a chip determination device configured to determine the chip identification information of a reserve chip that has not been bet in the play position; a storage medium configured to store the member information and the chip identification information of the chips owned by the member corresponding to the member information in association with each other; and a control device configured to store in the storage medium the member information read at the play position and the chip identification information of the reserve chip determined at the play position in association with each other.

With this configuration, even if a member is not stored or definitively stored as the holder of a reserve chip held by a member, by placing such a reserve chip in the playing position, the member information of the member can be associated as the holder of the chip. In addition, any discrepancies in the holder can be detected, and fraud can be detected by recording such discrepancies.

The above management system may further comprise: a chip determination device configured to determine value of a reserve chip that has not been bet in a play position; a storage medium configured to store the member information in correspondence with the value of the chip owned by the member corresponding to the member information; and a control device configured to store in the storage medium the member information read at the play position and the value of the reserve chip determined at the play position in association with each other.

With this configuration also, even if a member is not stored or definitively stored as the holder of a reserve chip held by a member, by placing such a reserve chip in the playing position, the member information of the member can be associated as the holder of the chip. In addition, any discrepancies in the holder can be detected, and fraud can be detected by recording such discrepancies.

In the above management system, the chip identification information of the chip may be stored in a chip RFID tag embedded in the chip, and the chip determination device and the card RFID reader may be the same device, which is configured to read the chip RFID tag and the card RFID tag.

With this configuration, a device for reading betting chips can be used to read members' cards.

In the above management system, the value of the chip may be stored in a chip RFID tag embedded in the chip, and the chip determination device and the card RFID reader may be the same device, which is configured to read the chip RFID tag and the card RFID tag.

With this configuration also, a device for reading betting chips can be used to read members' cards.

In the above management system, the control device may be configured to, when a plurality of the member information is read from a plurality of the member cards simultaneously by the card RFID reader, store in the storage medium the plurality of read member information the chip identification information in association with each other.

With this configuration, when there is more than one member information to be associated with chip identification information, it can be associated with the chip identification information concerned.

In the above management system, the storage medium may be provided in the chip, the member's card, or a database that can communicate with the card RFID reader and the chip determination device.

In the above management system, the card RFID reader for a sitting player and the card RFID reader for a back betting player may be provided in the play position.

With this configuration, it is possible to know the member information about back betting players as well.

In the above management system, the member's card may include a regular member's card in which member information unique to a registered member is stored in the card RFID tag, and a non-regular member's card in which temporary member information is stored in the card RFID tag.

With this configuration, a non-regular player who has not registered as members can be managed using the members' card.

In the above management system, a plurality of the non-regular members' cards may have different temporary member information stored in the card RFID tags.

With this configuration, it is possible to manage the chips owned by a player even if the player is a non-regular member.

In the above management system, the game table may have a plurality of the play positions, and the card RFID reader may be provided in each of the plurality of play positions.

With this configuration, it is possible to identify a member for each play position even if the game table has a plurality of the play position.

According to the present invention, since the member information stored in the member's card is read at the playing position, the player does not need to hand the member's card to the dealer, and the dealer does not need to perform any operation on the member's card, and the management system can know which player has arrived at which playing position.

BRIEF DESCRIPTION OF THE DRAWINGS

FIG. 8 is a diagram of a database according to the other second embodiment.

FIG. 12 is a diagram of a state of game tokens bet at the game table according to the embodiment.

FIG. 24 illustrates an example of updating the variation information according to the first example of the fourth embodiment.

FIG. 25 illustrates an example of updating the variation information according to the first example of the fourth embodiment.

FIG. 35 shows an example of updating the variation information according to the sixth example of the fourth embodiment.

FIG. 36 shows an example of updating the variation information according to the sixth example of the fourth embodiment.

FIG. 37 shows an example of updating the variation information according to the sixth example of the fourth embodiment.

FIG. 38 shows an example of updating the variation information according to the sixth example of the fourth embodiment.

FIG. 47 shows an example of updating the variation information according to the ninth example of the fourth embodiment.

DETAILED DESCRIPTION OF NON-LIMITING EXAMPLE EMBODIMENTS

Figure 1:
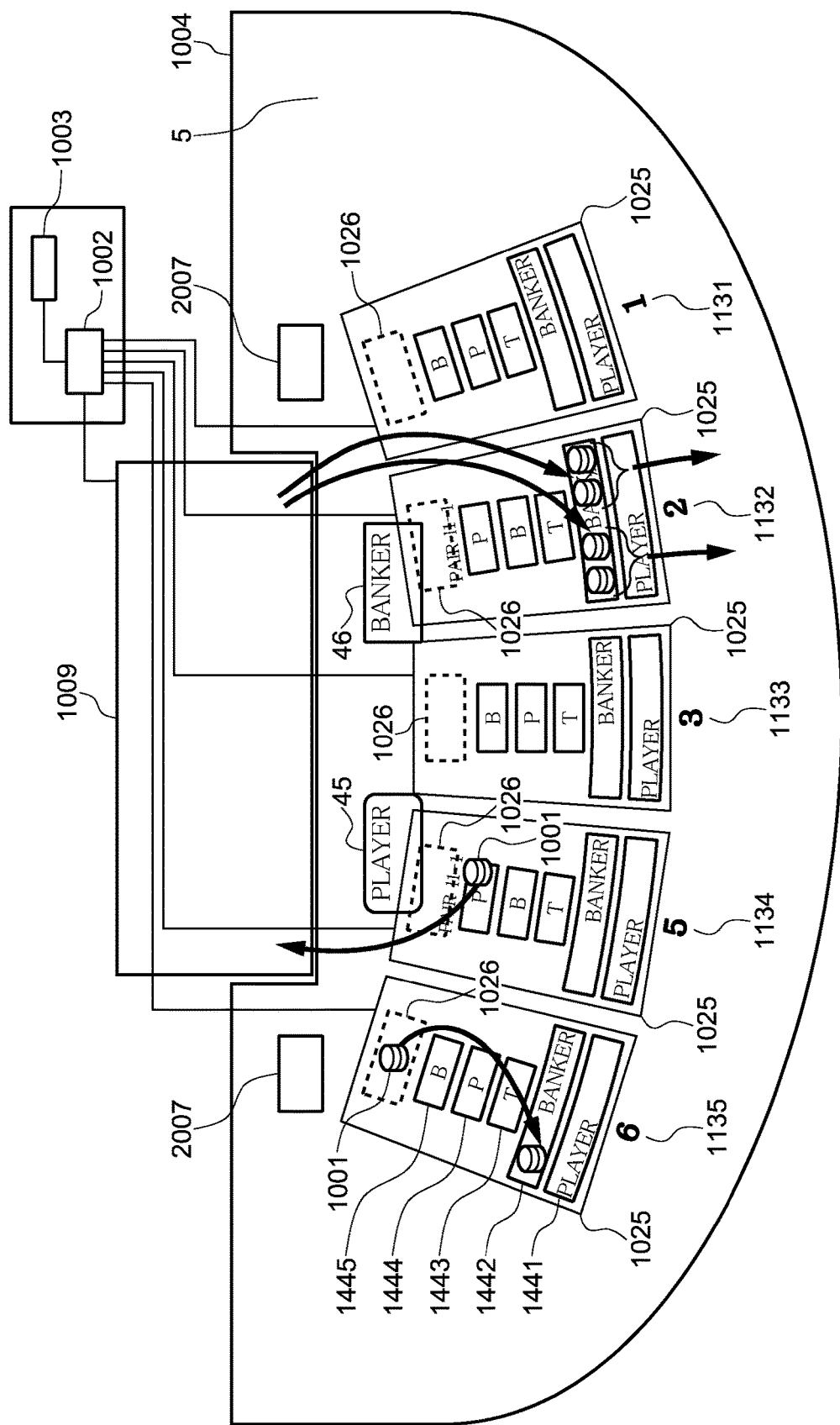
FIG. 1 is a diagram of an overall overview of a table game management system according to an embodiment.

An overall overview of a table game management system according to a first embodiment will be described with reference to FIG. 1. FIG. 1 is a diagram of an overall overview of the table game management system. A game table 1004 for a baccarat game includes betting areas including player 1441, banker 1442, tie 1443, player pair 1444, and banker pair 1445 for each of player positions 1131 to 1135. Each of the player positions is provided with a chip placement area 1025. The table game management system further includes a chip reader 1002 that reads RFID of game tokens 1001 placed on the chip placement areas.

Each of the chip placement areas 1025 includes a payment area 1026 on which a dealer places a game token 1001 removed from a chip tray 1009 of the game table 1004 when the dealer pays the game token 1001 out of the chip tray 1009 to a winning player.

Further, the table game management system includes a controller 1003 that determines a result of reading RFID of the game token 1001 read by the chip reader 1002.

First, a player who participates in a game bets a game token 1001 on a betting area in the chip placement area 1025. By the chip reader 1002 reading RFID of the bet game token 1001, the controller 1003 determines owner information of the game token 1001. The owner information is associated with ID information of the RFID in a database.

In a case where a casino wins based on a result of the game, the dealer collects a game token 1001 bet by a losing player and places the game token 1001 in the chip tray 1009. The chip reader 1002 determines RFIDs of game tokens 1001 in the chip tray 1009, and the controller 1003 records in the database that the game token 1001 collected by the casino is owned by the casino.

If a player wins based on the result of the game, the dealer pays a game token 1001 in an amount corresponding to an amount of a bet chip out of a chip tray to the winning player according to a rule of the game.

At a time of payout, a payout chip may be placed on the above-described payment area 1026 or on a chip placement area 1025 other than the payment area.

Figure 2:
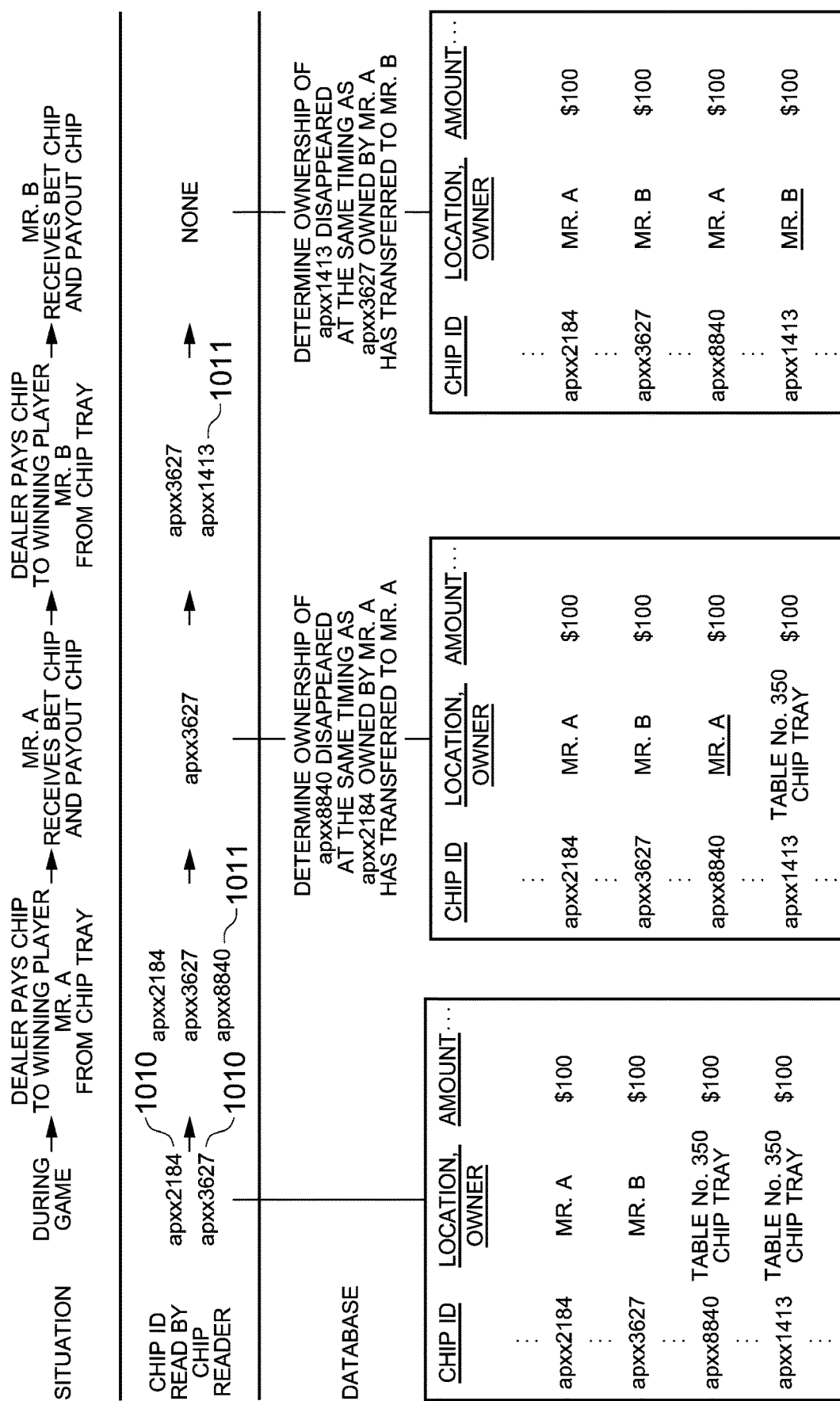
FIG. 2 is a diagram of an overview of a database according to the embodiment.

Here, a method for recording owner information of the payout chip will be described with reference to FIG. 2. FIG. 2 illustrates a method for recording owner information of the game token 1001 when the chip is paid to the winning player.

In a case where a plurality of players place bet chips, and there are two or more stacks of the bet chips in the same player position, the chip reader 1002 collectively reads the game tokens 1001 placed on the chip placement area 1025. Thus, during a game, the chip reader 1002 acquires an ID 1010 of the bet game tokens without determining which game token 1001 belongs to which player. When payment is to be made to a winning player after determination of a win/loss result of the game, the dealer pays out to each winning player (for each stack) from the chip tray 1009. A game token 1001 removed from the chip tray 1009 is placed on a chip placement area 1025. The chip reader 1002 reads an ID 1011 of the payout chip placed on the chip placement area 1025.

The winning player receives the paid out game token 1001 together with the originally bet game token 1001. At this time, because the bet chip and the payout chip transfer outside the chip placement area 1025, an ID of the bet chip and an ID of the payout chip disappear from the reading result by the chip reader 1002. With this arrangement, the controller 1003 determines to which player the payout chip has been paid by associating with the owner information of the bet chip.

The controller 1003 stores the determined owner information of the payout chip in the database by associating the owner information with the ID of the game token.

The above-described arrangement enables traceability of the owner of the game token 1001 and, in a case of wrong transfer of the game token 1001, detection of the owner information stored in the database being different from information of an actual owner.

Note that the actual owner can be identified by using face authentication technology or an ID of a membership card.

In the above description, an ID of each game token is managed in a database. However, the game token 1001 itself may store owner information.

In addition to the above-described case where a payment area 1026 is provided to each player position, a payment area may be provided separately from the player positions, and the chip reader 1002 may perform reading independently.

Use or non-use of the payment area 1026 may be selected depending on reading performance of the chip reader 1002.

The table game management system may be able to use information mutually with an RFID reader that reads chips in the chip tray 1009 by RFID, a camera that reads a bet chip, a win/loss result determination device such as a shoe that determines a win/loss result of a game, or other device, which is connected to the table game management system.

Figure 3:
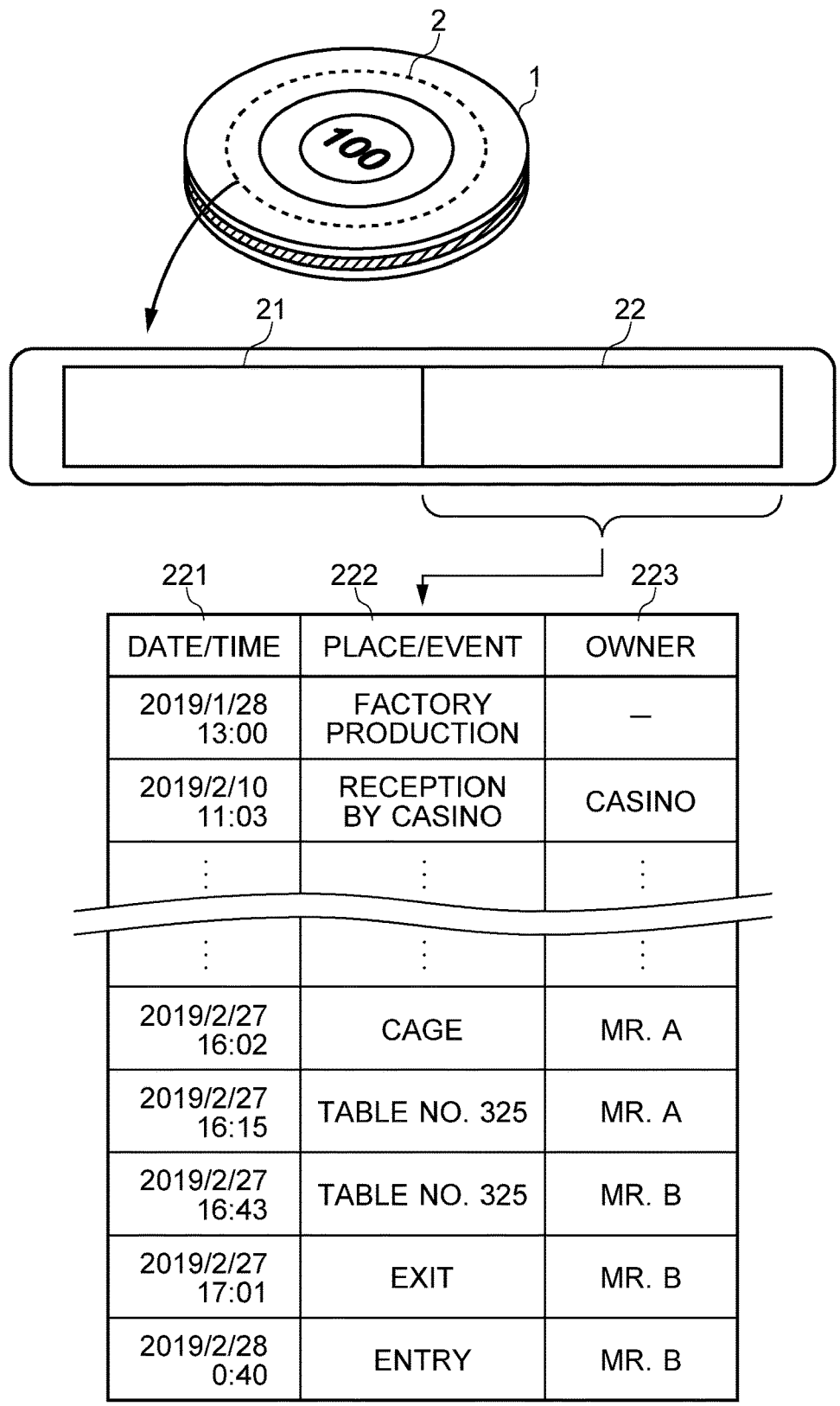
FIG. 3 is an explanatory diagram of an RFID tag included in a game token according to a second embodiment.

First, a game token used in a game token management system according to an embodiment will be described. FIG. 3 illustrates a game token 1 used in the game token management system. In FIG. 3, an RFID tag 2 capable of storing various pieces of information is embedded in the game token 1. The RFID tag 2 has a data non-rewritable area 21 and a data rewritable area 22.

The data non-rewritable area 21 stores, as fixed information 3, information that is not to be changed, that does not change, or that must not be changed while the game token 1 is used. Specifically, the data non-rewritable area 21 stores, as the fixed information 3, production information, product information, casino information, amount information, a serial number, or the like of the game token 1. The production information includes date and time when the game token was manufactured, manufacturing machine used for manufacturing the game token, or other information. The product information includes, for example, information indicating that the game token is a chip for a VIP area of a casino and information indicating a type of the chip (for example, rolling chip or cash chip).

The data non-rewritable area 21 may be a functionally non-writable area due to a specification of the RFID tag, or may be a writable area locked to disable writing of data after necessary information is written.

The data rewritable area 22 stores, as variable information 4, information that changes while the game token 1 is used. For example, as illustrated in FIG. 3, the data rewritable area 22 stores, as the variable information 4, location information 220 including date/time information 221, place/event information 222, owner information 223, or other information.

The fixed information 3 and the variable information 4 may be encrypted in order to prevent wrong reading or writing of information by another person. Further, the fixed information 3 and the variable information 4 may be stored as metadata.

Figure 4:
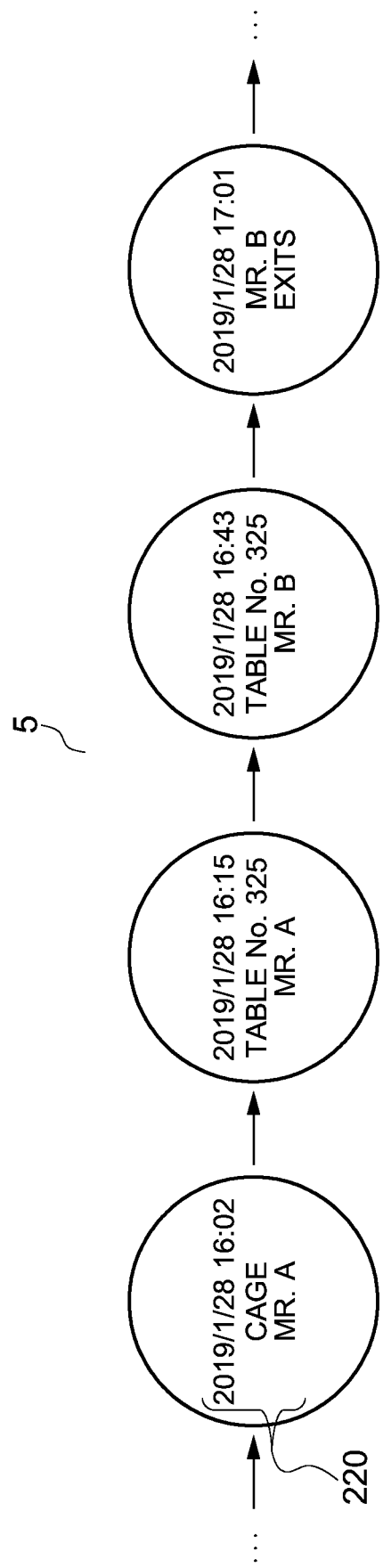
FIG. 4 is a conceptual diagram of a method for recording data of a game token according to the second embodiment.

FIG. 4 illustrates an example of a method for recording data of the variable information 4 of the game token 1. As illustrated in FIG. 4, the location information 220 including date/time information 221, place/event information 222, and owner information 223 is set as a block. Then, blocks of the location information 220 are connected in a chain so that history of the location information 220 of the game token 1 can be determined.

FIG. 4 illustrates an example of the variable information 4 stored in the game token 1, and transference of the game token 1 as described below can be determined. At 16:02 on Jan. 28, 2019, Mr. A exchanges cash and a game token 1 at a cage 5. At 16:15 on the same day, Mr. A makes a bet at table No. 325 by using the game token 1. At 16:43 on the same day, Mr. B receives the game token 1 as a redemption for having won a bet at table No. 325. At 17:01 on the same day, Mr. B exits a casino, carrying the game token 1.

The variable information 4 may be configured to store only latest location information or store all written location information. Further, some of a plurality of pieces of location information may be selected and stored as illustrated in FIG. 4. In a case where some pieces of the location information 220 are selected and stored among all of the location information, a plurality of pieces of the location information including at least the latest location information 220 may be stored. With the above configuration, history of use or transference of a certain game token 1 is known from variable information 4 of the game token 1. That is, traceability information of the game token 1 is written in the game token 1 itself to be determined.

Figure 5:
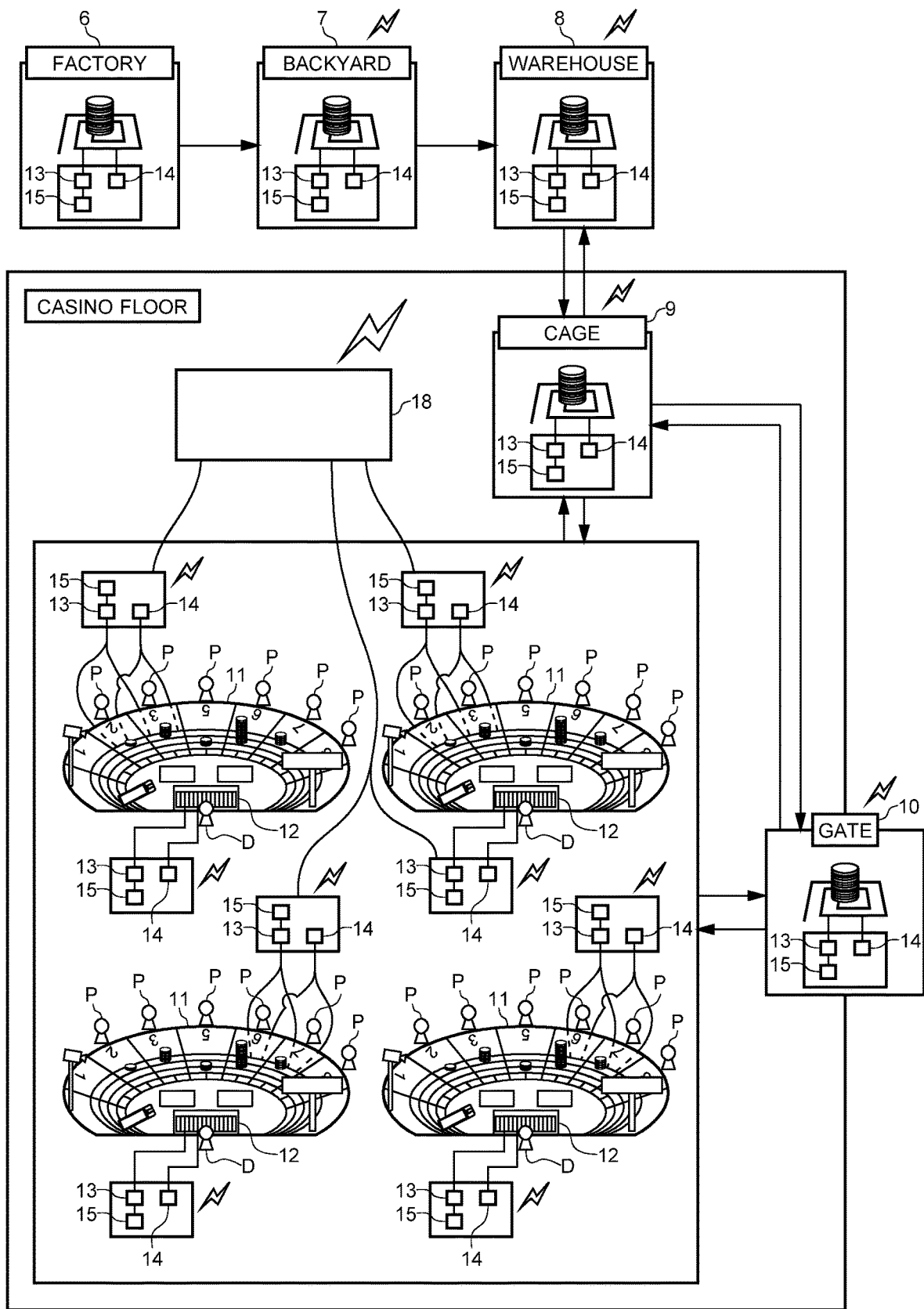
FIG. 5 is a diagram of an overall overview of a game token management system according to the second embodiment.

Next, a management system for the game token 1 of the present embodiment will be described. FIG. 5 illustrates an overall overview of the management system.

First, at a factory 6, a writer 14 writes, in the data rewritable area 22 of the RFID tag 2 of the game token 1, the variable information 4 including information of manufacturing completion or factory shipment as location information 220.

The game token 1 shipped from the factory 6 is subjected to a receiving process in a backyard 7 of the casino. In the backyard 7, a reader 13 reads the variable information 4 stored in the data rewritable area 22 of the game token 1. Then, on the basis of the reading result, a management controller 15 determines whether or not the location information 220 indicating that the information has been written at the factory 6, which is expected to be written, is actually written as latest variable information 4. If there is no record of writing at the factory 6, an error signal is generated indicating that the game token is possibly being wrong. This allows the casino to refuse to receive the game token or to request a factory to conduct investigation. If there is no problem in record of writing, in the data rewritable area 22 of the RFID tag 2, the writer 14 writes location information 220 indicating a backyard. At a time of writing, the location information indicating the backyard may be written either in addition to the location information indicating the factory or after deleting the location information indicating the factory. Further, reading and writing of the game token in the backyard 7 described above can be performed together with usual validation or activation of the game token.

The game token 1 of which receiving inspection has been completed in the backyard 7 is carried to a warehouse 8 or cage 9 of the casino. In the warehouse 8 or the cage 9, the reader 13 reads the variable information 4 stored in the data rewritable area 22 of the game token 1. Then, on the basis of a reading result, a management controller 15 determines whether or not the location information 220 indicating that the information has been written at the backyard 7, which is expected to be written, is actually written as latest variable information 4. Further, it may be also inspected whether information indicating the factory 6 is written in history of the variable information 4. The management controller 15 determines whether or not any abnormality is present in the history of the location information, similarly to the above-described inspection in the backyard 7. If there is no problem in a reading result, the writer 14 writes, in the data rewritable area 22, location information 220 indicating the warehouse 8 or the cage 9.

A player purchases the game token 1 at the cage 9. When the player purchases the game token 1, a writer 14 at the cage 9 writes, as the variable information 4, time at which the game token is purchased and information indicating change of the owner of the game token from the casino to a customer. The player may be identified and recorded by face authentication technology or an ID card such as a membership card of the casino or an official ID card.

The player makes a bet by placing the purchased game token 1 on a betting area 11 at a game table. From the RFID tag 2 of the bet game token 1, a reader 13 reads the location information 220 including date/time information 221, place/event information 222, and owner information 223. The management controller 15 determines whether or not any abnormality is present. It can be determined that abnormality is present, for example, in a case where a certain period has passed since last written date and time of information of use at a game table or information of cashing in at a cage, or in a case where the owner information 223 stored in the game token 1 and the owner information 223 identified by face authentication or an ID card are different from each other.

If there is no problem in a reading result, the writer 14 adds the location information 220 to the data rewritable area 22 of the bet game token 1. The location information 220 includes date/time information 221, place/event information 222, and owner information 223. At the table, for example, the writer 14 writes variable information 4 including information of a player position number where the game token 1 is placed and information of the player. The player information may be identified by an ID card or face authentication. Usually, a plurality of game tokens 1 are stacked and placed on the betting area 11, and therefore writing is performed collectively for the stacked game tokens 1.

When the player takes the game token 1 out of a casino floor, exit processing is performed at a gate 10. At a time of exit of the player, the reader 13 reads the location information 220, and the management controller 15 determines whether or not any abnormality is present with the variable information 4. Further, at the gate 10, the writer 14 writes the variable information 4 including place/event information 222 indicating the exit and owner information 223.

In a case where the player brings in the game token 1, which has been taken out before, and enters the casino floor, the reader 13 reads the location information, and a management controller 15 determines whether or not any abnormality is present with the variable information 4. It is possible to determine that there has been transfer of the game token outside the casino, for example in a case where the owner of the game token 1 once taken out of the casino is different between at the time of exit the casino and at the time of entry to the casino.

The above-described management controller 15 may output an alarm to the cage 9 or to the gate 10 in a case where a reading result by the reader 13 is determined to be abnormal. On the basis of the alarm output by the management controller 15, cashing in may be refused when the owner of the game token 1 attempts to cash in at the cage 9, or a check may be conducted individually when the owner of the game token 1 exits the gate 10. Further, in a case where a determination result is abnormal, the management controller 15 may issue an alarm to a dealer of each game table to interrupt a game or may issue an alarm to a pit, and a pit manager may determine to interrupt or continue a game, or determine to exchange the game token 1. Alternatively, the management controller 15 may be connected to an overall management controller 18 of the casino and may issue an alarm to the overall management controller 18.

Similarly, the management controller 15 may determine whether or not any abnormality is present in the variable information 4 read by the reader 13 when the game token 1 is exchanged for cash at the cage. Specifically, the management controller 15 may determine that abnormality is present in a case where a certain period has passed since latest written date and time of information of use at a game table or information of cashing in at the cage, or in a case where the owner information 223 stored in the game token 1 and information of a person who is going to exchange the game token 1 for cash are different from each other. In a case where abnormality has been determined to be present with the game token 1, the management controller 15 may output an alarm to refuse to exchange the game token 1 for cash.

Further, the above description is given of a case where the reader 13 performs reading, a management controller performs determination, and then the writer 14 performs writing. However, the reading and the writing may be performed simultaneously.

In the following, details of application of an embodiment will be described.

At the factory 6, RFID tags 2 are read and/or written at the completion of production or at the time of shipment. The writer 14 writes production information and product information as fixed information 3, locks it so that it cannot be rewritten if necessary, and writes the variable information 4.

At the backyard 6, the game token 1 shipped from the factory is received, and the RFID tag 2 is read and/or written when the game token 1 is activated as a usable game token 1.

At the warehouse 8, the RFID tag 2 is read and/or written when the game token 1 is transferred from the warehouse 8 to the cage 9, or from the cage 9 to the warehouse 8. Alternatively, the RFID tag 2 of the game token 1 kept in the warehouse 8 may be read and/or written at regular time intervals or at a predetermined timing.

At the cage 9, the RFID tag 2 is read and/or written when the game token 1 is transferred from or to the warehouse 8 or when cash owned by a customer and the game token 1 are exchanged. In a case where cash and the game token 1 are exchanged at the cage 9, as the variable information 4, place/event information 222 indicating the exchange and owner information 223 indicating a player who exchanged the cash and the game token 1 are written. The owner information 223 can be acquired from a casino ID card of the player, a face authentication system, a credit card, or the like.

At the gate 10, the RFID tag 2 is read and/or written on entry or exit of the player. To all game tokens 1 that a player takes out of the casino when exiting the casino, as the variable information 4, place/event information 222 indicating the taking out and owner information 223 indicating a player who takes out the game tokens 1 are written and registered. Similarly, at a time of entry to the casino, as the variable information 4, place/event information 222 indicating the bringing in and owner information 223 indicating a player who brings in the game token 1 are written and registered to the game token 1 brought in the casino.

At the betting area 11, the RFID tag 2 of the game token 1 that a player placed on the betting area 11 to participate in a betting is read and/or written. The RFID tag 2 of a game token 1 that the dealer has placed on a betting area 11 as redemption to the player is read and/or written.

In a chip tray 12, the RFID tag 2 of each of the game tokens 1 collected in the chip tray and the RFID tag 2 of each of the game tokens 1 kept in the chip tray are read and/or written.

Further, the game table may include a payout area including area 2007 and the payment area 1026, and the RFID tag 2 of a game token 1 that the dealer has placed on the betting area 11 as redemption to a player may be read and/or written.

The management controller 15 has a function to determine whether or not any abnormality is present in location information 220 obtained from a reading result by a reader 13 at each place. Determination of presence of abnormality is made in a case where the game token 1 has not been used for a predetermined period since last writing, or where location information, which is supported to be written, is not written.

A situation where the game token 1 has not been used for a predetermined period since last writing is a situation where: 1) latest location information indicates the cage 9, and a predetermined period has passed before next information is written, 2) latest location information indicates entry at the gate 10, and a predetermined period has passed before next information is written, or 3) latest location information indicates exit at the gate 10, and a predetermined period has passed before next information is written.

A situation where location information, which is supported to be written, is not written is a situation where: 4) at a time of entry to a gaming hall, information indicating exit at the gate 10 is not written as latest location information in data rewritable area 22 of the game token 1, 5) at a time of use at the cage 9, information indicating the backyard 7 is not written, or 6) at a time of exit from the gaming hall, information indicating the cage 9 or the backyard 7 is not written.

On the basis of the owner information 223 obtained from the reader 13, the management controller 15 can determine presence of abnormality when: 1) a person different from a latest owner whose information is stored in the data rewritable area 22 exchanges the game token 1 for cash or another game token in the gaming hall, or exits the gaming hall, or 2) a person different from an owner at a time of exit whose information is stored in the data rewritable area 22 brings the game token in the gaming hall.

On the basis of information obtained from the reader 13 and indicating a place of the betting area 11, or information indicating location of the chip tray 12 or a payout area, the management controller 15 determines presence of abnormality when: 1) a person different from a latest owner whose information is stored in the data rewritable area 22 uses the game token 1 at a game table, 2) a person different from the person who purchased, at the cage 9, a game token 1 without a record of use at the game table attempts to exchange the game token 1 at the cage 9, 3) a game token 1 not including information indicating the cage 9 or the backyard 7 is used in the gaming hall, or 4) latest location information is information indicating the betting area 11 or the payout area, and after a predetermined period has passed, the game token 1 is exchanged for cash at the cage 9 or is used at the game table.

FIG. 8 illustrates a database according to another embodiment. The management system further includes a database 17 that records similar fixed information 3 and variable information 4 outside the game token 1. The management controller 15 is able to record information in the database 17 on the basis of a reading result by the reader 13, check the fixed information 3 and the variable information 4 stored in the game token 1 with information in the database, and determine presence of abnormality.

In the RFID tag 2 according to the embodiment, a functionally non-writable area in the data non-rewritable area 21 may be a tag identifier (TID) area. An area in the data non-rewritable area 21, which is locked to disable further writing of data after necessary information is written, may be an electronic product code (EPC) area or a user area. The data rewritable area 22 may be an EPC area or a user area.

Figure 6:
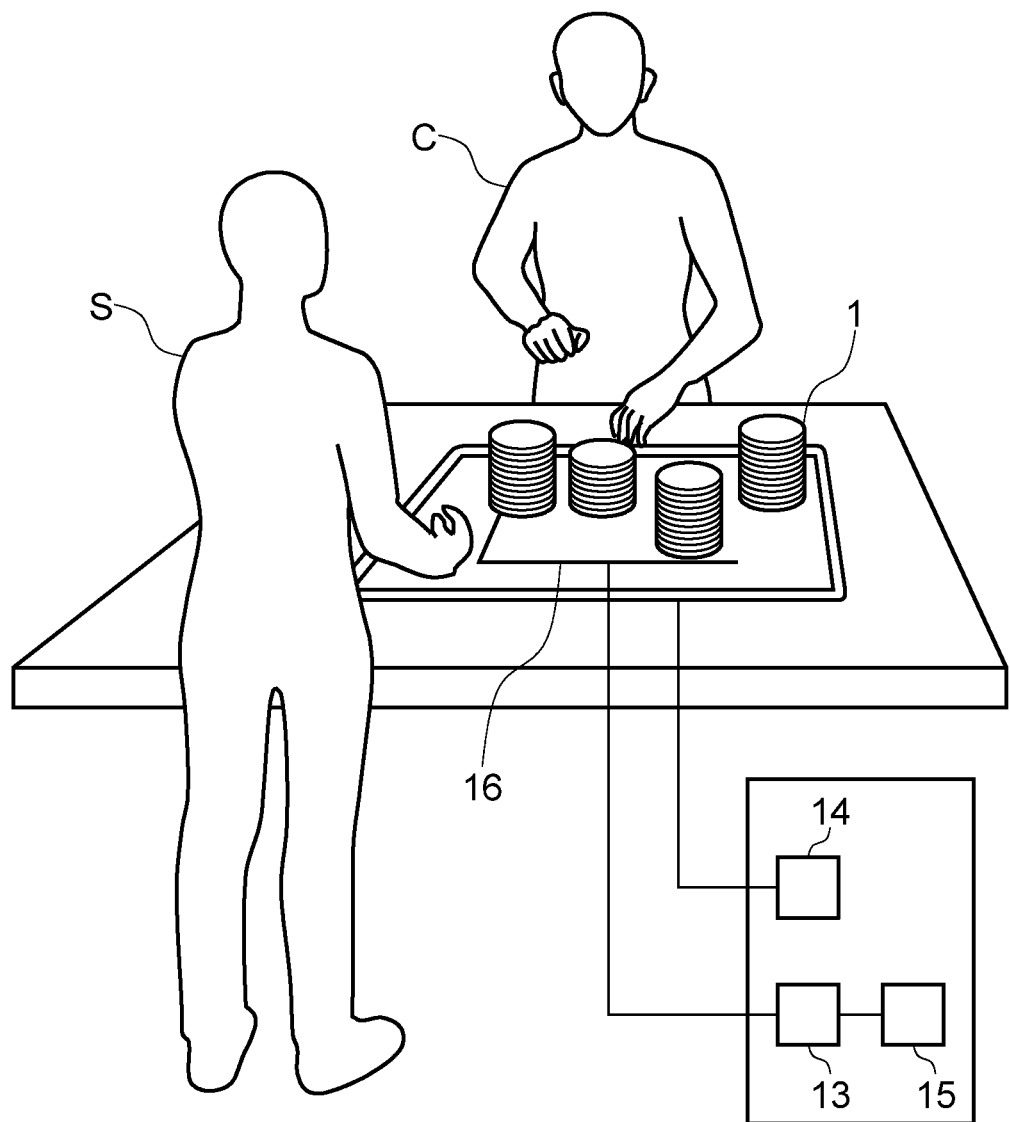
FIG. 6 is a diagram of a reader and writer of the game token according to the second embodiment.

The reader 13 and the writer 14 may be changed in form depending on a place. For example, the reader 13 and the writer 14 may be on a board at the factory 6 as illustrated in FIG. 6, and may be box-shaped at the gate 10. The betting area 11 or the chip tray 12 may include functions of the reader 13 and the writer 14. Further, the game token 1 either may be read and written in a stacked state without any support or may be read and written while being contained, for example, in a chip case. Further, the reader 13 and the writer 14 may be unified.

The above embodiment describes a case where a game token has one RFID tag, and the single RFID tag has an area in which writing to data is impossible and a data rewritable area. Meanwhile, there may be a case where two RFID tags are embedded in the game token. In this case, one RFID tag stores fixed information and then is locked to disable data writing, and another RFID tag is left data-rewritable to record variable information.

Figure 7A:
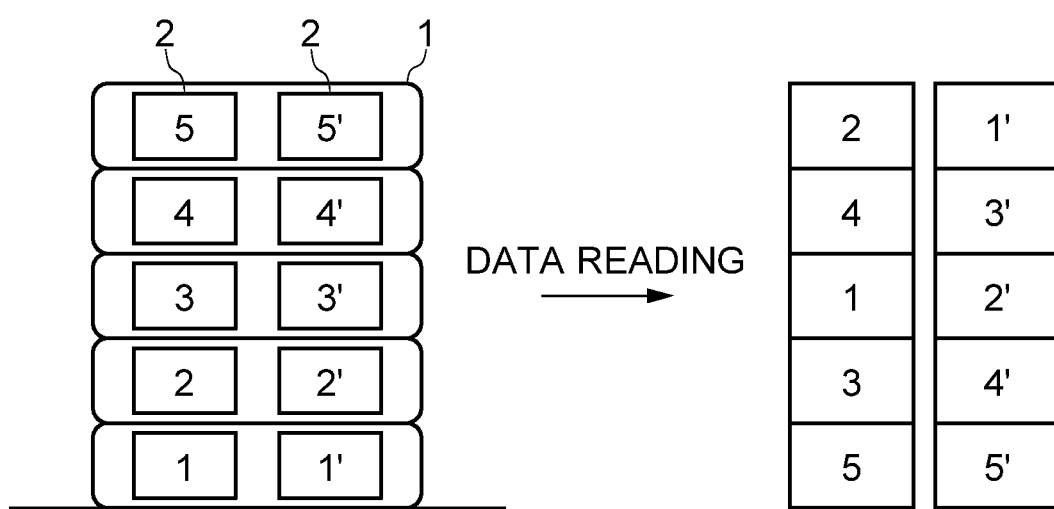
FIG. 7A is an explanatory diagram of configuration of data of the game token according to the second embodiment.

However, in this case, when a plurality of game tokens are read collectively, an information group of fixed information 3 and an information group of variable information 4 are read separately as illustrated in FIG. 7A. Therefore, a problem arises in that a combination of fixed information and variable information of a specific game token cannot be determined, and a game token having abnormal variable information cannot be identified.

Figure 7B:
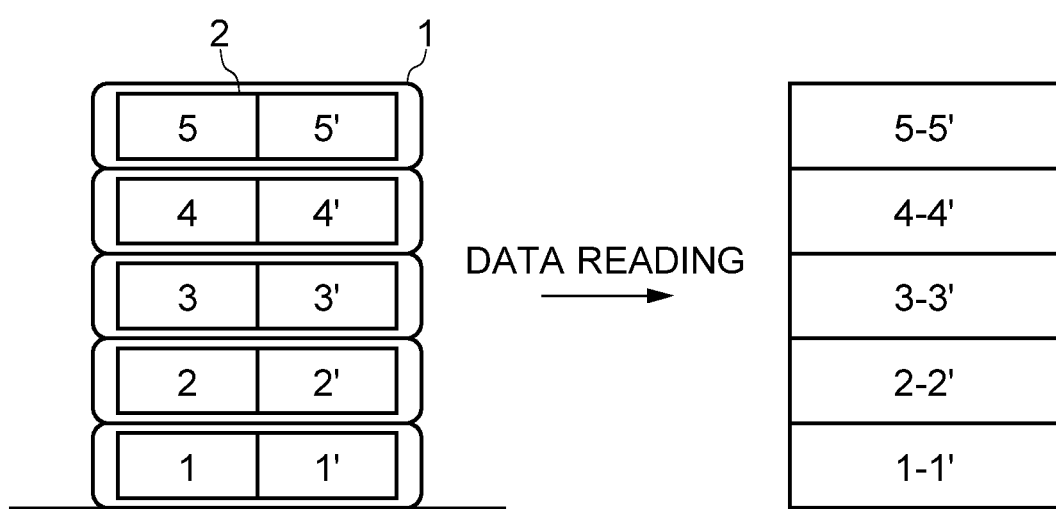
FIG. 7B is an explanatory diagram of configuration of data of a game token according to another second embodiment.

On the other hand, in the case of one RFID tag, as illustrated in FIG. 7B, mutually corresponding fixed information and variable information that are read by a reader can be determined even when a plurality of game tokens are read collectively. Therefore, a game token having a single RFID tag is conceived to be preferable.

In general, an RFID tag with a larger diameter has higher reading accuracy. Therefore, in a case where an RFID tag is embedded in the game token, a diameter of the RFID tag is preferably at least equal to or larger than a radius of the RFID tag. Thus, it is not preferable that two RFID tags are embedded in the game token, in which case, the diameter of each of the RFID tags becomes smaller. Further, the number of RFID tags to be read increases with a game token including two RFID tags, resulting in lower reading speed at a time of reading a plurality of game tokens.

In view of the above, a game token having a single RFID tag is considered to be more effective.

Figure 9:
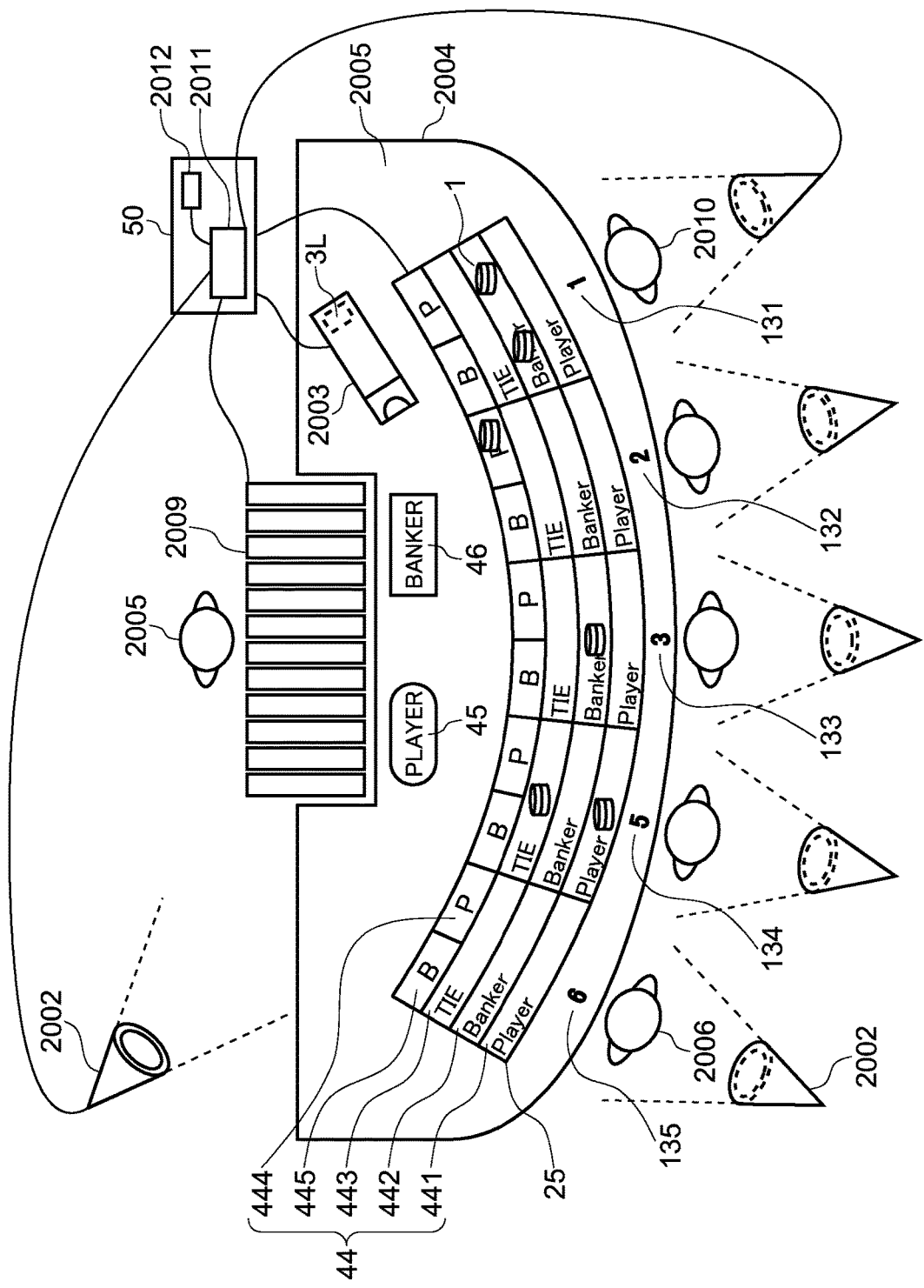
FIG. 9 is a diagram of an overall overview of a table game management system at a gaming hall having a plurality of game tables according to the embodiment.

Described below is an overall overview of a table game management system at a gaming hall having a plurality of game tables according to an embodiment. FIG. 9 is a diagram illustrating an overall overview of the table game management system. The table game management system having a plurality of game tables 2004 at a gaming hall includes a game recorder 2011 that records an image of a game at a game table 2004 including an image of the game token 1, via a plurality of cameras 2002, an image analyzer 2012 that performs image analysis on the recorded images, a chip reader 25 that reads RFID added to the game token 1, and a game result determination device 18 that determines and displays a result of each game played at the game table 2004.

The game result determination device 18 is, for example, a card distributor 2003, which is a so-called electronic shoe that have been used by persons skilled in the art. A rule of a game is previously programmed in the card distributor 2003, which is configured to read information of a distributed card C and determine win or loss of the game. For example, in a baccarat game, a win of a banker, a win of a player, and a tie (draw) are basically determined by each rank of two to three cards, and a determination result (win/loss result) is displayed by a result display lamp 2013.

In FIG. 9, a game table 2004 is a table for baccarat and provided with five sitting numbers 13, allowing five game participants to participate in a game. The five sitting numbers are "sitting number 1" 131, "sitting number 2" 132, "sitting number 3" 133, "sitting number 5" 134, and "sitting number 6" 135. A betting area 44 is provided to each sitting number 13. The betting area 44 of a sitting number 13 includes each area for player (PLAYER) 441, banker (BANKER) 442, tie (TIE) 443, player pair (P) 444, and banker pair (B) 445. Each game participant makes a bet by placing a game token 1 in an amount to be bet at a position corresponding to a bet target. In FIG. 9, for example, at a sitting number 5, two game tokens 1 are placed on tie 443 and two game tokens 1 are placed on player 441 for betting. The game table 2004 further includes a player card area 45 for placing a drawn player card and a banker card area 46 for placing a drawn banker card.

Via a camera 2002 and the image analyzer 2012, the controller 2014 is able to determine on which position (player, banker, tie, or pair) in a betting area 2008 each player 2006 has bet a game token 1, and types and the number of the bet game tokens 1. Different colors are assigned to game tokens 1 in different values. That is, to the controller 2014 can determine that, for example, at the sitting number 5, two game tokens 1 are bet on tie 443 and two game tokens 1 are bet on player 441.

As illustrated in FIG. 9, the chip reader 25 is arranged so that RFIDs of the game tokens 1 in a reading area can be collectively read by regarding an entire betting area for each sitting number as one reading area. In the RFID attached to a game token 1, unique ID information, and an amount, type, manufacturing information, owner information, or the like, of the game token 1 are written. Alternatively, the ID information and the amount, type, manufacturing information, owner information, or the like, of the game token 1 may be associated and stored in a database. By reading the RFID attached to the game token 1, the chip reader 25 can determine a total amount or the number of game tokens 1 for each sitting number. That is, for example, a type, an amount, and an ID of each of four game tokens bet at the sitting number 5 can be determined.

Figure 10:
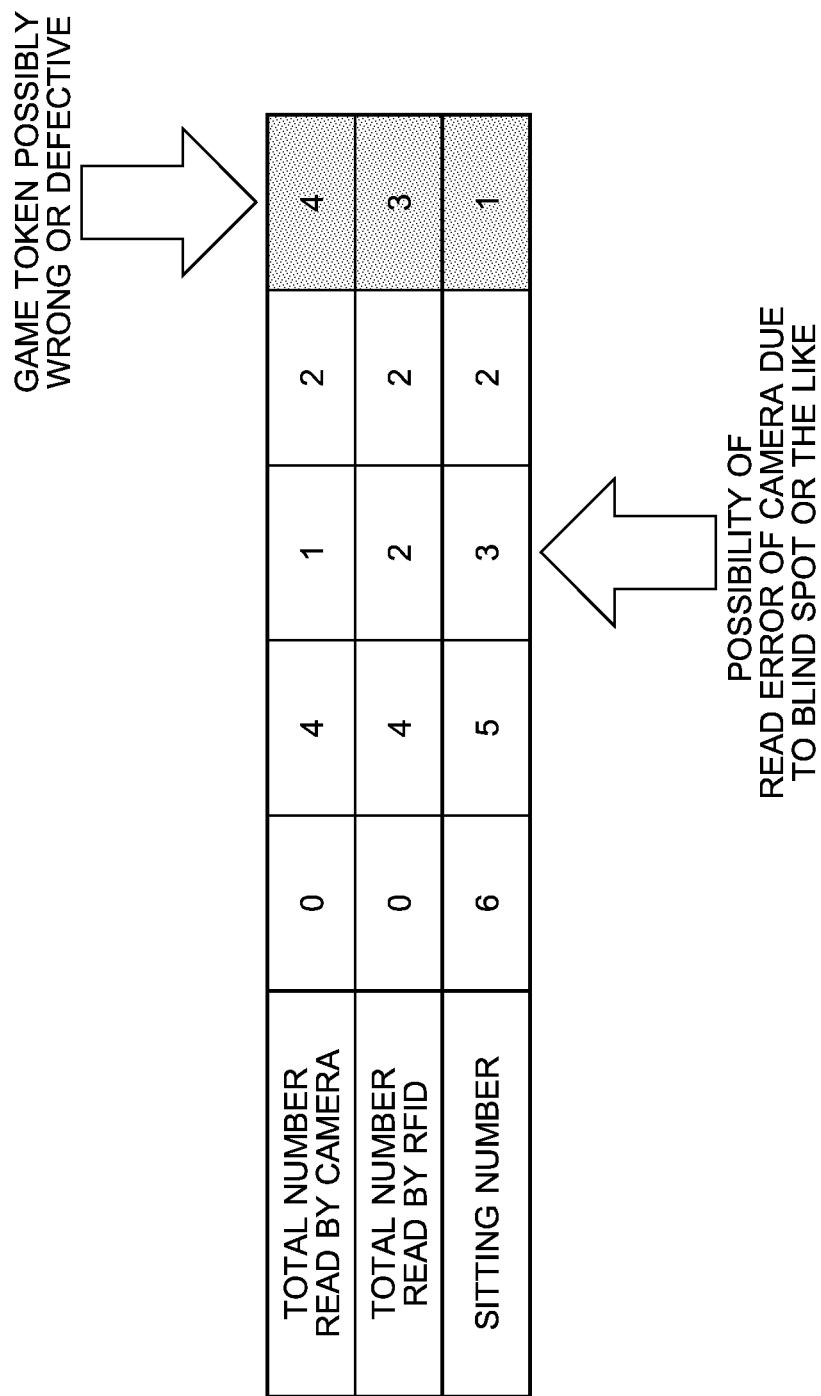
FIG. 10 is a diagram of a result of reading a chip by a camera and RFID according to the embodiment.

As illustrated in FIG. 10, on the basis of types and the number of the game tokens 1 bet at each betting area of each sitting number based an image analysis result by the image analyzer 2012, the controller 2014 determines a total amount or the total number of the game tokens 1 for each sitting number. Then, to determine agreement, the controller 2014 compares the determined a total amount or the total number of the game tokens 1 with a total amount or the total number of the game tokens 1 for each sitting number based on information of RFIDs of the game tokens 1 read by the chip reader 25. Furthermore, a sitting number for which an amount or the total number of the game tokens 1 determined to be disagreeing can be output, and therefore a sitting number having a problem can be identified.

In a case where the total amount or the total number of the game tokens 1 for each sitting number based on the image analysis result by the chip reader 25 is smaller than the total amount or the total number of the game tokens 1 for each sitting number based on the reading result by an image analyzer 2012, there is a possibility that RFID attached to a game token 1 is broken, the RFID cannot be read, or RFID is not attached to the game token 1. In FIG. 10, the read total number of game tokens 1 bet at sitting number 1, based on image analysis by the image analyzer 2012, is four, whereas the total number of the game tokens 1 based on reading of RFID by the chip reader 25 is three. Therefore, it is conceivable that one of the four game tokens 1 bet at the sitting number 1 has unreadable RFID.

In a case where the total amount or the total number of the game tokens 1 for each sitting number based on the image analysis result by the chip reader 25 is larger than the total amount or the total number of the game tokens 1 for each sitting number based on the reading result by the image analyzer 2012, there is a possibility that the image analyzer 2012 has not been able to read the game token 1 for such reasons that the game token 1 is in a blind spot of a camera. In FIG. 10, the read total number of game tokens 1 bet at sitting number 3, based on image analysis by the image analyzer 2012, is one, whereas the total number of the game tokens 1 based on reading of RFID by the chip reader 25 is two. Therefore, there is a possibility that only one of the two game tokens 1 bet at a sitting number 3 has been recognized by the image analyzer 2012.

ID information of the RFID attached to the game token 1 is registered in a database of a casino. Information of production and shipment at a factory, and information of reception, validation, and activation at the casino are recorded. The controller 2014 can check the information of the RFID read by the chip reader 25 with information in the database and determine authenticity of the registered information of the game token 1 to be used in the casino.

With this configuration, types and the number of the game tokens 1 bet at each betting area can be determined by the camera. Further, on the basis of RFID information of game tokens 1 read by the chip reader 25, a wrong or defective game token 1 can be identified for each sitting number.

The table game management system further includes a game participant identification unit using a face authentication system or a player ID card, and the controller 2014 can associate game participant information identified by the game participant identification unit with a sitting number. For each game participant, the controller 2014 can store the bet amount, redeeming or collecting amount, and win/loss information, which are stored for each sitting number. Further, the controller 2014 can collectively store information of a plurality of games that game participants play at a plurality of tables.

By using a chip tray determination device 12, the controller 2014 can determine a total amount of the game tokens 1 in a chip tray 17 of a dealer 2005 at the game table 2004. After a game end and settlement, the controller 2014 can calculate to figure out whether a total amount of the game tokens 1 in the chip tray 17 has increased or decreased by comparing an amount of collected lost game tokens 1 that each player 2006 has bet with an amount of payment 9W to a winning player 2006W for won chips, according to a win/loss result of the game. A chip tray determination device may capture an image of the game tokens 1 contained in the chip tray 17 by using the camera 2002 and, on the basis of analysis by an image analyzer 2012, determine the total amount of the game tokens 1 in the chip tray 17. Further, the chip tray determination device may detect the total amount of the game tokens 1 contained in the chip tray 17 by providing an RFID reader to the chip tray 17.

In this example, a wrong or an error is detected on the basis of a win/loss result of the game, information about how many and what type of game token 1 has been bet on which position (player, banker, tie, or pair) in the betting area 2008, and increase or decrease in amount of the game tokens 1 in the chip tray 17 after collection of lost chips and redemption for a won game token 1. Therefore, a wrong or an error can be detected without determining transference of the game tokens 1 after a game end, that is, whether a bet game token 1 has transferred to a player side or a dealer side.

Here, in a case of baccarat for example, a win/loss result of a game can be determined according to a rule of baccarat by the card distributor 2003 reading a rank of the card C drawn out in the game. Further, the win/loss result can be determined by capturing an image of a top of the game table 2004 by a camera 2002, analyzing the image by the image analyzer 2012, and then checking an analysis result with a rule of the game by the controller 2014. In this case, a game result determination device includes the camera 2002, the image analyzer 2012, and the controller 2014. Information of how many and what type of game tokens 1 a player at each sitting number 7 has bet on which position (player, banker, tie, player pair, banker pair) in a betting area 2008 is obtained by the camera 2002 capturing an image of the game tokens 1 placed on the betting area 2008 and the image analyzer 2012 analyzing the image for each play position 7.

Further, increase in amount of the game tokens 1 in the chip tray 17 from before collection to after collection of a lost game token 1 and decrease in amount of the game tokens 1 in the chip tray 17 from before redemption to after redemption for a won game token 1 can be calculated by comparison of a total amount of the game tokens 1 in the chip tray 17 before the collection of the lost game token 1 and redemption for the won game token 1 with a total amount of the game tokens 1 in the chip tray 17 after the collection of the lost game token 1 and redemption for the won game token 1.

For example, assuming that a total amount of the game tokens 1 in the chip tray 17 before start of the game is Bb, and a total amount of the game tokens 1 in the chip tray 17 after the end of the game and collection of lost chips and redemption for a won chip are completed is Ba. Further, assuming that, in this game, a total amount of the game tokens 1 bet on player areas of all play positions 7 is bp, a total amount of the game tokens 1 bet on banker areas of all the play positions 7 is bb, and a total amount of the game tokens 1 bet on tie areas of all the play positions 7 is bt. For example, in a case where a banker is a winner as a win/loss result of the game, Ba−Bb=bp−bb+bt should be established. Alternatively, Ba, which is the total amount of the game tokens 1 in the chip tray 17 after the end of the game, should be (Bb+bp−bb+bt). If this is not the case, it can be determined that there has been a wrong or an error in collection or redemption of the chips.

Figure 14A:
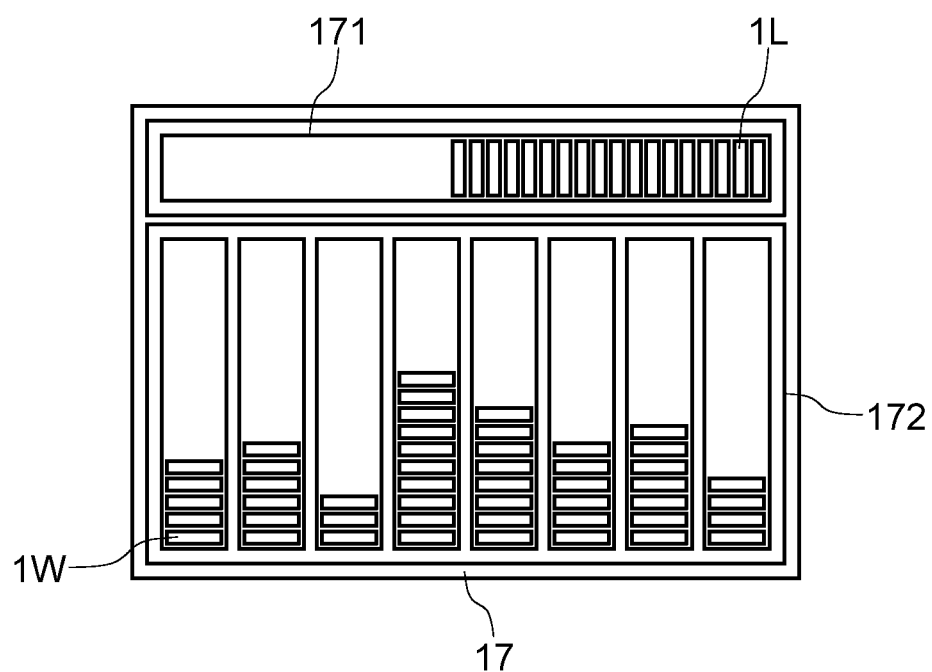
FIG. 14A is a diagram of a detail of the chip tray according to a first embodiment.
Figure 14B:
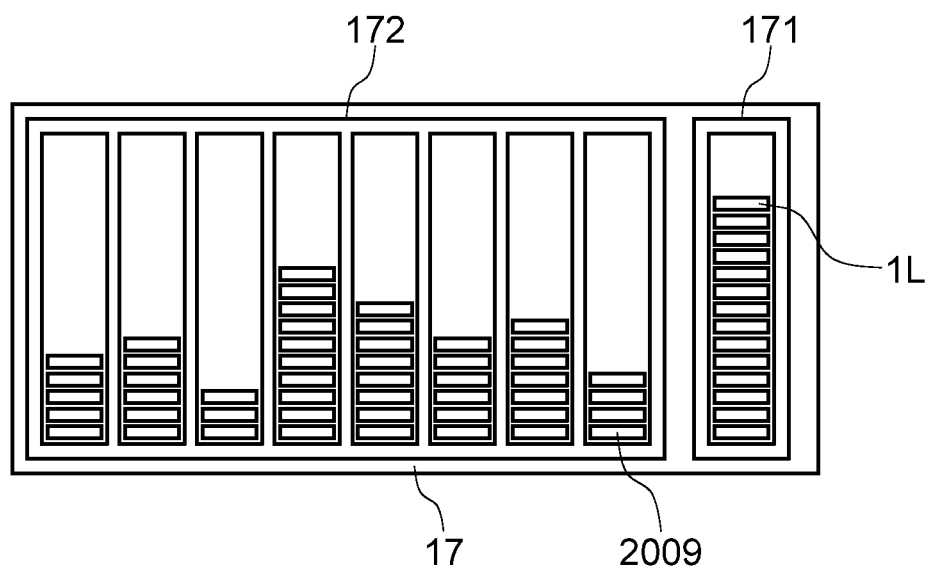
FIG. 14B is a diagram of another example of a chip tray according to the first embodiment.

FIG. 14A is a diagram illustrating details of a chip tray of the present embodiment, and FIG. 14B is a diagram illustrating another example of the chip tray. The chip tray 17 includes a collection chip tray 171 for temporarily keeping a collected game token 1L bet by a losing player 2006L, and a redemption chip tray 172 for keeping a game token 1W to be redeemed. The image analyzer 2012 and the controller 2014 determine positions, types, and the number of the game tokens 1L bet by the losing player 2006L, and calculate an increase in amount of the game token 1L, which is the amount of the game token 1 expected to be in the collection chip tray 171. Further, the image analyzer 2012 and the controller 2014 determine an actual total amount of the game tokens 1 in the collection chip tray 171 after the collection, and compare the expected total amount with the actual total amount to determine whether or not there is a difference.

The controller 2014 further performs redemption for the game token 1 to be redeemed, and after the redemption, compares a total amount of the chips expected to be in the chip tray based on the amount of the chips expected to be redeemed in the game, which is calculated from positions, types, and the number of chips each game participant bet at the game table and based on a game result, with the actual total amount of the chips in the chip tray to determine whether or not there is a difference.

Further, the game token 1W is redeemed to the winning player 2006W by using a game token 1 in a redemption chip tray 172. Thus, it is possible to secure sufficient time for the image analyzer 2012 and the controller 2014 determine an actual total amount of the game tokens 1 in the collection chip tray 171 after the collection.

As described above, in the present embodiment, the controller 2014 calculates, for each game, income and outgo of chips from an amount of bet chips placed on the game table 2004 and a win/loss result of the game, and verifies an increase in balance of the chips in the chip tray 17 after the end of the game. If a difference is detected in this verification, the controller 2014 issues an alarm or adds a record of the difference to a record of a video image captured by the camera 2002. A casino operator can track down a cause of the difference by reviewing the video image.

A table game management system according to the present embodiment calculates, from total amount of the game tokens 1 in the chip tray 17 before settlement for each game, an increase or decrease in amount of chips in the game calculated from positions, types, and the number of game tokens 1 bet by all players 2006 of the game and from a win/loss result of the game obtained by a win/loss result determination device. Then, the table game management system compares an expected total amount of the game tokens 1 in the chip tray 17 after settlement of the game end with an actual total amount of the game tokens 1 in the chip tray 17 at the game end, which is obtained via the image analyzer 2012, to determine whether or not there is a difference.

Via the image analyzer 2012, the controller 2014 determines positions, types, and the number of chips bet by each player, and determines an actual total amount of chips in the chip tray at an end of collection of all lost chips bet by each player. Then, the controller 2014 compares an expected total amount of the game tokens 1 in the chip tray 17, which is obtained by adding an increase in chips in the chip tray 17 determined by positions, types, and the number of chips bet by a losing player, to a total amount of chips of the game in the chip tray before settlement of each game, with an actual total amount of the game tokens 1 in the chip tray 17 to determine whether or not there is a difference.

In a case where the controller 2014 compares an expected total amount of the game tokens 1 in the chip tray 17, which is obtained by adding an increase in chips in the chip tray 17 determined by positions, types, and the number of the game tokens 1 bet by a losing player, to a total amount of the game tokens 1 of the game in the chip tray 17 before settlement of each game, with an actual total amount of the game tokens 1 in the chip tray 17 and determines there is no difference between the expected total amount and the actual total amount, and in addition, compares an expected total amount of the game tokens 1 in the chip tray 17 after settlement at the end of the game with an actual total amount of the game tokens 1 in the chip tray 17 at the end of the game, which is obtained via the image analyzer 2012, and determines that there is a difference between the expected total amount and the actual total amount, the controller 2014 determines there has been a wrong payment and issues an error signal that notifies of the wrong payment.

The chip tray 17 includes the collection chip tray 171 that collects and temporarily keeps the game tokens 1 bet by a losing player. The image analyzer 2012 compares an expected total amount of the game tokens 1 in the collection chip tray 171, which is obtained by adding an increase in amount of the game tokens 1 in the game calculated from positions, types and the number of the game tokens 1L bet by the losing player, with an actual total amount of the game tokens 1 in the collection chip tray 171 to determine whether or not there is a difference between the expected total amount and the actual total amount.

In a case where the controller 2014 determines a difference in which a determined actual total amount of the game tokens 1 in the chip tray 17 of the dealer 2005 at the game table 2004 is not corresponding to an increase or decrease in amount of chips calculated from an amount of chips bet by all players and a win/loss result of the game, the game recorder 2011 can play back with an index or time attached to an acquired image or with a scene of collection or payment of the game token 1 specified, so that a record of the game in which the above different has occurred can be analyzed in the game recorder 2011.

As described above, the controller 2014 obtains a total amount of chips in the chip tray 17 via the image analyzer 2012 after the settlement at the end of the game. In this case, determination after settlement is performed when: 1) redemption for the won game token 1 is completed, 2) the card C used in the game is collected and discarded in a discard area 41 or discard slot 42 of the table, 3) a predetermined button attached to a win/loss result determination device is pressed, or 4) a marker 43 that indicates win or loss is reset.

Further, the controller 2014 has an artificial-intelligence utilization structure or deep-learning structure, which allows the controller 2014 to determine positions (player, banker, or pair) and an amount (types and the number) of chips bet at each play position 7 of the game table 2004, and to extract win/loss history of each player 2006, which is obtained from a win/loss result of each game, and an amount of obtained chips (an amount of won chips) as an unusual situation specified by a casino, compared with statistical data of many games in the past (big data). Typically, the controller 2014 includes an artificial-intelligence utilization structure or deep-learning structure, which can extract, as an unusual situation compared with statistical data (big data, or the like) of games in the past, a case of a winning amount of a certain amount (one million dollars) or more, or a case of a series of several games in which amounts of bet chips are small in losing games and amounts of bet chips are large in winning games at a play position 7 of the game table 2004.

Furthermore, unified with the image analyzer 2012, the controller 2014 of this table game management system is configured to be able to identify an individual player 2006 at the play position 7 which has won a predetermined amount or more or at which an unusual situation is extracted. In identification of such a player 2006, in the image analyzer 2012, feature points of an image of a face is obtained by, for example, extraction of a feature point, and the image is identified by adding an identification number (ID, or the like) to the image. Then, the controller 2014 has an alarm function of notifying another game table of the presence of a specific player when the specific player 2006 leaves the seat and sits at the other game table. Specifically, a pit manager or a person in charge of each table (or a dealer) who manages each game table 2004 is notified to further prevent an unusual situation.

The controller 2014 can identify a collected game token 1 for each sitting number on the basis of information of an ID of RFID of the collected game token 1 determined by the chip tray determination device and information of an ID of RFID of the game token 1 read by the chip reader 25.

Figure 11:
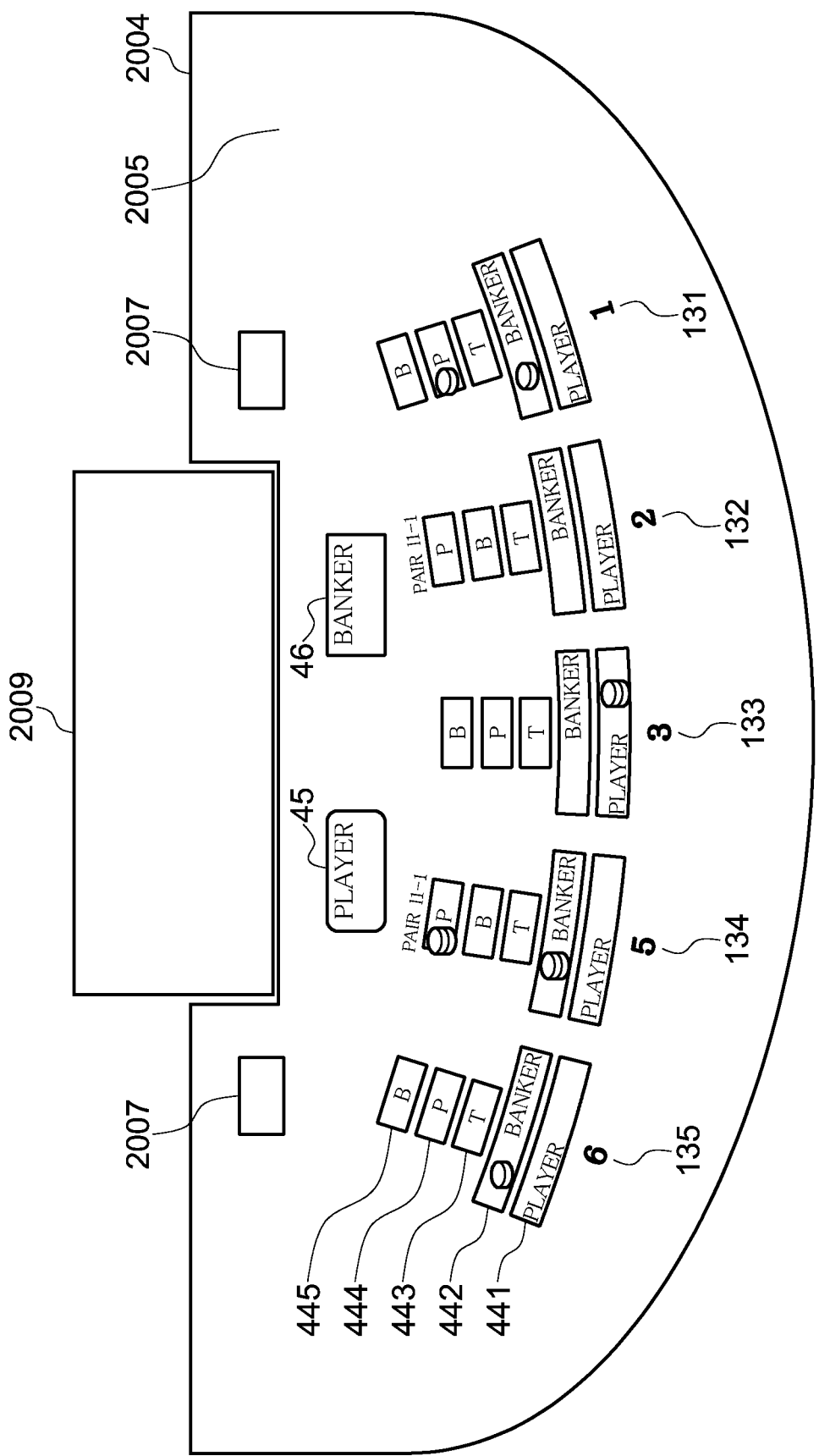
FIG. 11 is a diagram of a game table according to the embodiment.
Figure 13:
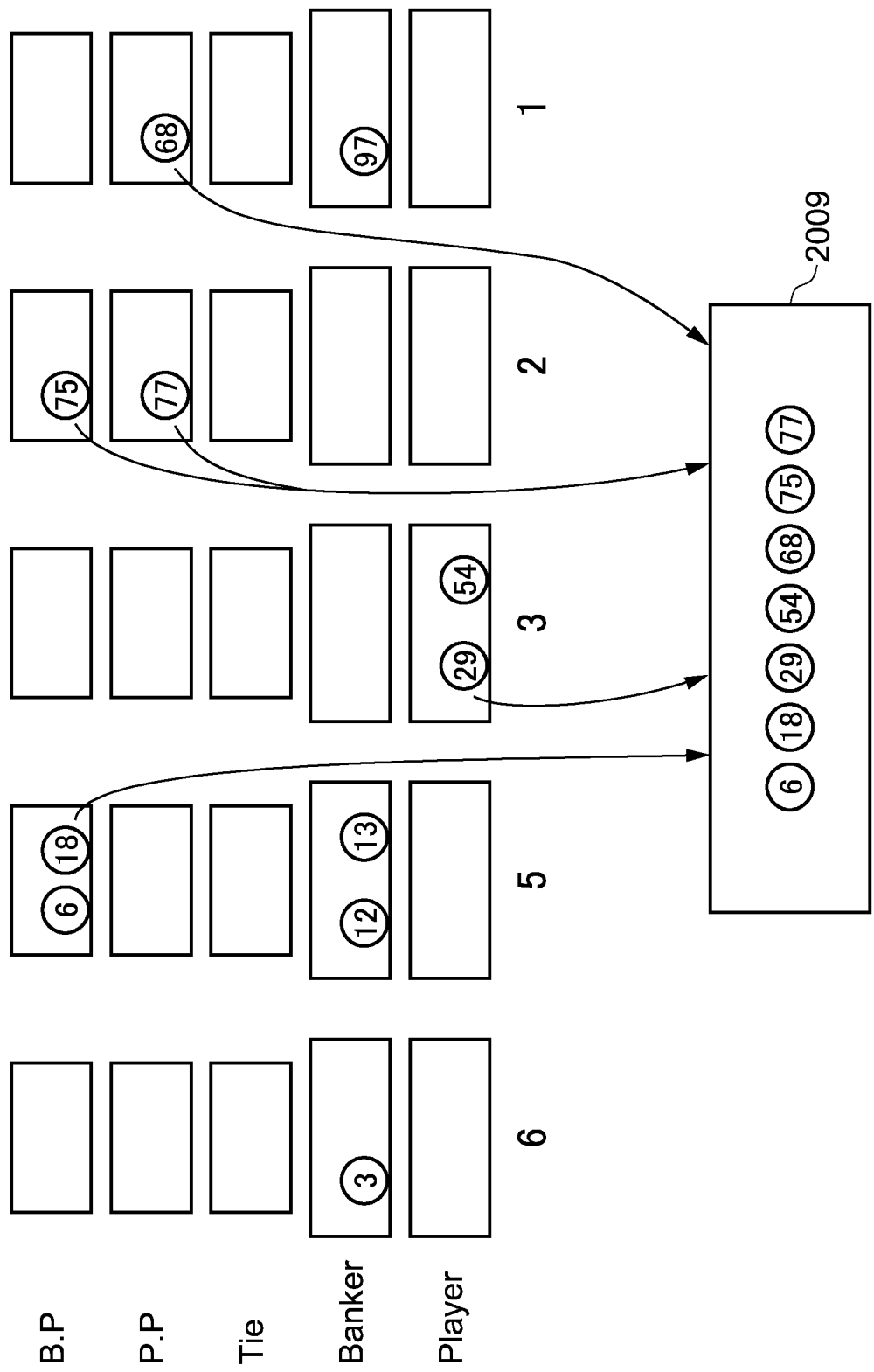
FIG. 13 is a diagram of a state of game tokens bet at the game table according to the embodiment.

In FIG. 11, game tokens 1 are bet as illustrated in the detail tables in FIGS. 12 and 13. In analysis by the image analyzer 2012, places (player, banker, or the like) where the game tokens 1 are bet and the number (and amount) of the bet game tokens 1 can be determined. Meanwhile, in reading by the chip reader 25, an ID of RFID attached to a game token 1 can be determined for each sitting number. Further, because a chip tray determination device can determine IDs of game tokens 1 in a chip tray 9, the chip tray determination device can determine a collected game token 1 by determining IDs added from before collection to after collection. In a case where a banker has won as a game result in FIGS. 11 to 13, an analysis result by the image analyzer 2012 shows that, among IDs of the collected chips determined by the chip tray determination device, two pieces of chips bet on banker pair should be collected, and that two pieces of chips of ID 6 and ID 18 that the chip reader 25 has read as chips bet at the sitting number 5 have been collected.

The controller 2014 determines the total amount or the total number of the game tokens 1 expected to be collected for each sitting number, which is determined by using a measurement result of positions, an amount, and the number of the game tokens 1 based on a game result obtained from the game result determination device and an image analysis result by the image analyzer. Therefore, the controller 2014 can compare, to determine agreement, the total amount or the total number of the game tokens 1 collected for each sitting number, which is determined based on RFID, with the total amount or the total number of the game tokens 1 expected to be collected based on the image analysis result.

For example, in a case where a reading result by the chip reader 25 of the sitting number 1 is "A, B, C, D, E," an analysis result by the image analyzer 2012 is "two pieces on tie, and two pieces on banker," the game result is "winning of banker," and a reading result by a chip tray determination device 18 is "A, B," it is understood that the chips A and B bet on tie have been correctly collected.

The controller 2014 can determine whether or not information of an ID of RFID of the collected game token 1 determined by the chip tray determination device agrees with information of an ID of RFID of the bet game token 1 read by the chip reader 25. By this determination, it is possible to determine whether or not the game token 1 collected in the chip tray is the game token 1 bet on the game table, and whether or not the game token 1 is wrongly collected from another place.

The controller 2014 can determine, on the basis of the RFID information read by the chip reader 25, a chip type such as a cash chip, a rolling chip, or a promotion chip, and can store an amount of bet money for each type of the determined chips and an amount of money collected or redeemed.

A rolling chip is a special chip that can be purchased by a specific member and cannot be exchanged for cash, and an amount of the purchased rolling chips is managed for each member. A rolling chip must be consumed for betting, and redemption for betting using a rolling chip is made by a cash chip. By storing an amount of the rolling chips bet or collected on the basis of the RFID information read by the chip reader 25, an amount of rolling chips that a specific member is expected to have can be determined.

Figure 15:
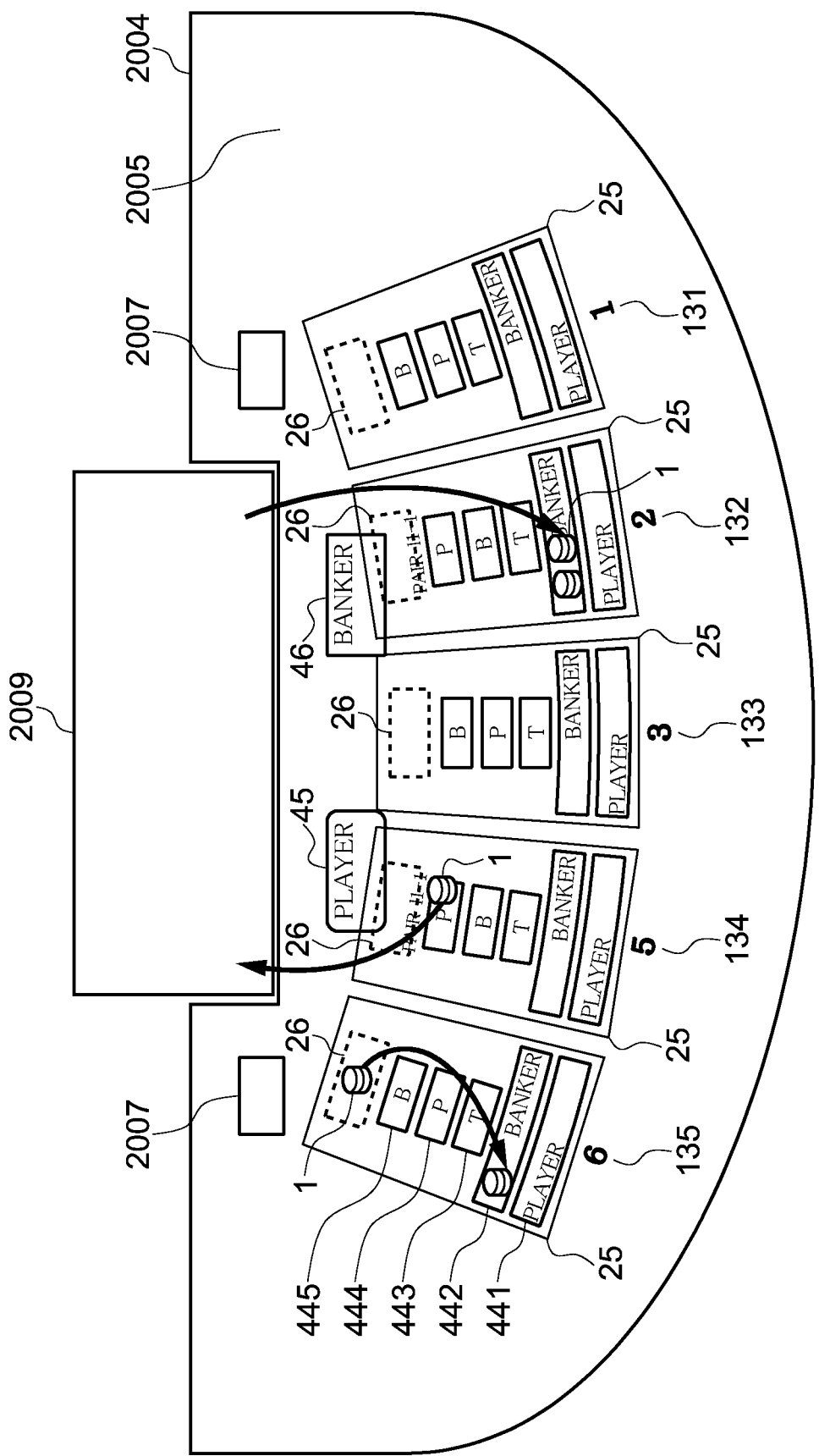
FIG. 15 is a diagram of the game table according to the embodiment.
Figure 16:
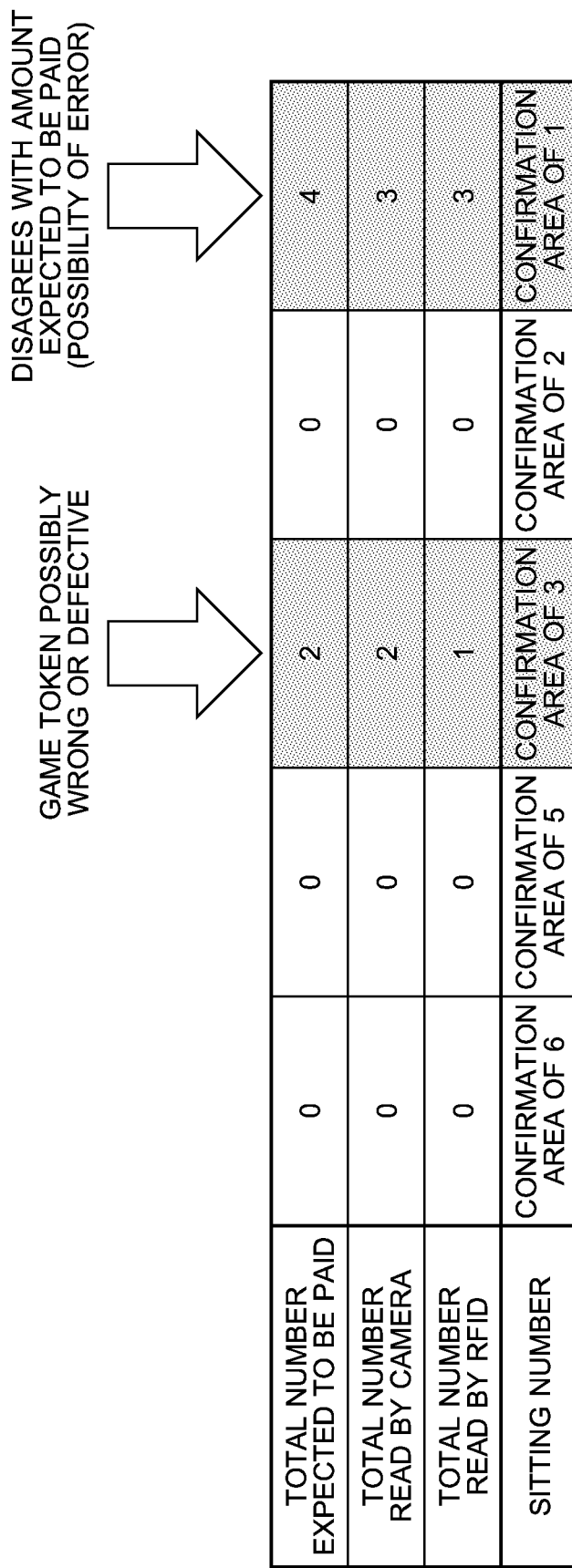
FIG. 16 is a diagram of a result of reading a chip by the camera and RFID according to the embodiment.

The chip reader 25 has a function of a confirmation area, and can read a game token 1 placed for redemption. As illustrated in FIG. 15, in a case where redemption is made to banker at the sitting number 2, the game token 1 for the redemption is placed and read in the chip reader 25. In FIG. 15, the game tokens 1 are placed next to the won game tokens 1 bet on banker at the sitting number 2. The controller 2014 can compare an amount of redemption, which is determined by using a measurement result of a position, an amount, and the number of the game tokens 1 based on a game result obtained from the game result determination device and the image analysis result by the image analyzer, with an amount of the game tokens 1 placed for each sitting number, which is based on a reading result by the chip reader 25, determine whether or not the amount of the redemption agrees with the amount of the game tokens 1 placed for each sitting number, and output a determined result. In FIG. 16, at the sitting number 1, the total number of the game tokens 1 expected to be paid is four, whereas a reading result by the chip reader 25 is three, which means the total number of the game tokens 1 and the reading result disagree. In a case where an amount of redemption disagrees with an amount of the game tokens 1 placed for each sitting number, a signal indicating the disagreement is output, and the dealer can replace a game token 1 for redemption on the basis of the output signal. In a case where the game token 1 is replaced, determination is performed again, and a determination result can be output. An area for placing the game token 1 for redemption may be anywhere in the chip reader 25. Further, as illustrated in FIG. 15, separately from a betting area, a payment confirmation area 26 may be arranged on a dealer side of the betting area. In FIG. 15, a game token 1 for redemption is placed in a payment confirmation area 26 at a sitting number 6, the chip reader 25 performs reading, the controller 2014 makes determination, and a redemption chip is placed next to the won game token 1 placed in banker.

For the confirmation area, the image analyzer 2012 may perform image analysis, and the controller 2014 may check a result of the image analysis with a reading result by the chip reader 25 to determine whether or not a total number of the result of the image analysis and a total number of the reading result by the chip reader 25 match.

On the basis of the determination made, the controller 2014 can output a signal. The signal may be displayed in a display unit of the chip tray 9 or a display unit of a card distributor 2003, or may be output to the pit manager or to the backyard of the casino.

Figure 17:
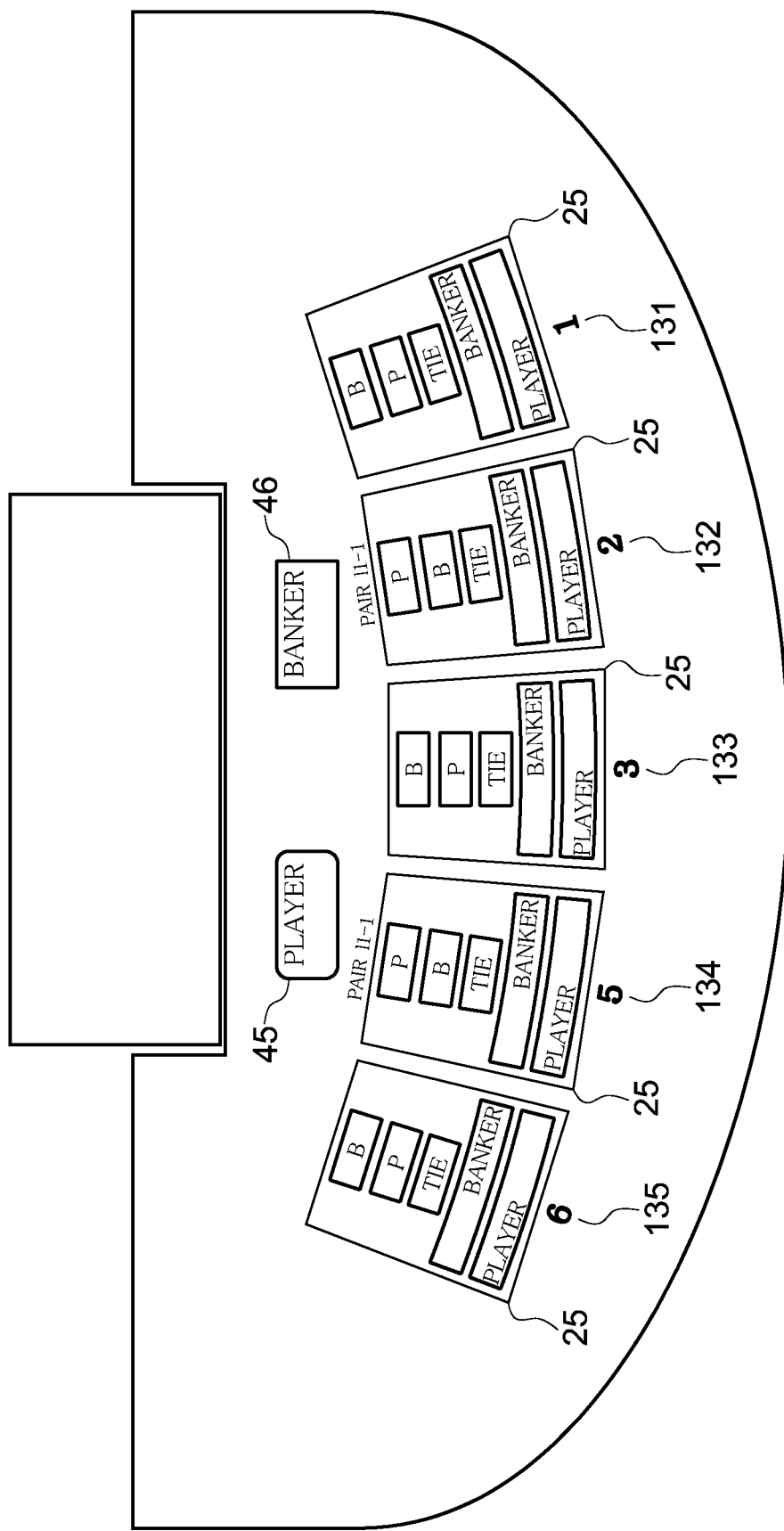
FIG. 17 is a diagram of a game table according to another embodiment.
Figure 18:
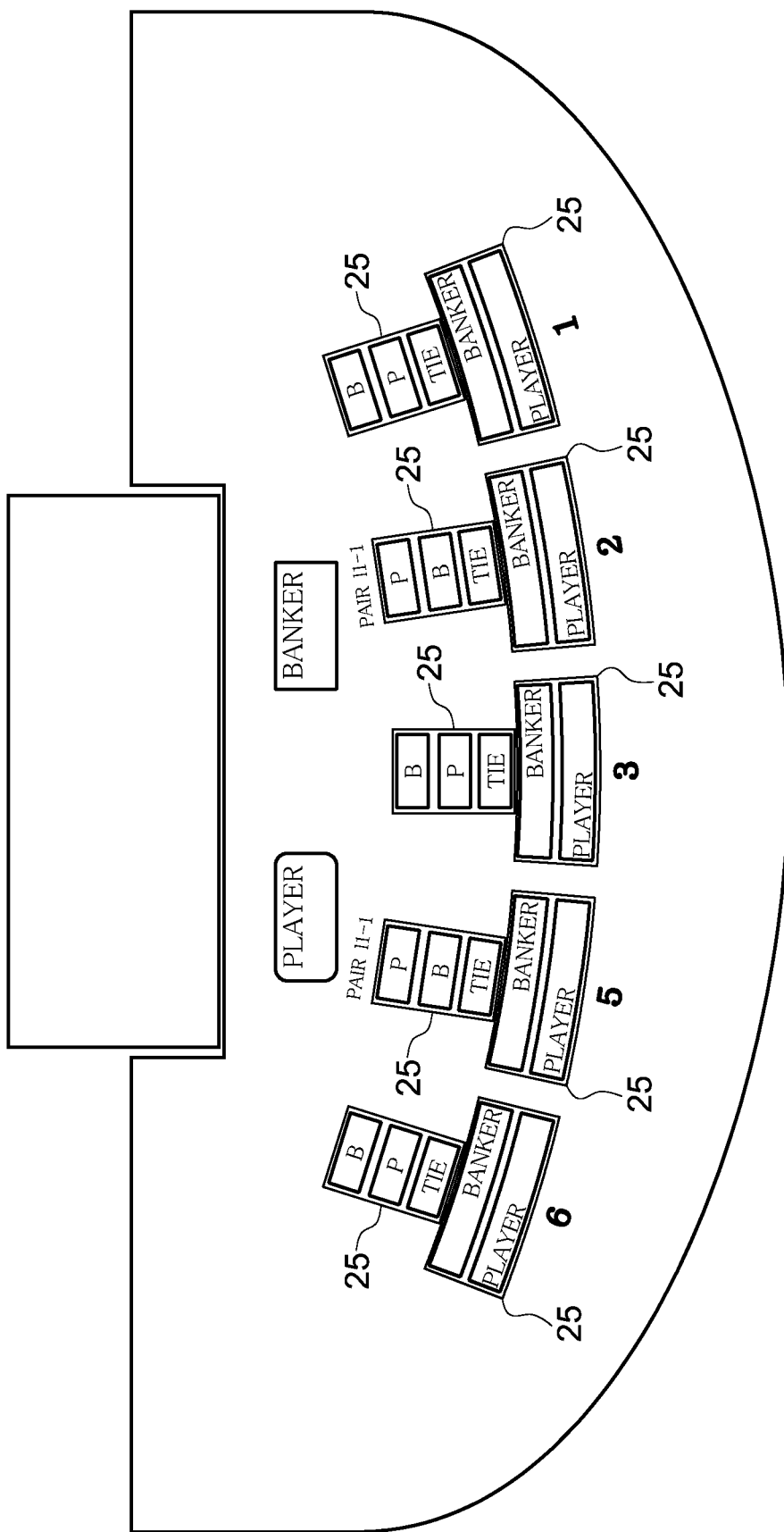
FIG. 18 is a diagram of a game table according to the other embodiment.
Figure 19:
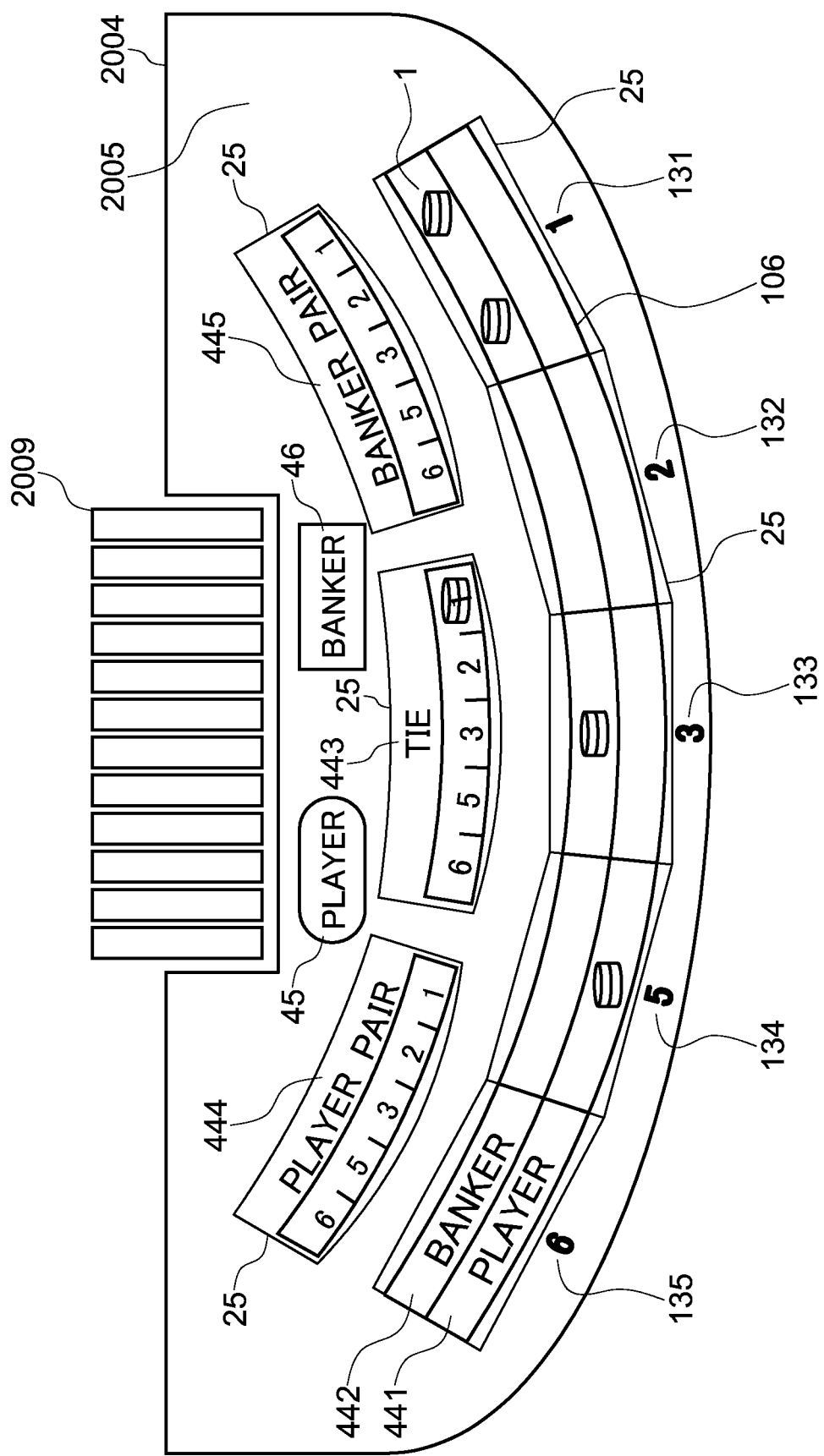
FIG. 19 is a diagram of a game table according to the other embodiment.
Figure 22:
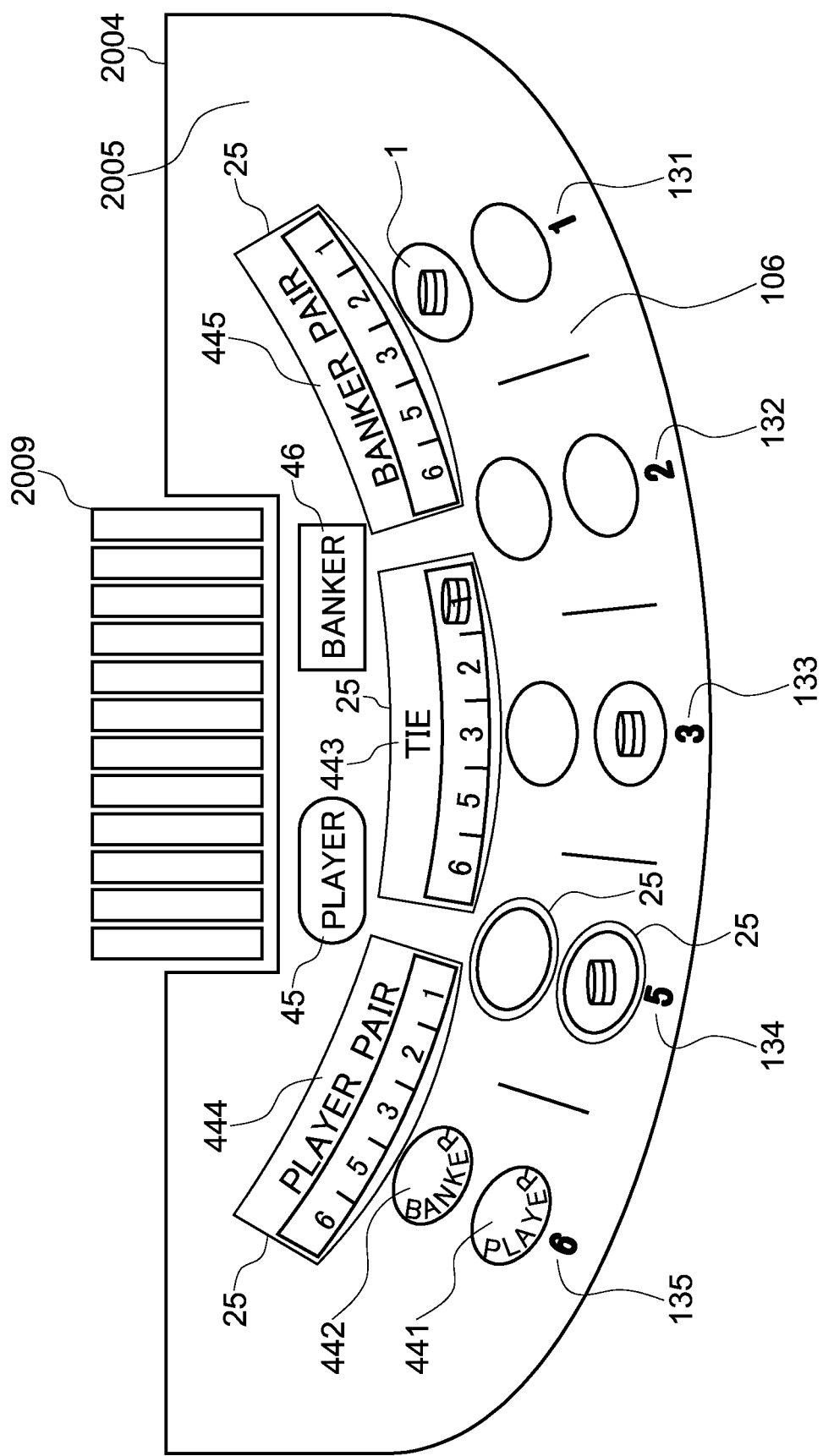
FIG. 22 is a cross-sectional view of the game token according to the embodiment.

The chip reader 25 may use an entire betting area as one reading area for each sitting number as illustrated in FIG. 17, or may use, for each sitting number, a set of a player betting area and a banker betting area as one reading area, and a set of tie betting area, player pair betting area, and a banker pair betting area as one reading area as illustrated in FIG. 18. Further, as illustrated in FIGS. 19 and 22, each side betting area for a tie betting area, a player pair betting area, and a banker pair betting area may be treated as one reading area.

Figure 20:
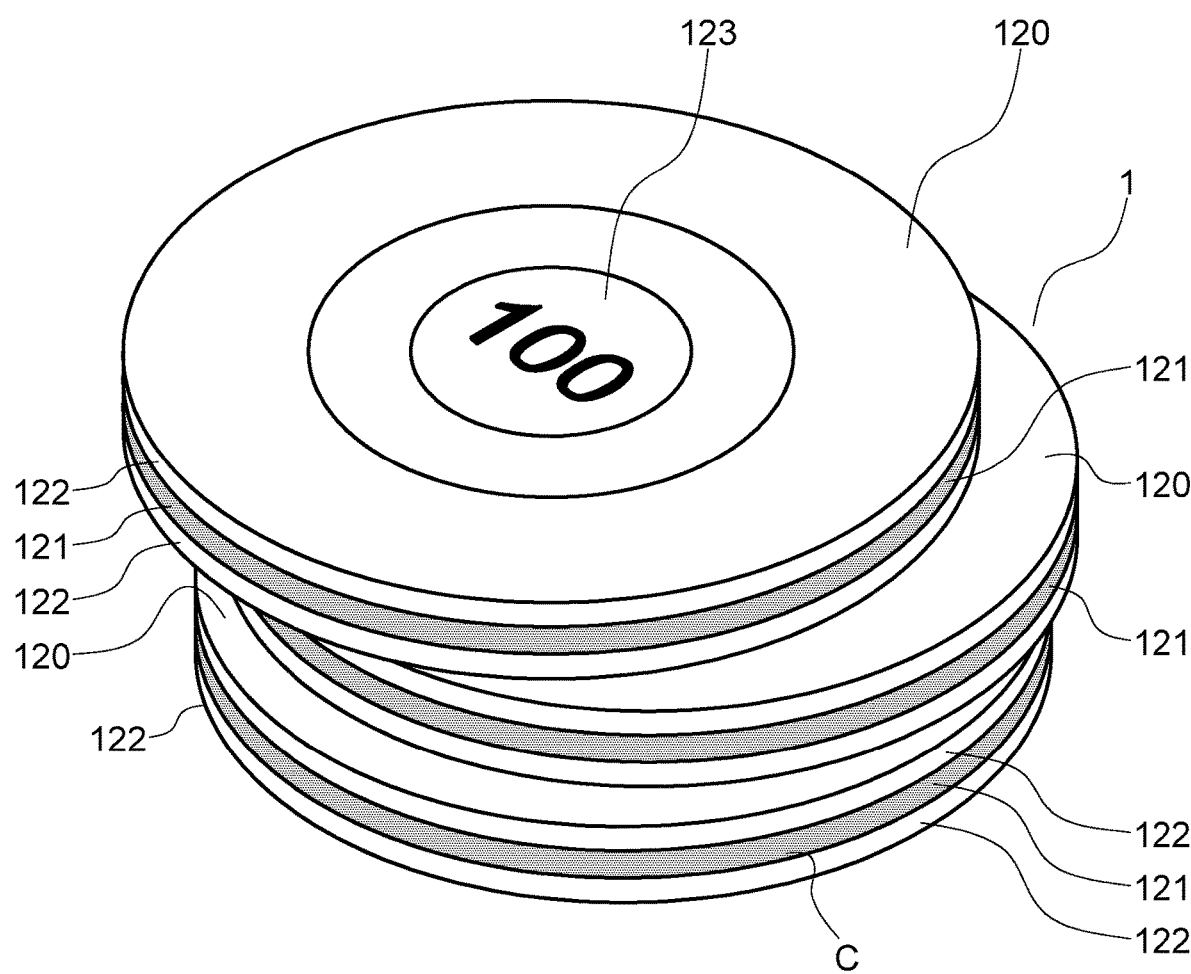
FIG. 20 is a perspective view of a game token according to the embodiment.
Figure 21:
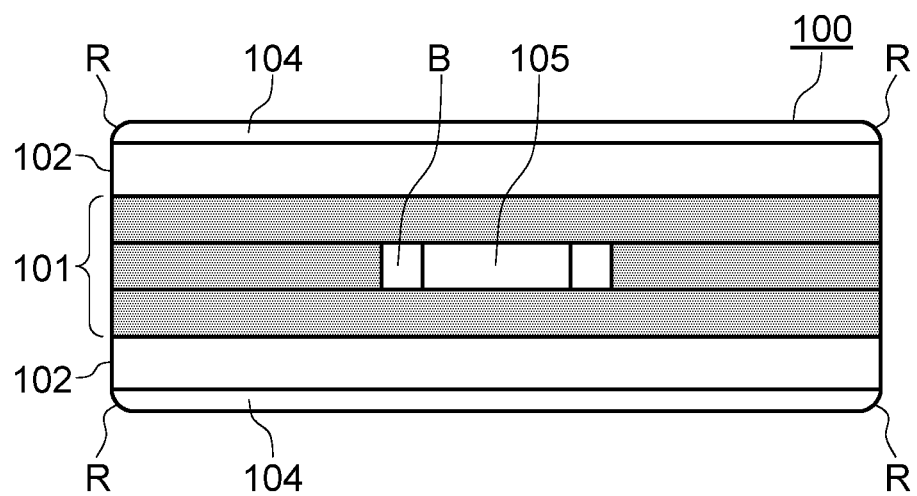
FIG. 21 is a cross-sectional view of the game token according to the embodiment.

A game token 1 used in an embodiment will be described below. FIG. 20 is an external view of and FIG. 21 is a front sectional view of a game token 1 used in this system. The game token 1 has a multi-layer structure in which a plurality of plastic layers in different colors are laminated. The game token 1 includes at least an intermediate color layer 101 and white layers 102 or light color layers on both sides of the color layer 101. The light color layers, which are not illustrated, are required at least to be layers in color lighter than color of the color layer 101. With the multi-layer structure in which the intermediate color layer 101 and the white layers 102 or light color layers, which is not illustrated and required at least to be layers in color lighter than color of the color layer 101, on both sides of the color layer 101 are laminated, as illustrated in FIG. 20, to form a stripe pattern in a lamination direction on a side surface, and different colors (red, green, yellow, blue, or the like) are used for the color layer 101, a type (10 points, 20 points, 100 points, 1,000 points, or the like) of the game token 1 can be identifiable.

As illustrated in FIG. 21, the color layer 101 may be formed of a plurality of colored layers (FIG. 21 illustrates three layers). Because the plurality of the colored layers (three layers in FIG. 21) are thermally press-bonded to one another, three-layer structure is not visible as illustrated in FIG. 21 that illustrates the three layers for description. Furthermore, a bore B is partially provided in a middle of the three layers of the color layer 101, and RFID is embedded therein.

A structure of the game token 1 is not limited to a structure in which plastic is laminated, and may be similar to the color layer 101 in appearance.

A method for analyzing the game token 1 by the image analyzer 2012 will be described below in detail. The image analyzer 2012 analyzes an image recorded on a recorder 11 and recognizes at least two colors, which are a specific color 121 that is at least partially attached to the game token 1 and a reference color R that is present in the image and is different from the specific color 121. Note that the specific color 121 is at least partially provided to a predetermined position of a game token 1 or in a predetermined form. For example, the specific color 121 may be provided as the color layer 101, may be provided on a side surface of the game token 1 in a circumferential direction, or may be provided on a surface of the game token 1 as a predetermined mark. Further, the reference color R may be, for example, a color of a specific area of the game table 2004, or may be a color attached to a place different from the specific color 121 in the game token 1.

The image analyzer 2012 includes an artificial intelligence device 12a that identifies a specific color by, for example, deep learning technology, and determines the number and types of the game tokens 1 placed on the game table 2004. A recognition device 12 may further determine a position of the game token 1 on the game table 2004.

The image analyzer 2012 acquires a plurality of images of the game token 1 and reference color R, which are irradiated with different illuminances, learns the acquired images and a correct specific color 121 and reference color R of the game token 1 in each image as teaching data by teaching from a human, and creates a learning model 13a (recognition program). Note that a relative relation of the specific color 121 and the reference color R can be acquired, because in the images of the game token 1 and the reference color R irradiated with an illuminance of the same condition, the specific color 121 and the reference color R are irradiated with the same illuminance. For example, this relative relation may be used for recognition of the specific color 121.

Further, without using artificial intelligence, a chip recognition device 12 may extract a center line C of the game token 1 with a method for measuring a feature of a shape, brightness, saturation, and hue in the images by using a result of an image analysis of the images captured by a camera 2002 and recorded as images.

Furthermore, the artificial intelligence device 12a is configured to recognize at least two colors of the specific color 121 and the reference color R, which is different from the specific color 121 in a peripheral image of a predetermined range around the extracted center line C, by analyzing the peripheral image, which is for example a range of eight pixels orthogonal to the center line as a center. Note that, the extracted peripheral image of the predetermined range around the center line C may be analyzed as is, or after image processing such as color emphasis and noise reduction so that the specific color 121 can be easily recognized.

In summary, the artificial intelligence device 12a of the recognition device 12 is an artificial intelligence device configured to extract the center line C from the image of the game token 1 and recognize at least two colors of the specific color 121 and the reference color R different from the specific color 121, which are in the peripheral image, by analyzing the peripheral image of the predetermined range around the center line C as a center, and taught, as teaching data, the plurality of peripheral images of the game token 1 and the reference color R irradiated with different illuminances.

In another embodiment, the controller 2014 further includes a function to determine at least one among whether or not: 1) in each game, there is transference of a chip from time of start of drawing cards or start of game operation by the dealer to time before display of a win/loss result of the game by a card distributor, 2) after an end of each game, there is transference of a chip by a person other than the dealer while the dealer is collecting the chips bet by a loser among the game participants, 3) after an end of each game, any chip has been added while the dealer is collecting a chip bet by a loser among the game participants, 4) after an end of each game, the dealer has paid to a position of a chip that a winner among the game participants has bet, and 5) after an end of each game, a winner among the game participants has taken a bet chip and a payed chip.

Further, the controller 2014 may be configured to determine at least one of 1) to 5) described above by detecting transference of hands of the dealer and game participant, transference of chips, or transference of the hands and the chips by using an analysis result from the image analyzer 2012.

As a feature function, the controller 2014 has functions described in 1) to 5) below to determine whether or not there is any wrong against a rule of a baccarat game: 1) In each game, the controller 2014 monitors, by information that the image analyzer 2012 obtains by using the camera 2002, whether or not there is transference of a game token 1 from time of a signal that starts drawing of cards obtained from the card distributor 2003, or time of start of game operation by the dealer 2005 pressing a start button 4s to time before display of a win/loss result of the game by the card distributor 2003; 2) After an end of each game, the controller 2014 monitors, by information that the image analyzer 2012 obtains by using the camera 2002, whether or not a loser 6 has wrongly taken a game token 1 while the dealer 2005 is collecting a game token 1 bet by a loser among game participants 2006; 3) After an end of each game, the controller 2014 monitors, by information that the image analyzer 2012 obtains by using the camera 2002, whether or not a person other than the dealer 2005 (winner or loser) has added a won game token 1W or has replaced the game token 1 to a winning position not bet while the dealer 2005 is collecting a game token 1 bet by a loser among the game participants; 4) After an end of each game, the controller 2014 monitors, by information that the image analyzer 2012 obtains by using the camera 2002, whether or not the dealer 2005 has correctly placed a won game token 1W for payment to a position of the game token 1 that a winner among the game participants 2006 has bet; 5) After an end of each game (the dealer 2005 operates the card distributor 2003 to display a win/loss result in a display lamp 13), the controller 2014 monitors, by information that the image analyzer 2012 obtains by using the camera 2002, whether or not a winner 6W among the game participants 2006 has taken a bet game token 1 and a paid game token 1W.

Note that, in the above embodiment, the image analyzer 2012 and the controller 2014 are devices having an artificial-intelligence utilization structure or deep-learning structure. Specifically, the image analyzer 2012 and the controller 2014 may analyze an image or perform various controls described above by using scale-invariant feature transform (SIFT) algorithm, a convolutional neural network (CNN), deep learning, machine learning, or the like. These technologies perform image recognition of a captured image to recognize an object included in the image. In recent years, in particular, deep learning technology using a multilayered neural networks has been used to recognize an object with high accuracy. This deep learning technology generally recognizes an object with high accuracy by, over a plurality of stages, layering in an intermediate layer between an input layer and an output layer of a neural network. Regarding this deep learning technology, a convolutional neural network, in particular, has drawn attention for having higher performance than a conventional object recognizing method based on an amount of image features.

In a convolutional neural network, a recognition object image to which a label is attached is learned, and a main object included in the recognition object image is recognized. If there are a plurality of main objects in a learning image, learning is performed by designating a region with a rectangle and attaching a label to an image corresponding to the designated region. Furthermore, in a convolutional neural network, it is also possible to determine a main object and position of the object in the image.

To further describe a convolutional neural network, an object recognition process involves extraction of candidate regions based on a local feature by performing edge extraction processing, or the like, on a recognition object image, input of the candidate regions to the convolutional neural network, classification of the candidate regions after extracting feature vectors, and obtainment of a classified candidate region with a highest degree of certainty as a recognition result. A degree of certainty is quantity indicating how much similarity of an object in an image learned together with a certain image region and a label is relatively higher than similarity of another class.

As described above, various embodiments have been described. However, it is needless to say that a device of the present embodiments may be modified by a person skilled in the art as appropriate within the scope of the preset disclosure according to a game to which the present disclosure is applied.

In order to solve the above-described conventional problem, a game token management system according to an embodiment has a configuration in which: a single RFID tag having a data non-rewritable area and a data rewritable area is attached to a game token, the data non-rewritable area of the RFID tag stores, as fixed information, at least one of production information of the game token, product information of the game token, casino information, amount information of the game token, or a serial number of the game token, the data rewritable area stores, as variable information, location information of the game token, and the variable information stored in the data rewritable area can be extracted from the fixed information stored in the data non-rewritable area in an identical RFID tag, and the game token management system further includes: a writer that adds the location information of the game token to the data rewritable area, a reader that can collectively reads the fixed information stored in the data non-rewritable area of the plurality of game tokens and, on the basis of the read fixed information, can read the location information, which is a counterpart of the fixed information and stored in the data rewritable area, and a management controller that examines the location information obtained from the reader, in which the data rewritable area stores a plurality of pieces of location information including at least latest location information among all pieces of location information written by the writer, and the management controller includes a function to determine whether or not any abnormality is present in history of the location information obtained from the reader, and is configured to be able to, if there is abnormality, generate an error signal and identify the fixed information of the game token, which has been determined to be abnormal.

The data rewritable area is configured to store, together with the location information, information of time at which the writer writes to the game token, and the management controller is configured to determine, from the location information obtained from the reader, presence of abnormality by determining whether or not the game token has not been used for a predetermined period since last writing, or whether or not the location information, which is supported to be written, is not written.

In the management controller, the location information may include at least one of information indicating a cage, information indicating entry or exit, or information indicating a backyard, a situation where the game token has not been used for a predetermined period since last writing may be a situation where: 1) latest location information is information indicating a cage, and a predetermined period has passed before next information is written, 2) latest location information is information indicating entry, and a predetermined period has passed before next information is written, or 3) latest location information is information indicating exit, and a predetermined period has passed before next information is written, and a situation where location information, which is expected to be written, is not written may be a situation where: 4) at a time of entry to a gaming hall, information indicating exit is not written as latest location information in the data rewritable area of the game token, 5) at a time of use at the cage, information indicating a backyard is not written, or 6) at a time of exit from the gaming hall, information indicating a cage or a backyard is not written.

The location information may include information about an owner who owns the game token.

The management controller may have a function to determine, on the basis of the owner information obtained from the reader, presence of abnormality when: 1) a person different from a latest owner whose information is stored in the data rewritable area exchanges the game token for cash or another game token in the gaming hall, or exits the gaming hall, or 2) a person different from an owner at a time of exit whose information is stored in the data rewritable area brings the game token in the gaming hall.

The information about the owner of the game token may be identified by face authentication or ID card reading.

The location information may further include information indicating a place of a chip tray of a specific game table, information indicating a place of a betting area, or information indicating a payout area.

The management controller may have a function to determine, on the basis of information indicating location of the chip tray of the game table or information indicating a place of the betting area or of the payout area, which is obtained from the reader, presence of abnormality when: 1) a person different from a latest owner whose information is stored in the data rewritable area uses the game token at a game table, 2) a person different from the person who purchased a game token without a record of use at a game table attempts to exchange the game token at a cage, 3) a game token not including information indicating a cage or a backyard is used in the gaming hall, or 4) latest location information is information indicating a betting area or a payout area, and after a predetermined period has passed, the game token 1 is exchanged for cash at a cage or is used at a game table.

Information that the RFID tag has may be encrypted.

The data non-rewritable area may be configured to be functionally non-writable or locked to disable wiring of data.

The reader may be configured to collectively read the fixed information stored in the data non-rewritable area and location information stored in the data rewritable area, and the management controller may be configured to extract and determine, from the plurality of pieces of fixed information of the plurality of game tokens, which are obtained from the reader, the location information stored in the data rewritable area in an identical RFID tag.

In order to solve the above-described conventional problem, the game token according to an embodiment includes a single RFID tag having a data non-rewritable area and a data rewritable area, in which the data non-rewritable area stores, as fixed information, at least one of production information of the game token, product information of the game token, casino information, amount information of the game token, or a serial number of the game token, the data rewritable area is configured to store, as variable information, location information of the game token written by the writer, and configured to extract the variable information stored in the data rewritable area based on the fixed information stored in the data non-rewritable area in an identical RFID tag.

The game token may be configured to be able to collectively read the fixed information stored in the data non-rewritable area of the plurality of game tokens by a reader, and to read the location information stored in the data rewritable area on the basis of the read fixed information.

In order to solve the above-described conventional problem, the table game management system according to an embodiment includes: a game token to which an individually identifiable RFID is attached, a game table for playing a game by using the game token, a game recorder that records, via a camera, an image of a game token bet by each game participant of a game played at the game table, an image analyzer that performs image analysis on the recorded image of the game token, a chip reader that reads RFID attached to the game token bet by each game participant, and a controller that determines an image analysis result by the image analyzer and a reading result by the chip reader, in which the game table includes a plurality of betting areas including at least a player betting area and a banker betting area for each sitting number, the chip reader reads the game token regarding an entire betting area as one reading area for each sitting number, or reads the game token for each of a plurality of reading areas by dividing the entire betting area into a plurality of reading areas which are less than the number of betting areas, and the controller is configured to be able to determine types and the number of the bet game tokens separately for each betting areas including at least the player betting area and the banker betting area, on the basis of an image analysis result by the image analyzer, determine whether or not a total amount or the total number of the game tokens for each of the sitting numbers or for each of the reading areas based on an image analysis result by the image analyzer agrees with a total amount or the total number of the game tokens for each of the sitting numbers or for each of the reading areas based on a reading result by the chip reader, and output a determination result.

The controller may be configured to be able to output a sitting number with a determination result of disagreed amount or number.

The controller may be configured to be able to generate a signal that indicates a possibility that RFID attached to the game token is broken or RFID is not attached to the game token in a case where a total amount or the total number of the game tokens for each of the sitting numbers based on a reading result of the chip reader is smaller than a total amount or the total number of the game tokens for each of the sitting numbers based on an image analysis result by the image analyzer.

The controller may further be configured to be able to generate a signal that indicates a possibility of a reading error by the image analyzer reading the game token in a case where the total amount or the total number of the game tokens for each of the sitting numbers based on a reading result of the chip reader is larger than the total amount or a total number of the game tokens for each of the sitting numbers based on an image analysis result by the image analyzer.

The table game management system may include a database storing an ID of RFID attached to the game token, and the controller may be configured to be able to check an ID of RFID based on a reading result by the chip reader with an ID stored in the database, determine authenticity of the game token, and output a determination result.

The table game management system includes: a chip tray that keeps a game token used by a dealer at a game table, a chip tray determination device that can determine types and the number of the game tokens contained in the chip tray, and a game result determination device that determines a game result of each game at the game table, in which the controller may include: a calculation function that calculates income and outgo at a game table for a casino, at every collection and redemption for each game by using a measurement result of positions, an amount, and the number of game tokens based on a game result obtained from the game result determination device and an image analysis result by the image analyzer, a collection determination function that, after collection of lost chips bet by each game participant, compares an amount of chips at the game expected to be collected, which is calculated from positions, types, and the number of chips bet by each game participant at the game table, and the game result with an amount of actually collected chips in the chip tray, and determines whether or not there is a difference between the amount of the chips expected to be collected and the amount of the actually collected chips to determine whether or not there has been any wrong or an error with the collection of the game token, and a redemption determination function that performs redemption for a chip expected to be redeemed, compares, after the redemption, a total amount of chips expected to be in the chip tray based on an amount of the chips to be redeemed in the game, which is calculated from positions, types, and the number of chips bet by each game participant at the game table, and the game result, with an actual total amount of chips in the chip tray, and if having determined that there is a difference between the expected total amount and the actual total amount, determines that there has been a wrong or an error with the redemption.

The controller may be configured to identify the collected game token for each sitting number on the basis of information of an ID of RFID of the collected game token determined by the chip tray determination device and information of an ID of RFID of the game token read by the chip reader, compare, IDs, an amount, or the number of the identified game tokens with IDs, an amount, or the number of the game tokens expected to be collected for each sitting number, which has been determined by using a measurement result of positions, an amount, or the number of the game tokens based on a game result obtained from the game result determination device and an image analysis result by the image analyzer, and determine whether or not the IDs, an amount, or the number of the identified game tokens agrees with the IDs, an amount, or the number of the game tokens expected to be collected for each sitting number.

The controller may be configured to be able to determine, at each game, a type of the game token classified by application or purpose of use on the basis of information of ID of RFID of the game token read by the chip reader, and store, for each sitting number, an amount of the bet game tokens or an amount of the collected or redeemed game tokens by the type.

The controller may be configured to be able to store a cumulative amount of the game tokens bet by type or a cumulative amount of the collected or redeemed game tokens for each sitting number in a plurality of games.

A type of the game token may be at least a cash chip, a rolling chip, or a promotion chip.

The controller may be configured to be able to identify an owner on the basis of ID information of the rolling chip and store a cumulative amount of bet, collected, or redeemed rolling chip for each owner.

The chip reader may be configured to read the game token for redemption placed on the chip reader for each sitting number, and the controller may be configured to be able to compare an amount of redemption, which is determined by using a measurement result of a position, an amount, and the number of the game tokens based on a game result obtained from the game result determination device and an image analysis result by the image analyzer, with an amount of the game tokens placed for each sitting number, which is based on the reading result by the chip reader, determine whether or not the amount of the redemption agrees with the amount of the game tokens placed for each sitting number, and output a determined result.

Further, the controller may be configured to be able to display disagreement in a case where a determination result of the redemption disagrees, perform determination again in a case where there has been any change in amount of the game tokens placed on and read by the chip reader for each sitting number, and output agreement or disagreement again.

The controller may be configured to be able to compare an amount of the game tokens placed for redemption for each sitting number with increase or decrease in amount of the game tokens in the chip tray from before redemption to after the redemption and determine whether or not there is a difference.

The chip reader may include a payment confirmation area, which is arranged on a dealer side of the betting area, for placing the game token for redemption.

The table game management system may further include a game participant identification unit using a face authentication system or a player ID card, and the controller may be configured to be able to associate the sitting number with information of the game participant identified by the game participant identification unit.

A display unit that displays based on output of the controller may be included.

The game table may include a side betting area, in which the side betting area may be adjacently provided with a betting area for each sitting number, the chip reader may be able to collectively read at least one side betting area, and the controller may be configured to be able to determine types and the number of the game tokens bet at least one side betting area on the basis of an image analysis result by the image analyzer, determine whether or not a total amount or the total number of the game tokens in at least one side betting area based on an image analysis result by the image analyzer agrees with a total amount or the total number of the game tokens in the side betting area based on a reading result by the chip reader, and output a signal of a determination result.

Another embodiment is a table game management system including: a game token to which an individually identifiable RFID is attached, a game table for playing a game by using the game token, a game recorder that records, via a camera, an image of a game token bet by each game participant of a game played at the game table, an image analyzer that performs image analysis on the recorded image of the game token, a chip reader that reads RFID attached to the game token bet by each game participant, and a controller that determines an image analysis result by the image analyzer and a reading result by the chip reader, in which the game table includes a betting area including a player betting area, a banker betting area, and a side betting area, the side betting area is adjacently provided with a betting area for each sitting number, the chip reader is able to collectively read at least one side betting area, and the controller is configured to be able to determine types and the number of the bet game tokens separately for at least one side betting area on the basis of an image analysis result by the image analyzer, determine whether or not a total amount or the total number of the game tokens for at least one side betting area based on an image analysis result by the image analyzer agrees with a total amount or the total number of the game tokens of the side betting based on a reading result by the chip reader, and output a signal of a determination result.

The controller may be configured to be able to output the side betting with a determination result of disagreeing amount or number.

The controller may be configured to be able to generate a signal that indicates a possibility that RFID attached to the game token is broken or RFID is not attached to the game token in a case where a total amount or the total number of the game tokens for each side betting based on a reading result of the chip reader is smaller than a total amount or the total number of the game tokens for each side betting based on an image analysis result by the image analyzer.

The controller may be configured to be able to generate a signal that indicates a possibility of a reading error by the image analyzer reading the game token in a case where a total amount or the total number of the game tokens for each side betting based on a reading result of the chip reader is larger than a total amount or the total number of the game tokens for each side betting based on an image analysis result by the image analyzer.

The controller may include a database storing ID of RFID attached to the game token and may be configured to be able to check an ID of RFID based on a reading result by the chip reader with an ID stored in the database, and determine authenticity of the game token.

The controller may be configured to be able to identify the collected game token for each side betting on the basis of information of an ID of RFID of the collected game token determined by the chip tray determination device and information of an ID of RFID of the game token read by the chip reader, compare IDs, an amount, or the number of the game tokens expected to be collected for each side betting, which has been determined by using a measurement result of positions and an amount of the game tokens based on a game result obtained from the game result determination device and an image analysis result by the image analyzer, with IDs, an amount, or the number of the game tokens collected for each side betting, and determine whether or not a collecting amount agrees for each side betting.

The following is a description of the fourth embodiment of the present invention.

Figure 23:
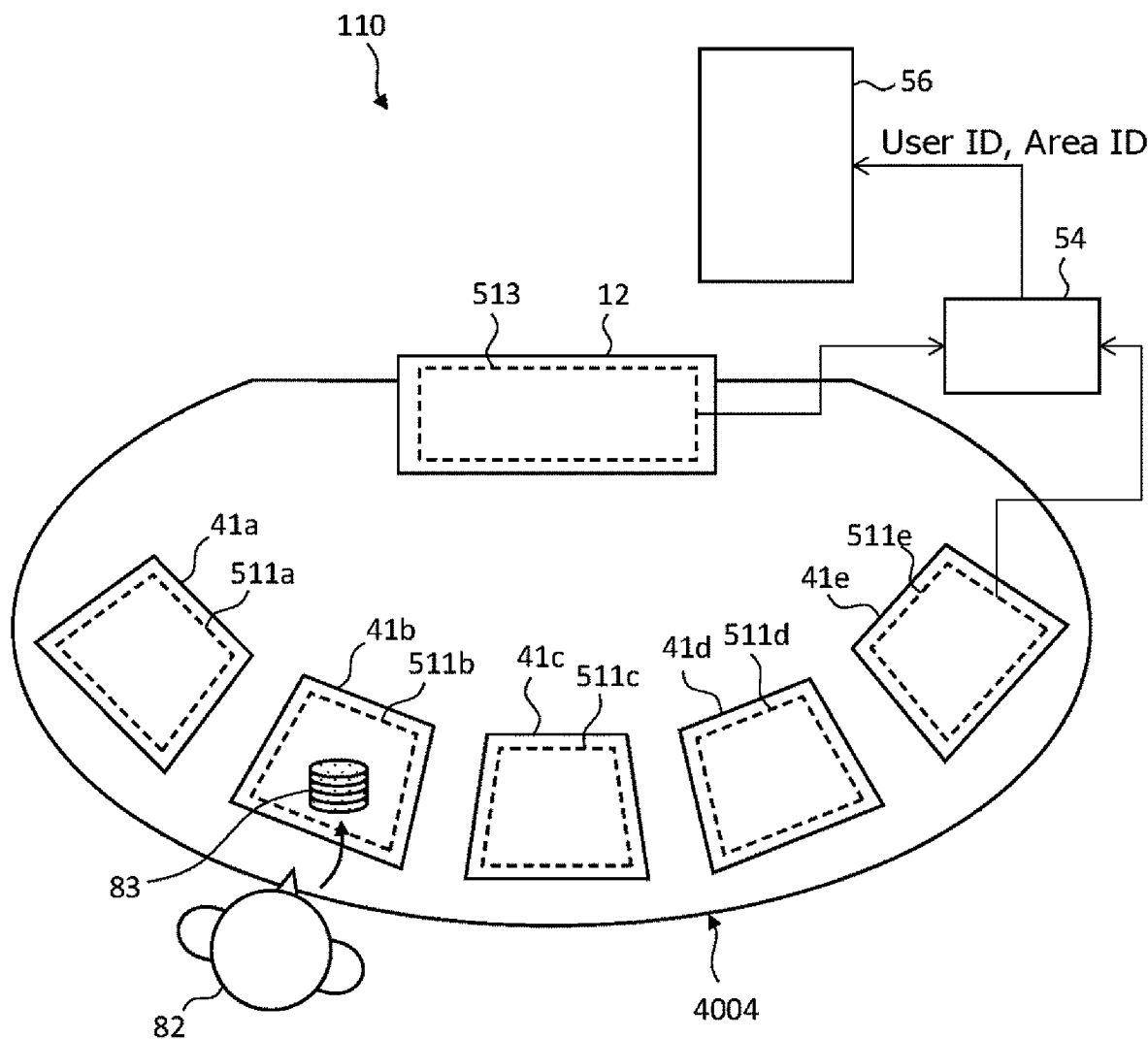
FIG. 23 is the configuration of the management system according to a first example of a fourth embodiment.

FIG. 23 shows the configuration of the management system of the first example of the fourth embodiment of the present invention. The management system 110 traces the holders of game tokens without using a database. For this purpose, the information of the holder is stored in the game token. The management system 110 has a roughly oval-shaped game table 4004. The player 82 is located on one side of the table (lower side in FIG. 23), and the dealer (omitted) is located on the other side. On the top surface of the game table 4004, betting areas 41a to 41e (hereinafter collectively referred to as "betting areas 41") are laid-out for each of multiple playing positions. Betting area 41 is an area for players 82 to bet by placing game tokens 83. A chip tray 12 is provided on the dealer position side of the game table 4004 for placing the dealer's game tokens 82.

The game token 83 has the same configuration as the game token in the form described above. The RFID tag 2 has a non-rewritable area 21 for storing the fixed information 3 and a rewritable area 22 for storing the variable information 4. The RFID tag 2 stores a chip ID (identification information) that uniquely identifies the game token 83 as unique information 3. The RFID tag 2 stores, as unique information 3, a chip ID (identification information) that uniquely identifies the holder of the game token 83 as variable information 4.

In addition, a common user ID is assigned to the casino or dealer, and when the game token 83 is owned by the casino (including when it is stored in the chip tray 12), the user ID indicating the casino or dealer is stored in the variation information 4.

In each of the betting areas 41a to 41e of the game table 4004, RFID antennas 511a to 511e (hereinafter collectively referred to as "RFID antennas 511") are provided. Specifically, the RFID antennas 511 are embedded under a raxa (woolen cloth) of the game table 4004, respectively, where the corresponding betting areas 41 are demarcated. RFID antennas 513 are also provided on the chip tray 12.

The RFID antenna 511 reads and writes data to the RFID tags 2 embedded in the game tokens 83 placed in the corresponding betting area 41. The RFID antenna 513 reads and writes data to the RFID tags 2 embedded in game tokens 83 placed on the chip tray 12.

The RFID antennas 511a-511e and the RFID antenna 513 are connected to the RF control device 54. In FIG. 23, only the line connecting antenna 511e and RF control device 54 is shown, and the line connecting antennas 511a-511d and RF control device 54 is omitted for the sake of clarity of the figure, but antennas 511a-511d are also connected to RF control device 54 in the same way as antenna 511e. The RF control device 54 performs read and write control for each antenna. For this purpose, each antenna is assigned an area ID that uniquely identifies the area to be read and written by that antenna. When reading, the RF control device 54 performs reading periodically.

By referring to this area ID, it is possible to identify whether the game token 83 that is read is in the chip tray 12 or in the betting area 41, and for the betting area 41, it is also possible to identify which betting area 41a to 41e is for which playing position.

When reading, the RF control device 54 receives from each antenna the data read by that antenna, and also identifies which area the data was read in, i.e., the area ID. In addition, when writing, the RF control device 54 identifies the antenna to be written, i.e., the area ID, and transmits the data to be written. This allows the RF control device 54 to control reading and writing for each antenna individually.

Based on the data read at each antenna, the RF control device 54 outputs the user ID ("User ID" in FIG. 23) of the game token 83 and the area ID ("Area ID" in FIG. 23) of the area where the user ID was read. The management system 110 further has a management control device 56 connected to the RF control device 54. The management control device 56 receives the user ID and area ID from the RF control device 54, and specifies the user ID to be written on the RFID tag 2 to the RF control device 54.

As explained below, the user ID stored in the RFID tag 2 of the game token 83 is changed as the game token 83 is moved, but the RFID tag 2 stores not only the latest user ID but also the past user IDs as variation information 4. Therefore, by referring to this variation information 4, it is possible to examine the change in the holder of each game token 83. In the following explanation, expressions such as "rewriting the user ID" mean changing at least the latest user ID, and do not necessarily mean simultaneously erasing the information on past user IDs.

The management control device 56 updates the variation information 4 of the game token 83 based on the data (user ID and area ID) of the game token 83 received from the RF control device 54. The method of updating the variation information 4 is described below.

Figure 26:
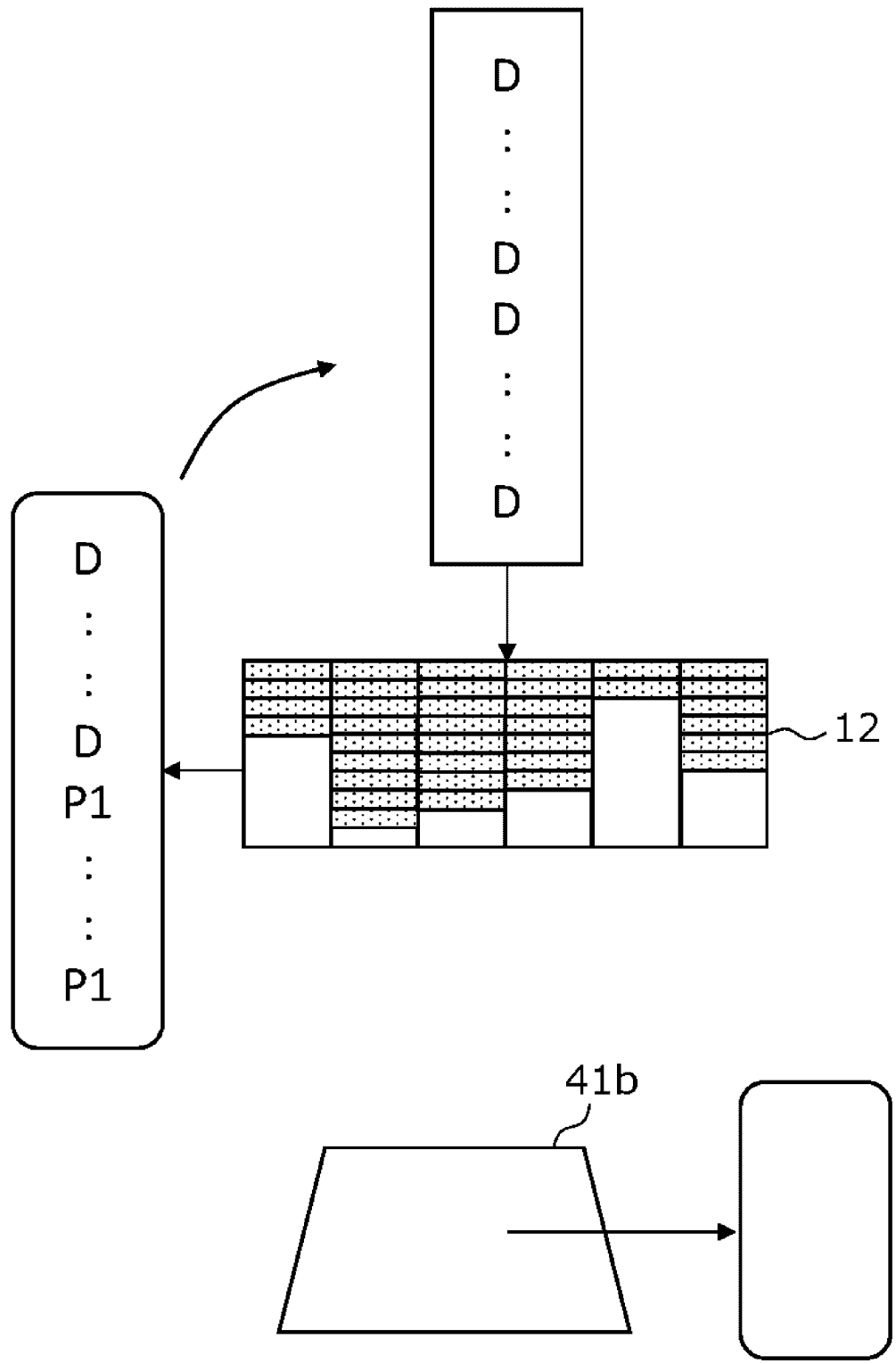
FIG. 26 shows an example of updating the variation information according to the first example of the fourth embodiment.

FIGS. 24 to 26 illustrate examples of updating the variation information. As shown in FIG. 24, a player bets game tokens 831 in the betting area 41b. The user IDs of the bet chips 831 and the area ID of its betting area 41b, obtained by reading the RFID tags 2 of the bet chips 831 (hereinafter referred to as "bet chip 831"), are input to the management control device 56.

At the stage of betting, as shown in FIG. 24, the same user ID (in the example of FIG. 24, "P1") is read from the betting area 41b, and the same ID (in the example of FIG. 24, "D" indicating that the holder is a casino or dealer) is read from the chip tray 12. If the player wins the game, the dealer pays out (redeems) the game tokens (hereinafter referred to as "payout chips 832") from the chip tray 12 to be placed next to the bet chips 831 in the betting area 41b, as shown in FIG. 25.

Then, "D" as well as "P1" will be read from the betting area 41b as the user ID. If there are two types of user IDs of game tokens 83 read from the same betting area 41, and one of them is "D" and the other one is the user ID assigned to the player, the management control device 56 changes the user IDs of all game tokens 83 in the betting area 41 to the user ID assigned to the player ("P1" in the case of FIG. 25). In this case, the same "P1" is further written as the latest user IDs in the bet chips 831 in which "P1" was stored as the user ID.

On the other hand, if the player loses the game, the bet chips 831 are collected by the dealer into the chip tray 12, as shown in FIG. 26. Then, "P1" as well as "D" will be read from the chip tray 12 as the user ID. If there is a user ID assigned to a player ("P1" in the example of FIG. 26) other than "D" in the user IDs of the game tokens 83 read from the chip tray 12, the management control device 56 rewrites the user IDs of all the game tokens 83 in the chip tray 12 to "D."

In addition, a collection float for temporarily storing the game tokens 83 collected in the chip tray 12 may be provided, and an antenna for the collection float may be separated from the antennas for other parts, so that the above process is performed only for the game tokens 83 collected in the collection float.

By the above process of the management control device 56, the user ID stored in the game token 83 is updated according to the change in the actual holder. In other words, in this embodiment, the user ID is stored in the RFID tag 2 of the game token 83 and the user ID is updated for the payout chip 832 so that it is the same holder as the holder of the bet chip 831. This makes it possible to trace the transition of the holder due to the game played on the game table 4004 without using the database or the player identification system described below, and without the management control device 56 having to keep track of the progress of the game (betting phase, game phase, and settlement phase).

When a player purchases a new game token 83, the player is identified using the player identification system described below, and the user ID of the casino or dealer is rewritten to the user ID of the identified player before the game token 83 is given to the player. In addition, when the player redeems the game token 83, the user ID of the game token 83 given by the player is rewritten to the user ID of the casino or dealer.

Figure 27:
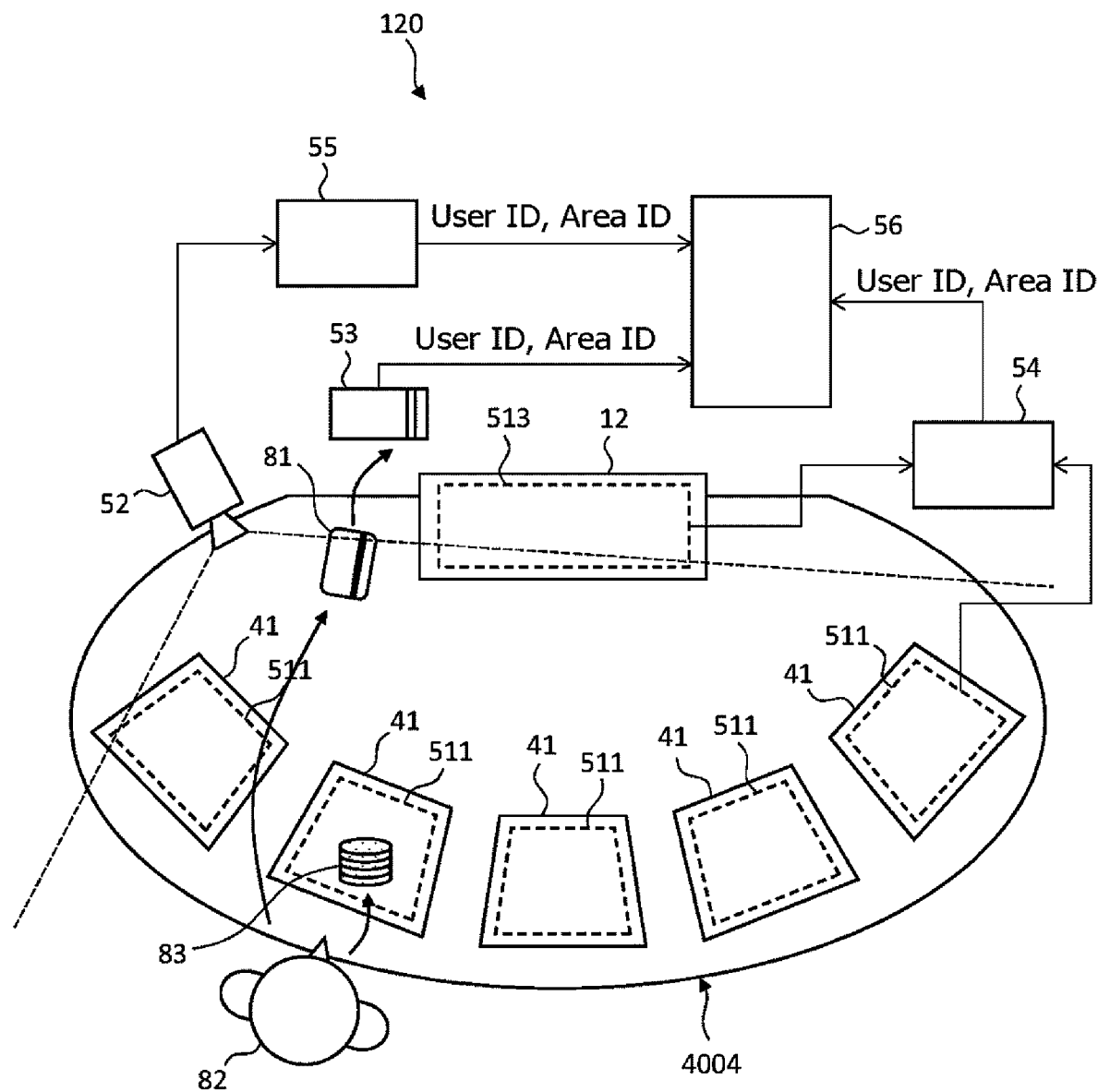
FIG. 27 shows the configuration of management system according to a second example of the fourth embodiment.

FIG. 27 shows the configuration of the management system of the second example of the fourth embodiment. In the management system 120, a player identification system is introduced in addition to the configuration of the management system 110 of the first example. The player identification system may be either an image recognition system comprising a camera 52 and an image recognition device 55 or a card authentication system comprising a card 81 and a card reader 53.

The camera 52 photographs the face of a player 82 positioned in a playing position and outputs the image generated by the photographing to the image recognition device 55. The image recognition device 55 is equipped with a face recognition engine based on a neural network that has learned the face images of a plurality of pre-registered players 82 (hereinafter referred to as "members"). By inputting a face image from the camera 52 into the neural network, the image recognition device 55 identifies which of the registered members the input face image is. If the image from the camera 52 is not the face image of any of the registered members, the image recognition device 55 outputs the result that the face image is the face image of a non-member.

The image recognition device 55 also identifies the playing position of the member in question based on the position in the image where the face was recognized. The image recognition device 55 outputs the area ID ("Area ID" in FIG. 27) of the identified playing position along with the user ID ("User ID" in FIG. 27) of the member corresponding to the image from the camera 52. If the image recognition device 55 is unable to identify any of the members, it outputs "Unknown" as the user ID.

The card reader 53 scans the member's card 81 handed from the player 82 to the dealer, and reads the information stored in the member's card 81. The member's card 81 is a magnetic card on which a magnetic stripe is formed, and the magnetic stripe stores at least the user ID of the player 82 (member). When the dealer receives the member's card 81 from the player 82, the dealer scans the member's card 81 using the card reader 53 and inputs the playing position of the player 82 into the card reader 53. The card reader 53 outputs the user ID ("User ID" in FIG. 27) read from the member's card 81 and the area ID ("Area ID" in FIG. 27) of the playing position entered by the dealer.

The user ID and the area ID stored in the game token 83 and read using the antenna 511 are input to the management control device 56 from the RF control device 54, the user ID and the area ID identified based on the face image of the player are input from the image recognition device 55, and the user ID obtained by reading the member's card 81 and the area ID specified by the dealer are input from the card reader 53.

If the user ID read from the antenna 511, i.e., the user ID stored as the holder of the game token 83 that is bet in the betting area 41 and the user ID read from the member's card 81 or user ID identified by the image recognition device 55, i.e., the user ID identified by the player identification system do not match for the same area ID, the management control device 56 controls the RF control device 54 to rewrite the user ID stored as the holder in the variable area 4 of the game token 83 bet in the betting area 41 to the user ID of the player identified by the player identification system.

The RF control device 54 uses the antenna 511 to write the user ID of the player identified by the player identification system in the rewritable area 22 of the RFID tag 2 of the game token 83 placed in the betting area 41. At this time, the RF control device 54 also records in the writable area 22 that the user ID as holder information has been rewritten due to a mismatch in the user ID. This allows the casino or dealer to know that there has been a discrepancy in the holder by referring to the history of the change of the holder when the casino or dealer acquires the game token 83, and it is also possible to identify the player who was involved in such a discrepancy.

In the player identification system, only one of the identification of the player by the face recognition system and the identification of the player by reading the member's card 81 may be performed. In other words, the registered members do not necessarily have to be identified by the member's card 81 when they arrive at the playing position, in which case the player is identified only by the face recognition system. In such a case, the player is identified only by the face recognition system. Also, even if the player's face cannot be photographed properly and face recognition cannot be performed, the player may be identified by the member's card 81.

In addition, the player may be identified by both face recognition and the member's card 81. In this case, the user ID of the player identified by face recognition and the user ID of the player identified by the member's card 81 may differ. If the user ID of either of them matches the user ID read from the game token 83, the management control device 56 controls the RF control device 54 to write the user ID of the one that does not match the user ID read from the game token 83 in the writable area 22 of the game token 83. In the case of a player who has not been identified by the player identification system, the player identification system shall record the fact that there was a discrepancy in the identification of the player.

In this example, as in the first example, the user ID stored in the game token 83 is updated according to the actual holder. Furthermore, in this example, when the user ID of the player identified by the player identification system and the user ID stored in the game token 83 do not match, the discrepancy is corrected and the fact that there was such a discrepancy is recorded in the game token 83. Therefore, by referring to this record of the game token 83, it can be known that there has been a transfer of the game token 83 between players, and the player involved can be identified.

When redeeming a game token 83, if the user ID of a player (user who intends to redeem) identified by face recognition or a member's card 81 by using a player identification system described above differs from the user ID stored in the game token 83 to be redeemed, an alarm to notice such a discrepancy may be output and the operator may not approve the redemption.

Figure 28:
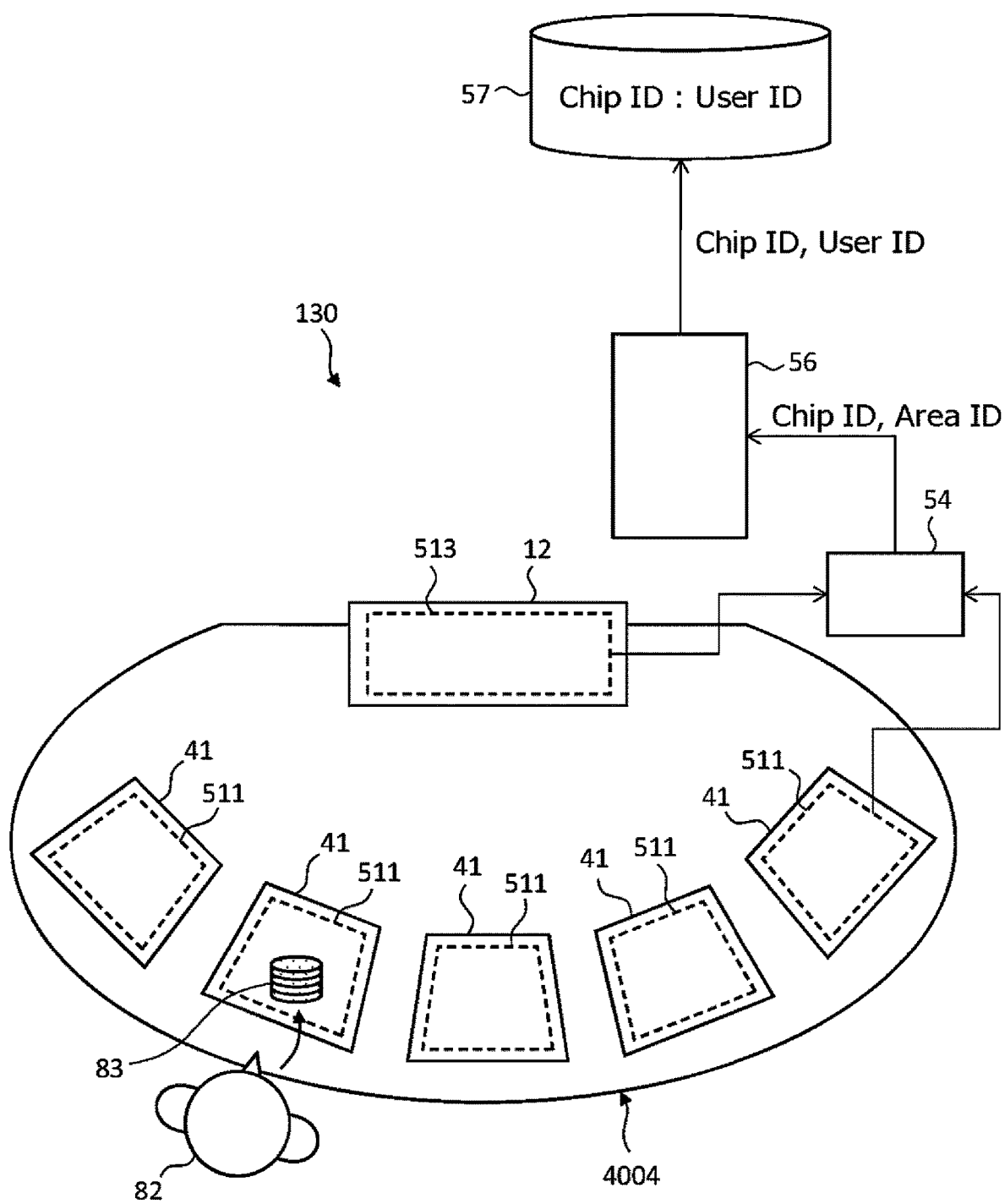
FIG. 28 shows the configuration of the management system of a third example according to the fourth embodiment.

FIG. 28 shows the configuration of the management system of the third example of the fourth embodiment. The management system 130 has a database 57 in addition to the configuration of the management system 110 of the first example. In the database 57, a chip ID ("Chip ID" in FIG. 28) that uniquely identifies the game token 83 and a user ID of a player who possesses the game token 83 are associated and stored. As described above, the holder changes as the game token 83 is purchased, used in games, and redeemed, and the history of past holders is recorded in the database 57. Therefore, by referring to the database 57, it is possible to know the change in the holder of each game token 83s.

In this example, the game token 83 need only have a non-writable area 21 and need not have a writable area 22. In other words, it is sufficient that the game token 83 has at least a chip ID stored in it. In addition, the RF control device 54 need not have the function of writing, and may be an RF reader having only the function of reading.

The management control device 56 updates the database 57 based on the data (chip ID and area ID) of the game token 83 received from the RF control device 54. The method of updating the database 57 is described below.

Figure 29:
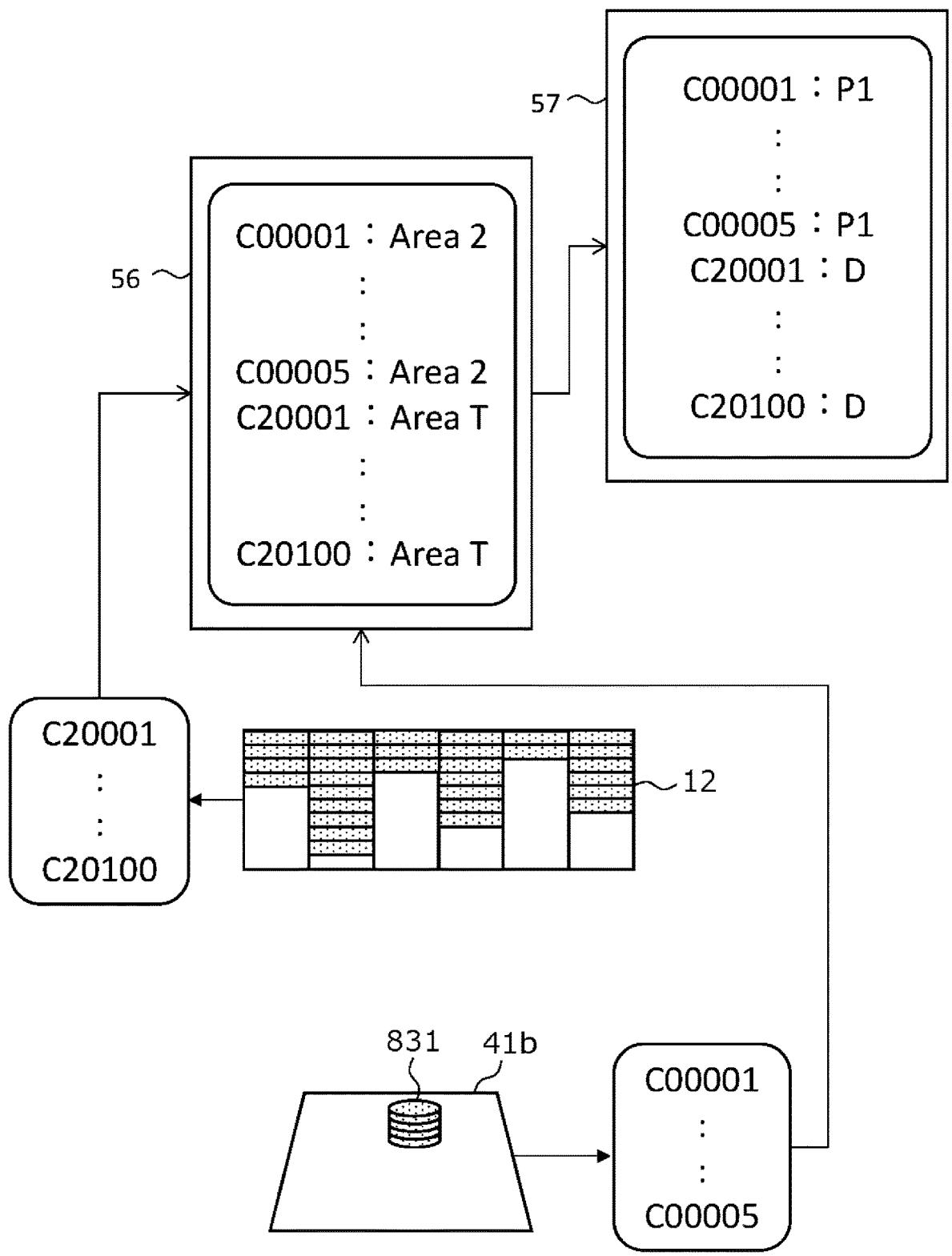
FIG. 29 shows an example of updating the database according to the third example of the fourth embodiment.
Figure 30:
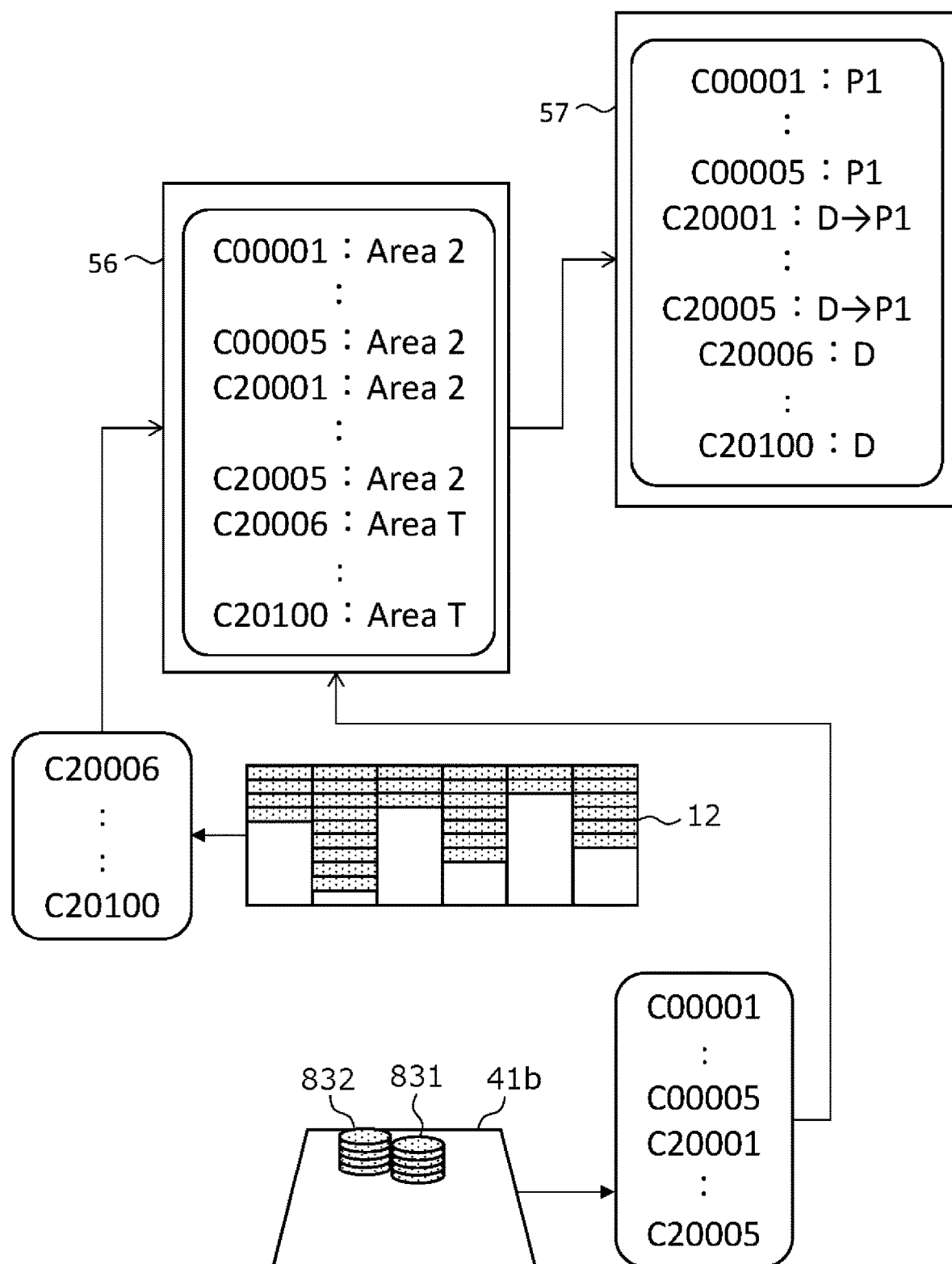
FIG. 30 shows an example of updating the database according to the third example of the fourth embodiment.
Figure 31:
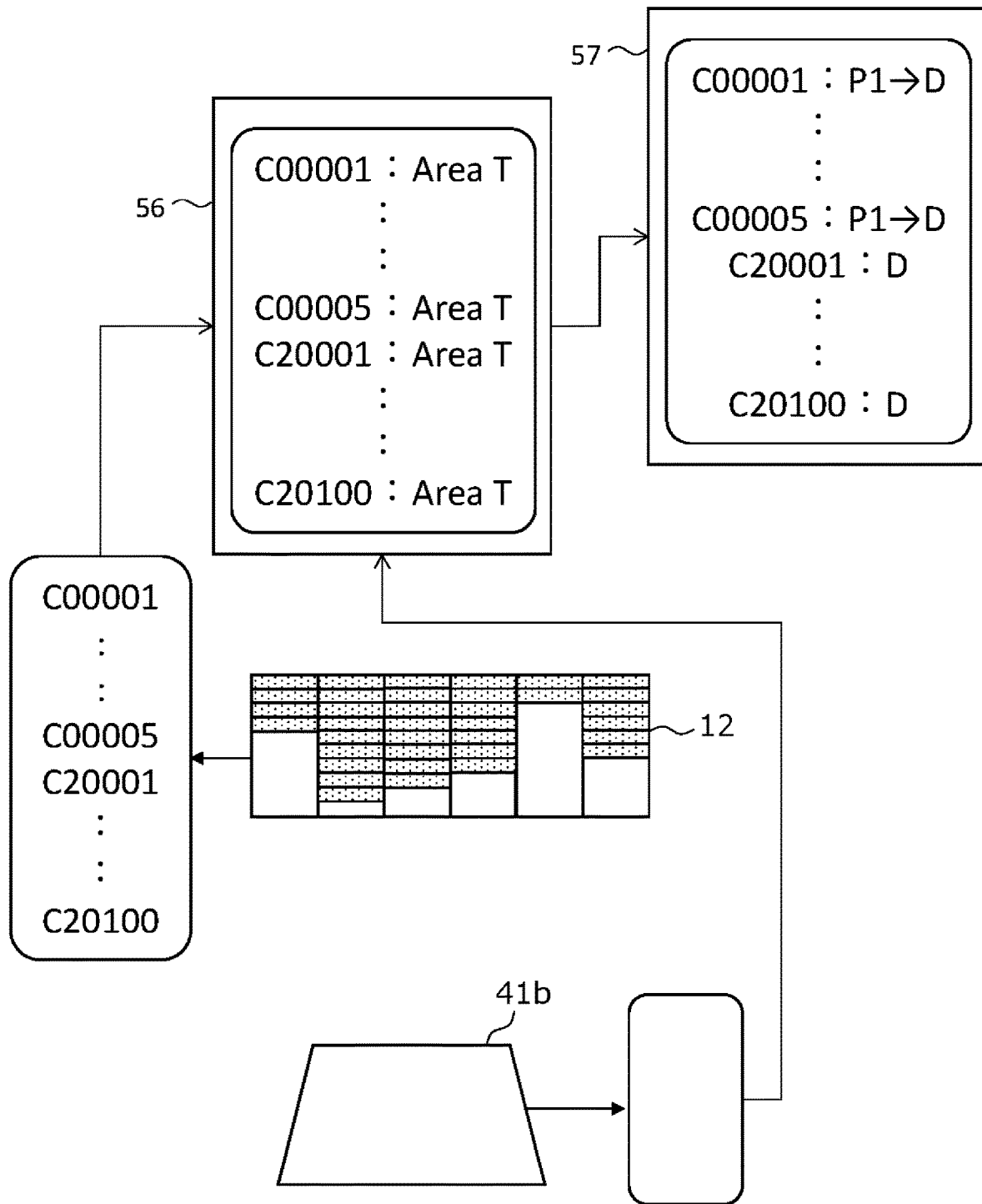
FIG. 31 shows an example of updating the database according to the third example of the fourth embodiment.

FIGS. 29 to 31 illustrate examples of updating the database 57. As shown in FIG. 29, a player bets 831 game tokens in the betting area 41b. The chip ID of the bet chip 831 and the area ID of the betting area 41b thereof, obtained by reading the RFID tag 2 of the bet chip 831 bet by the player in the betting area 41b, are input to the management control device 56.

At the stage of betting, as shown in FIG. 29, "C00001" to "C00005" are read from the betting area 41b as the chip IDs, and "C20001" to "C20100" are read from the chip tray 12 as the chip IDs. The RF control device 54 then outputs the pairs of the chip IDs read by the antennas 511 and 513 and the area IDs corresponding to the antennas 511 and 513 to the management control device 56. In the example of FIG. 29, the RF control device 54 obtains the combination of the chip IDs "C00001" to "C00005" and the area ID "Area 2," and the combination of the chip IDs "C20001" to "C20100" and the area ID "Area T" (area ID representing the chip tray 12), and outputs those to the management control device 56.

If this player wins the game, the payout chips 832 are paid out (redeemed) from the chip tray 12 by the dealer and placed next to the bet chips 831 in the betting area 41b, as shown in FIG. 30. Then, the RF control device 54 obtains the combination of the chip IDs "C00001" to "C00005" and "C20001" to "C20005" with the area ID "Area 2," and the combination of the chip IDs "C20006" to "C20100" with the area ID "Area T," and output those to the management control device 56.

The management control device 56 refers to the database 57 for all the read chip IDs to obtain the user ID associated with the chip ID. Then, the management control device 56 refers to the combination of chip ID and area ID obtained from the RF control unit 54 and updates the database 57 if the user IDs associated with multiple chip IDs with the same area ID are different from each other to make those user IDs the same user ID.

Specifically, if there is a player's user ID and a casino or dealer's user ID as the user IDs of multiple game tokens 83 read with the area ID of the same betting area 41, the management control unit 56 rewrites the casino or dealer's user ID to the player's user ID to unify the user IDs associated with the chip IDs paired with the same area ID.

On the other hand, if the player loses the game, the dealer collects the bet chips 831 in the chip tray 12, as shown in FIG. 31. The RF control device 54 reads the chip IDs "C20001" to "C20100" and "C00001" to "C00005" from the chip tray 12 as well as the area IDs "C20001" to "C20100" and "C00001" to "C00005. The RF control device 54 obtains pairs of these chip IDs "C20001" to "C20100" and "C00001" to "C00005" and the area ID "Area T" of the chip tray 12, and outputs those to the management control device 56.

The management control device 56 refers to the database 57 for all the read chip IDs to obtain the user ID associated with the chip ID. Then, the management control device 56 refers to the combination of chip ID and area ID obtained from the RF control unit 54 and updates the database 57 if the user IDs associated with multiple chip IDs with the same area ID are different from each other to make those user IDs the same user ID.

Specifically, if there is a player's user ID and a casino or dealer's user ID as the user IDs of multiple game tokens 83 read with the area ID of the same betting area 41, the management control unit 56 rewrites the player's user ID to the casino or dealer's user ID, thereby changing the user ID of all chip IDs associated with the area ID of the chip tray to the casino or dealer's user ID.

By the above process of the management control device 56, the user ID stored in the database 57 is updated according to the actual holder. In other words, in this embodiment, the database 57 is rewritten to unify the user IDs of game tokens 83 associated with different user IDs in the same area with one of the user IDs, depending on the area. Thus, without using the player identification system described above and without the management control device 56 having to keep track of the progress of the game (betting stage, game stage, and settlement stage), the transition of the holder due to the game played on the game table 4004 can be traced.

In the above example, the management control unit 56 determined that the chips those were read in the betting area 41 and whose user IDs was "D" in the database 57 are the payout chips 831, and rewrote its user ID to the player's user ID. Alternatively, the chip IDs of the payout chips 832 may be identified based on the difference in chip IDs read from the chip tray 12 before and after the payout.

For example, in the examples of FIGS. 29 and 30, before the payout, as shown in FIG. 29, chip IDs "C20001" to "C20100" are read from chip tray 12, whereas after the payout, as shown in FIG. 30, chip IDs "C20006" to "C20100" are read from the chip tray 12, as shown in FIG. 30. Therefore, the management control device 56 can determine that chip IDs "C20001" to "C20005" have been paid out based on the difference.

Figure 32:
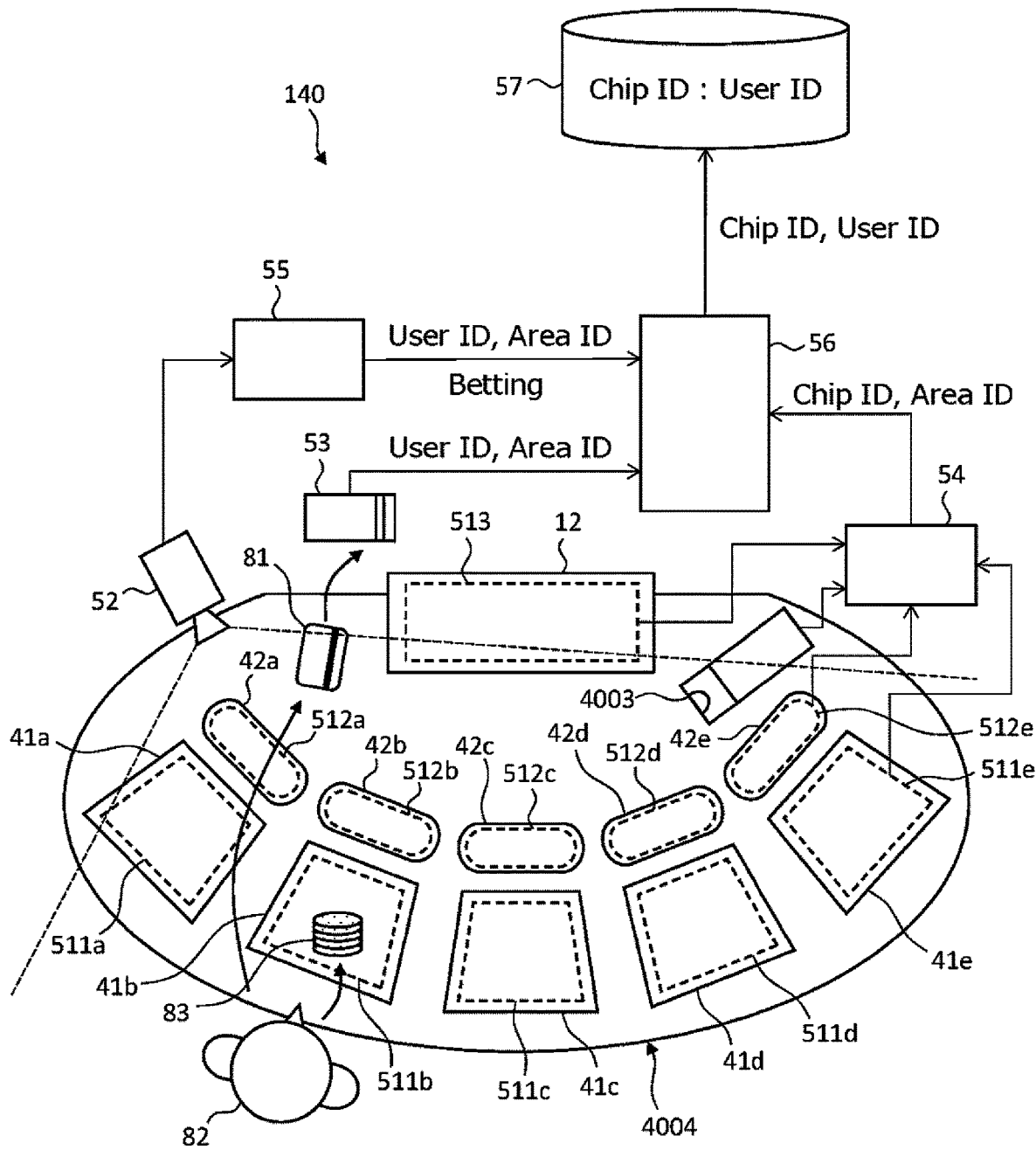
FIG. 32 shows the configuration of the management system according to a fourth example of the fourth embodiment.

FIG. 32 shows the configuration of the management system of the fourth example of the fourth embodiment. In addition to the configuration of the management system 110 of the first example, the management system 140 has a player identification system, a database 57, and a card distribution device (electronic shoe) 4003. In a game table 4004, pay areas 42a to 42e (hereinafter collectively referred to as "pay area 42") are provided on the dealer side from the betting area 41 of each playing position. In addition, antennas 512a to 512e (hereinafter collectively referred to as "antennas 512") are provided in pay areas 42a to 42e, corresponding to the respective areas.

When the dealer pays out (redeems) game token 83 to a player 82 who has won a game, the dealer positions the game tokens 83 taken from the chip tray 12 in the pay area 42 of the winning player 82 and then places it in the betting area 41 of that player 82.

The camera 52 in this example takes a picture of the player 82 as well as the bet chips 831 that have been bet in the betting area 41. The image recognition device 55 performs image recognition processing not only on the player's face but also on the bet chips 831 in the betting area 41, and recognizes which betting target (player, banker, tie, player pair, banker pair, etc.) the bet chips 831 in each betting area 41 have been bet on in the betting area 41. The system recognizes which bet chips 831 in each betting area 41 are wagered on which betting target (player, banker, tie, player pair, banker pair, etc.) in the betting area 41, and outputs the recognition result as the betting contents ("Betting" in FIG. 32).

A camera for capturing the face of the player 82 and a camera for capturing the bet chip 831 may be separate cameras. Also, an image recognition device for identifying the player based on the image of the player's face and the image recognition device for recognizing the bet contents based on the image of the bet chip 831 may be separate devices.

In this example, the card distribution device 4003 determines the progress of the game (i.e., whether the game is in betting, in game, or in settlement) and outputs it to the RF control device 54. The card distribution device 4003 determines that the game has started when the first card is drawn, and determines that the game has ended based on the reading of the drawn card according to the game rules of baccarat. The card distribution device 4003 also determines that the settlement has been completed and betting has started when the button for game start is pressed.

By reading at least the rank of the card drawn, the card distribution device 4003 determines the game outcome, such as player wins, banker wins, tie, player pair, banker pair, etc., according to the rules of the baccarat game.

The management control device 56 determines which playing position will receive a payout based on the bet details obtained from the image recognition device 55 and the game outcome obtained from the card distribution device 4003. The management control device 56 also obtains the user ID of the player for each playing position from the image recognition device 55 and the card reader 53, so it determines which player will receive the payout based on this information as well.

The RF control device 54 activates the antenna 512 of the pay area 42 to read and write to the RFID tag of the game token 83 when the game progress status received from the card distribution unit 4003 is under settlement.

The management control device 56 refers to the database 57, and if the user ID associated with the chip ID of the payout chip 832 read from the pay area 42 is a casino or dealer user ID, the user ID is replaced with the user ID associated with the chip ID of the bet chip 831 placed in the corresponding betting area 41.

When the dealer collects a losing player's bet chip 831, the antenna 512 in the pay area 42 may also read the chip ID of the bet chip 831, but in this case, the chip ID read in the pay area 42 will match the chip ID read in the corresponding betting area 41 immediately before it, therefore based on this, it is determined that the chip ID was read in the pay area 42 during collection, and the user ID of the game token 83 read in the pay area 42 should not be rewritten.

In this example, the management system 140 is described as having a player identification system, a database 57, and a card distribution device (electronic shoe) 4003. However, as in the first example, in a management system without the player identification system, the database 57, and the card distribution device (electronic shoe) 4003, the pay area 42 and the corresponding antenna 512 may be provided to update the user ID as in this example.

In the management system 140 of the present example, the pay area 42 is provided to read and write the RFID tag of the game token 83 separately from the betting area 41, so that the payout chip 832 paid out from the chip tray 12 can be read and written at a high speed. In other words, if the same antenna 512 as the bet chip 831 is used to read and write the payout chip 832 as in the first through third examples above, it is necessary to also read and write the bet chip 831 in order to read and write the payout chip 832, which takes time. However, since only the payout chip 832 needs to be read and written in the payout area 42, the reading and writing can be done in a relatively short time and does not interfere greatly with the game operation.

Figure 33:
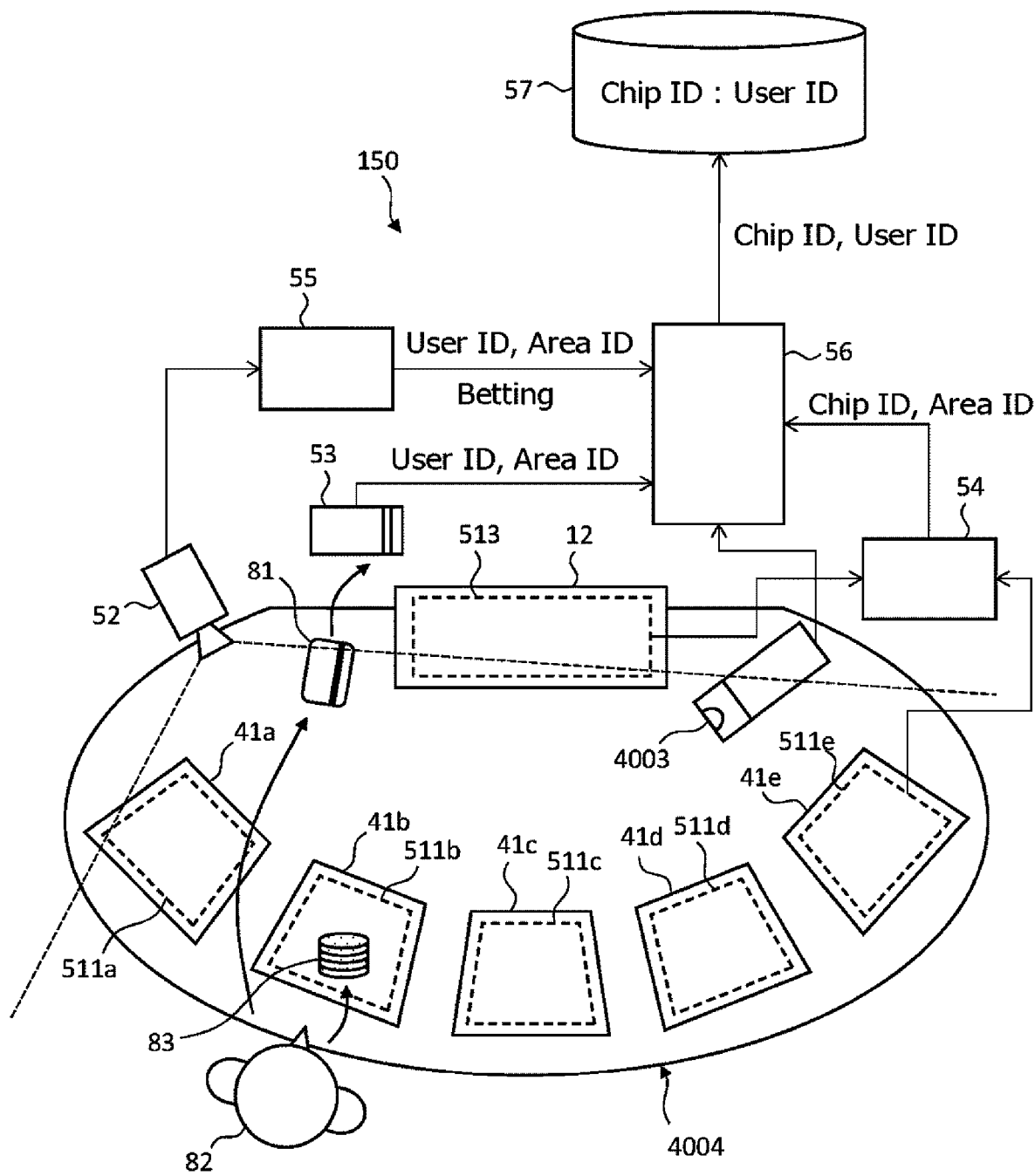
FIG. 33 shows the configuration of the management system according to a fifth example of the fourth embodiment.

FIG. 33 shows the configuration of the management system of the fifth example of the fourth embodiment. The management system 150 has the same configuration as the management system 140 of the fourth example shown in FIG. 32. That is, in addition to the configuration of the management system 110 of the first example, the management system 150 has a player identification system, a database 57, and a card distribution device (electronic shoe) 4003.

The camera 52 in this example captures the bet chips 831 bet in the betting area 41 as well as the player 82. The image recognition device 55 performs image recognition processing not only on the player's face, but also on the bet chips 831 in the betting area 41, and recognizes which betting target (player, banker, tie, player pair, banker pair, etc.) the bet chips 831 in each betting area 41 are placed on in the betting area 41. The system recognizes which bet chips 831 in each betting area 41 are placed on which betting target (player, banker, tie, player pair, banker pair, etc.) in the betting area 41, and outputs the recognition results as betting contents ("Betting" in FIG. 32).

A camera for capturing the face of the player 82 and a camera for capturing the bet chips 831 may be separate cameras. Also, an image recognition device that identifies the player based on the image of the player's face and an image recognition device that recognizes the bet contents based on the image of the bet chip 831 may be separate devices.

The card distribution device 4003 reads at least the rank of the cards drawn in sequence to determine the game outcome, including player wins, banker wins, ties, player pairs, and banker pairs, according to the rules of the baccarat game.

The management control device 56 determines which playing position will receive a payout (redemption) based on the bet details obtained from the image recognition device 55 and the game outcome obtained from the card distribution device 4003. The management control device 56 also obtains the user ID of the player for each playing position from the image recognition device 55 and the card reader 53, and thus determines which player will receive the payout (redemption) based on this information as well.

A pair of the area ID of the betting area 41 and the chip ID of the bet chip 831 read in the betting area 41 is input to the management control device 56 from the RF control device 54 for each betting area 41. As described above, the management control device 56 determines which playing position is to receive a payout, so it refers to the database 57 to obtain the user ID associated with the chip ID read at the playing position that is to receive a payout, and updates the user ID to be associated with the chip ID of the payout chip 832 with the obtained user ID.

The management control unit 56 recognizes the chip ID that is no longer read from the chip tray 12 due to payout as the chip ID of the payout chip 832. When there is a plurality of players who receive payouts, the dealer makes payouts in order from the end in a predetermined direction (for example, payouts are made in order from the right-hand end of the dealer to the left-hand end of the dealer). This makes it possible to determine to which playing position or player the payout chips 832 taken out of the chip tray 12 are to be paid out, even when there are multiple players to receive the payout.

In addition, since the management control device 56 can determine the playing position of the losing player, it updates the database 57 so that the user ID associated with the chip ID read from the betting area 41 of the playing position is "D" representing the casino or dealer.

As described above, in this example, the management control device 56 can determine which player or playing position's bet chips 831 will receive payouts and which player or playing position's bet chips 831 will be collected by ascertaining the betting contents and game outcomes. Since the management control unit 56 can also identify the chip IDs of those bet chips 831 and payout chips 832, it can change the user IDs associated with which chip IDs in the database 57 and determine which user IDs should be changed. This allows the tracing of the holder of the game tokens 83.

Figure 34:
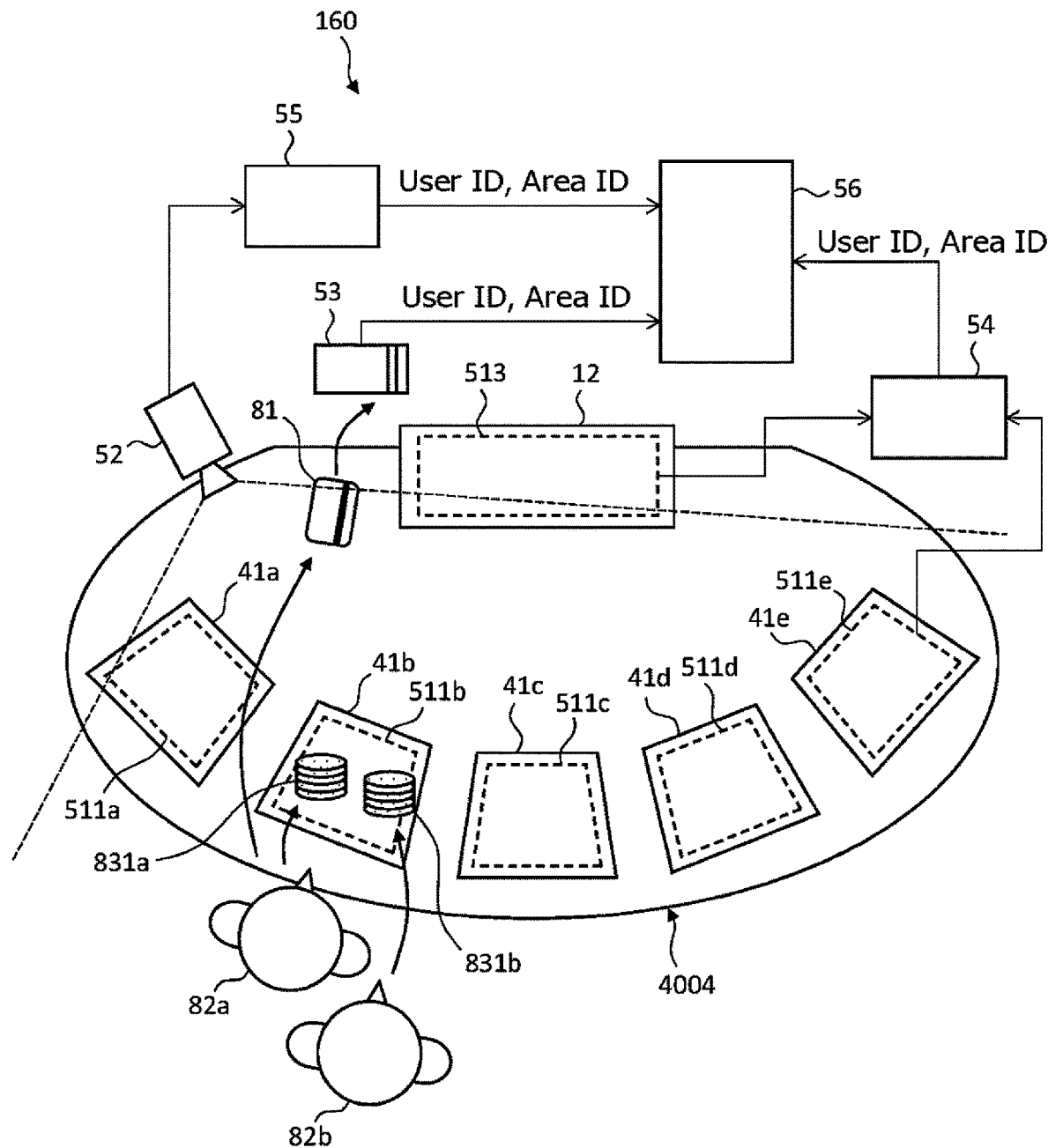
FIG. 34 shows the configuration of the management system according to a sixth example of the fourth embodiment.

FIG. 34 shows the configuration of the management system of the sixth example of the fourth embodiment. The management system 160 has the same configuration as in the second example. In baccarat, as described above, a plurality of playing positions are provided in the game table 4004, and a betting area 41 is provided for each playing position at a position corresponding to each playing position in the game table 4004. In principle, one player plays in one playing position.

However, if all the playing positions are filled, some players (back betting players) may appear from behind a player playing in a playing position (sitting player) and bet in the betting area 41 assigned to that sitting player, and some casinos or game tables 4004 allow this type of betting. The back bet will result in multiple game tokens 83 bets for the game with different user IDs in the same betting area. The management system 160 in this example allows tracing the holder of the game tokens 83 in such a case.

In the management system 160 of this example, as in the second example, the user ID of the game token 83 is stored in the rewritable area 22 of the RFID tag 2 of the game token 83, and no database is used. However, it has a player identification system that identifies the player.

In the example of FIG. 35, a bet chip 831a with user ID "P1" and a bet chip 831b with user ID "P2" are bet in the same betting area 41b. At this time, "P1" and "P2" are read from the betting area 41b as the user IDs of the game tokens 83.

FIGS. 36 to 38 illustrate examples of payouts when both players win the game. First, as shown in FIG. 35, a payout is made to the player 82a with the user ID "P1." At this time, the management system 160 is unable to distinguish whether the payout is made to the player 82a with user ID "P1" or to the player 82b with user ID "P2," and it is also unable to distinguish between multiple game tokens 83 for play in one betting area 41. The management control device 56 controls the RF control device 54 to rewrite the user ID to the selective information "P1 or P2" for all the game tokens 83 in the betting area 41b.

When the paid-out player 82a takes his own bet chip 831a and payout chip 832a from the betting area 41b, the betting area 41b remains with the bet chip 831b whose user ID is "P1 or P2," as shown in FIG. 37. The dealer confirms that the player 82a has taken the game tokens 83, and pays out the payout chip 832b, whose user ID is "D," to the bet chip 831b, as shown in FIG. 38. At this time, the management control device 56 controls the RF control device 54 to rewrite the user ID to "P1 or P2" for all game tokens 83 for play in the betting area 41.

As a result, players 82a and 82b who have placed bets in the same betting area 41 will both possess game tokens 83 with "P1 or P2" recorded as the user ID.

If these players 82a and 82b bet on the same betting area 41 using their game token 83 again, then both bet chips 831a and 831b will have "P1 or P2" recorded as the user ID. Alternatively, some betting chips may contain game tokens 83 whose user ID is "P1" or "P2." In these cases as well, when making a payout according to the game outcome, the management control device 56 controls the RF control device 54 to selectively write "P1 or P2" as the user ID of all game tokens 83 for play placed in the betting area 41 at the time of the payout.

When a bet chip 831 with a user ID of "P1 or P2" is collected in the chip tray 12, "D" representing a casino or dealer is written as the user ID.

Thereafter, if a player 82a or 82b alone bets in the betting area 41 a game token 83 in which the user IDs of a plurality of users are selectively recorded, and if the user ID of the player identified by the player identification system matches any of the selective user IDs, then the management control device 56 controls the RF control device 54 to rewrite the selective user ID of the game token 83 to the user ID matched.

For example, when a player 82a places a bet in the betting area 41 alone with the game token 83 in which "P1 or P2" is recorded as the user ID, the RF control device 54 reads the user ID "P1 or P2" from the bet chip 831 in the betting area 41, and the player identification system recognizes that the user ID of the player who placed the bet in the betting area 41 is "P1." In this case, since the user ID "P1" matches P1 in the "P1 or P2," the management control device 56 controls the RF control device 54 to rewrite the user ID of the bet chip 831 in the betting area 41 to "P1."

On the other hand, when a player who owns a game token 83 whose user ID is selectively recorded bets, and a player who has a user ID that is not in the selective player IDs bets in the same betting area 41 and receives a payout according to the game outcome, the user ID of the game tokens 83 is written to further include the user ID of that player in the choices.

For example, when a player 82a bets a game token 83 with "P1 or P2" recorded as the user ID in the betting area 41, and another player bets a game token 83 with "P3" recorded as the user ID in the same betting area 41, and the payment is made according to the game outcome, the management control device 56 controls the RF control device 54 to rewrite the user IDs of all the game tokens 83 including the payout chips in the betting area 41 to "P1, P2 or P3."

As described above, by allowing selective recording as the user ID, the present example allows tracing of the holder even when multiple players have bet on the same betting area. Furthermore, by using the player identification system, it is possible to definitively rewrite the selectively recorded user ID.

If multiple players are betting on the same betting area 41, and some players win and some players lose, the betting chips of the losing players will be collected first, since the betting chips of the losing players will be collected first, so "D" will be recorded as the user ID when the chip tray 12 reads the collected bet chips, and the above process can be performed for the payout chips 832 and the remaining bet chips to which the payout chips 832 are to be paid out.

Figure 39:
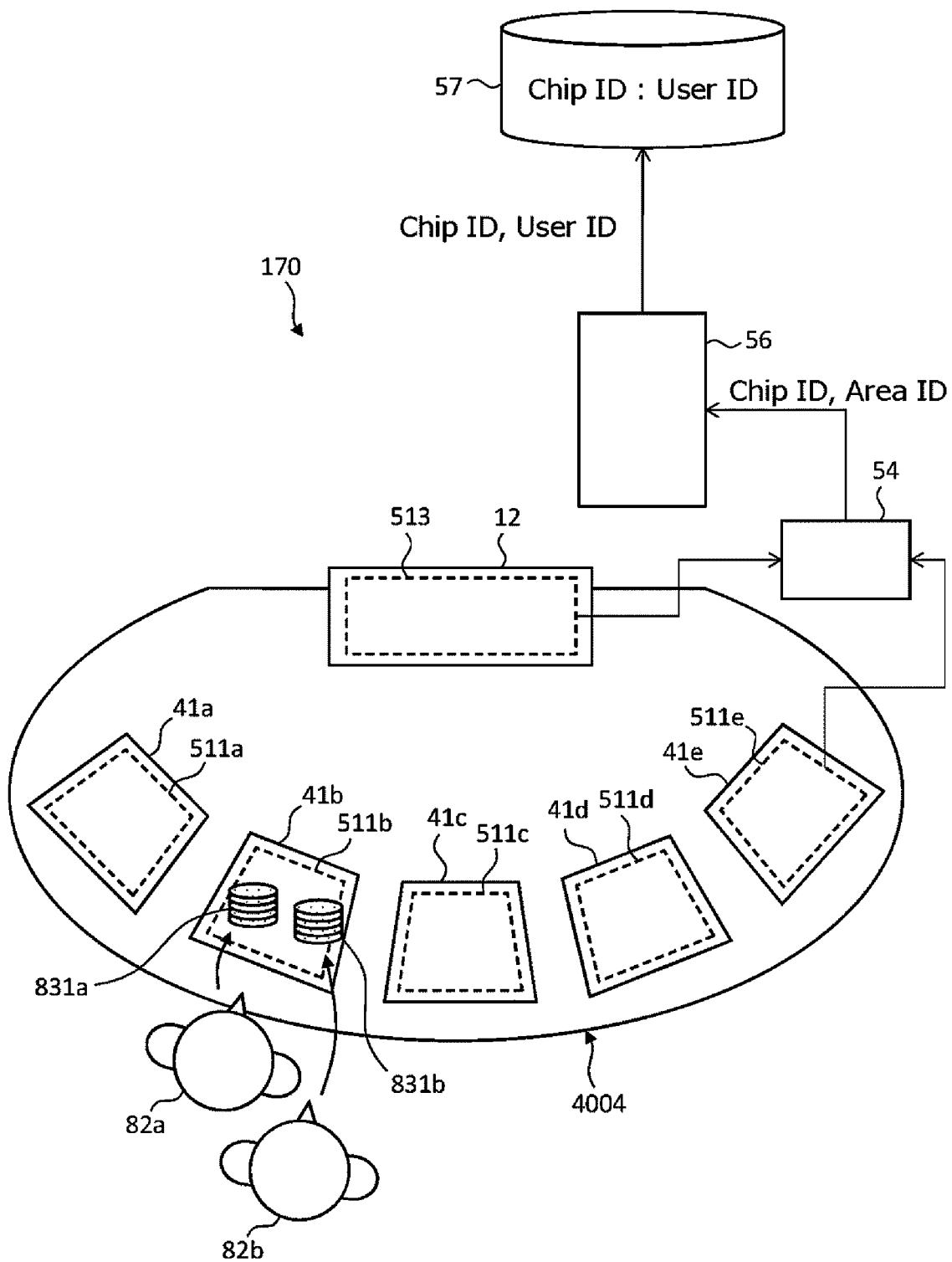
FIG. 39 shows the configuration of the management system according to a seventh example of the fourth embodiment.

FIG. 39 shows a configuration of the management system of the seventh example of the fourth embodiment. The management system 170 has the same configuration as the management system 130 of the third example. In the management system 170, it is also possible to trace the holder of the game tokens 83 even when multiple players bet on the same betting area 41.

Figure 40:
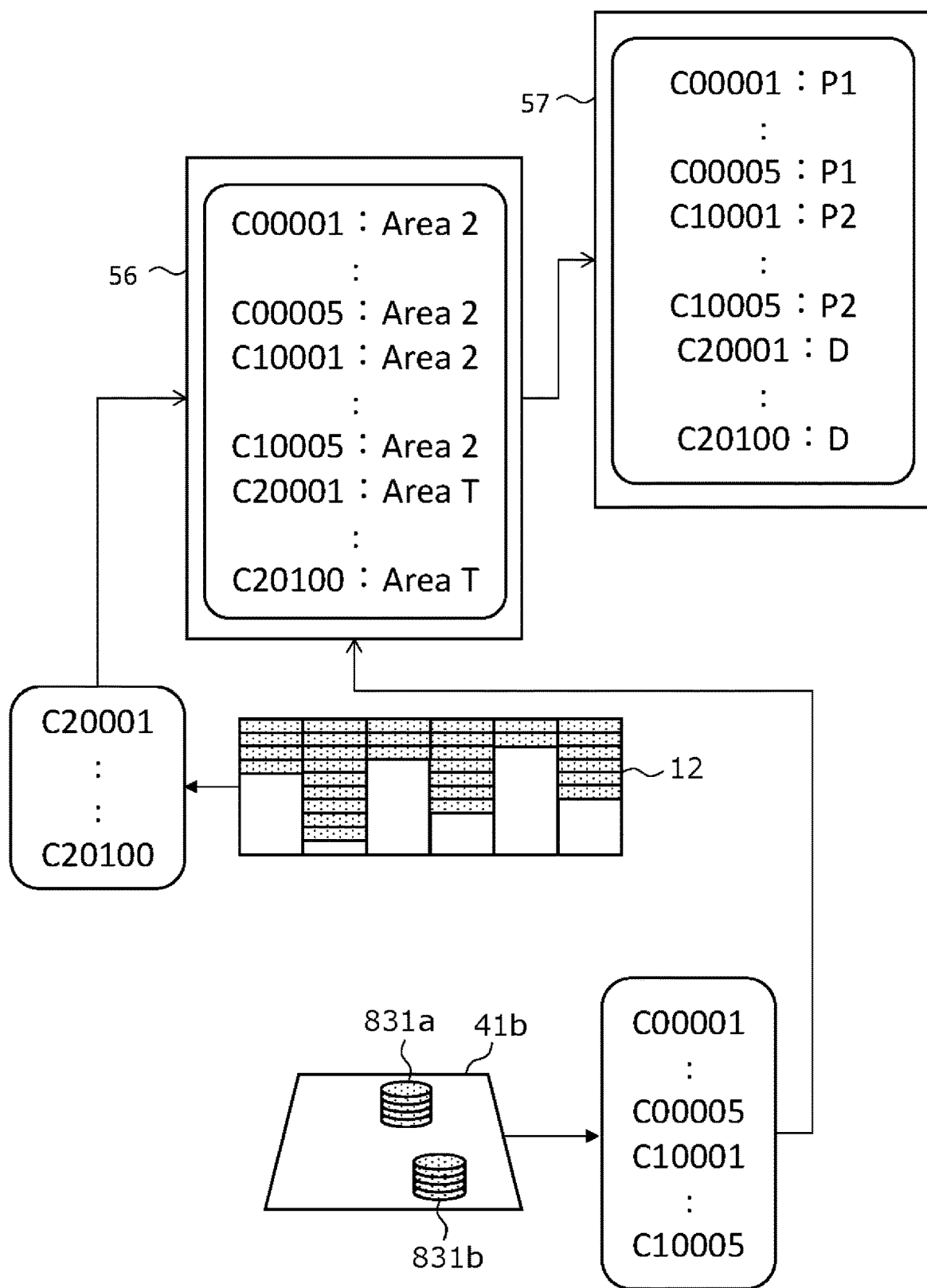
FIG. 40 shows an example of updating the database according to the seventh example of the fourth embodiment.

FIGS. 40 to 44 illustrate an example of updating the database 57. When a player 82a bets a bet chip 831a in a betting area 41b and a player 82b bets a bet chip 831b in the same betting area 41b, as shown in FIG. 40, in the RF control device 54, from this betting area 41b, as the user ID, the chip IDs "C00001" to "C00005" of the bet chips 831a and the chip IDs "C10001" to "C10005" of the bet chips 831b are read out from this betting area 41b and output to the management control device 56 as a combination with the area ID "Area 2" of the relevant betting area 41. In addition, the chip IDs "C20001" to "C20100" are read from the chip tray 12, and the combination with the area ID "Area T" of the chip tray 12 is obtained by the management control device 56.

As shown in FIG. 40, at this point, in the database 57, the chip IDs "C00001" to "C00005" are associated with the user ID "P1," the chip IDs "C10001" to "C10005" are associated with the user ID "P2," and the chip IDs "C20001" to "C20100" are associated with user ID "D."

Figure 41:
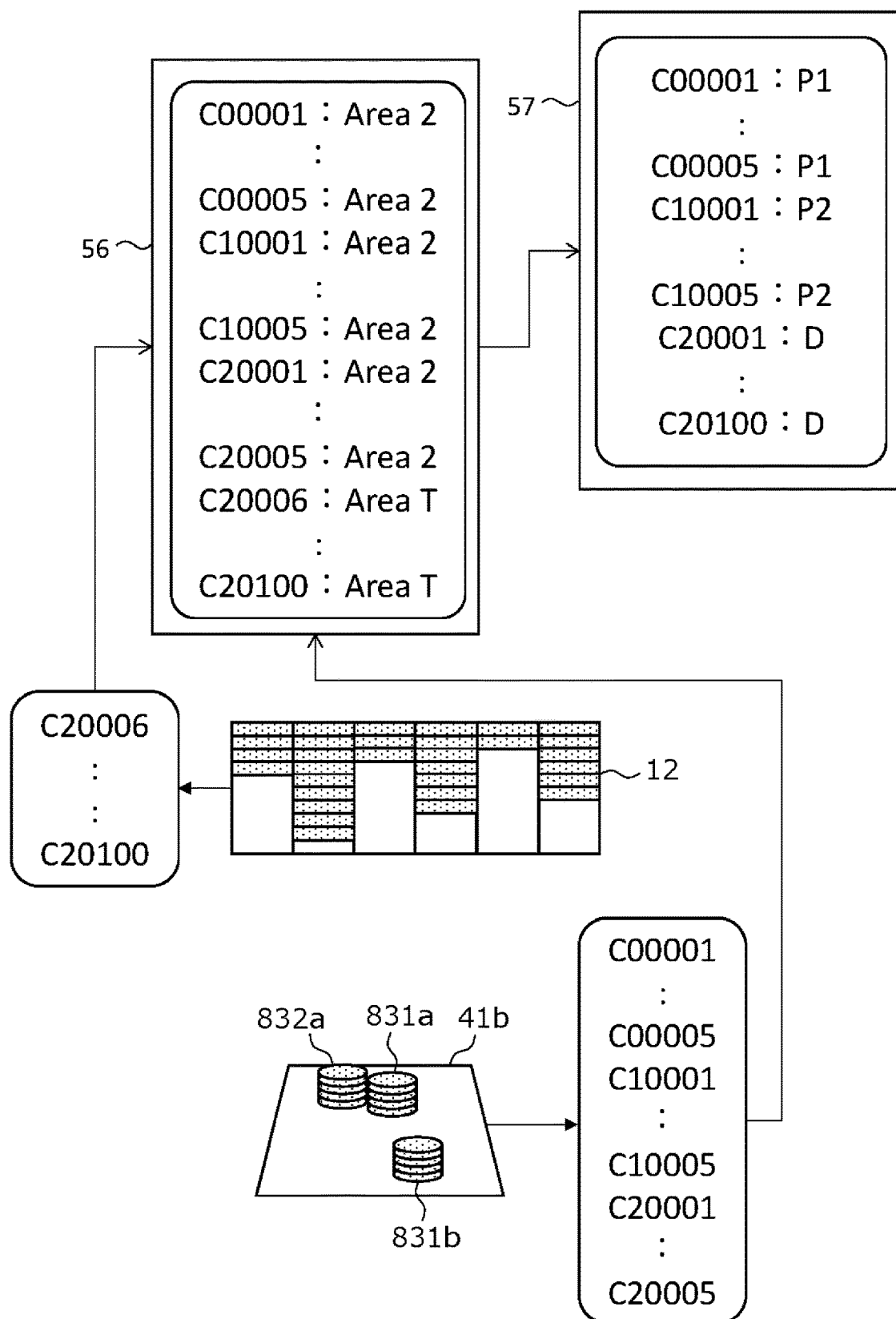
FIG. 41 shows an example of updating the database according to the seventh example of the fourth embodiment.
Figure 42:
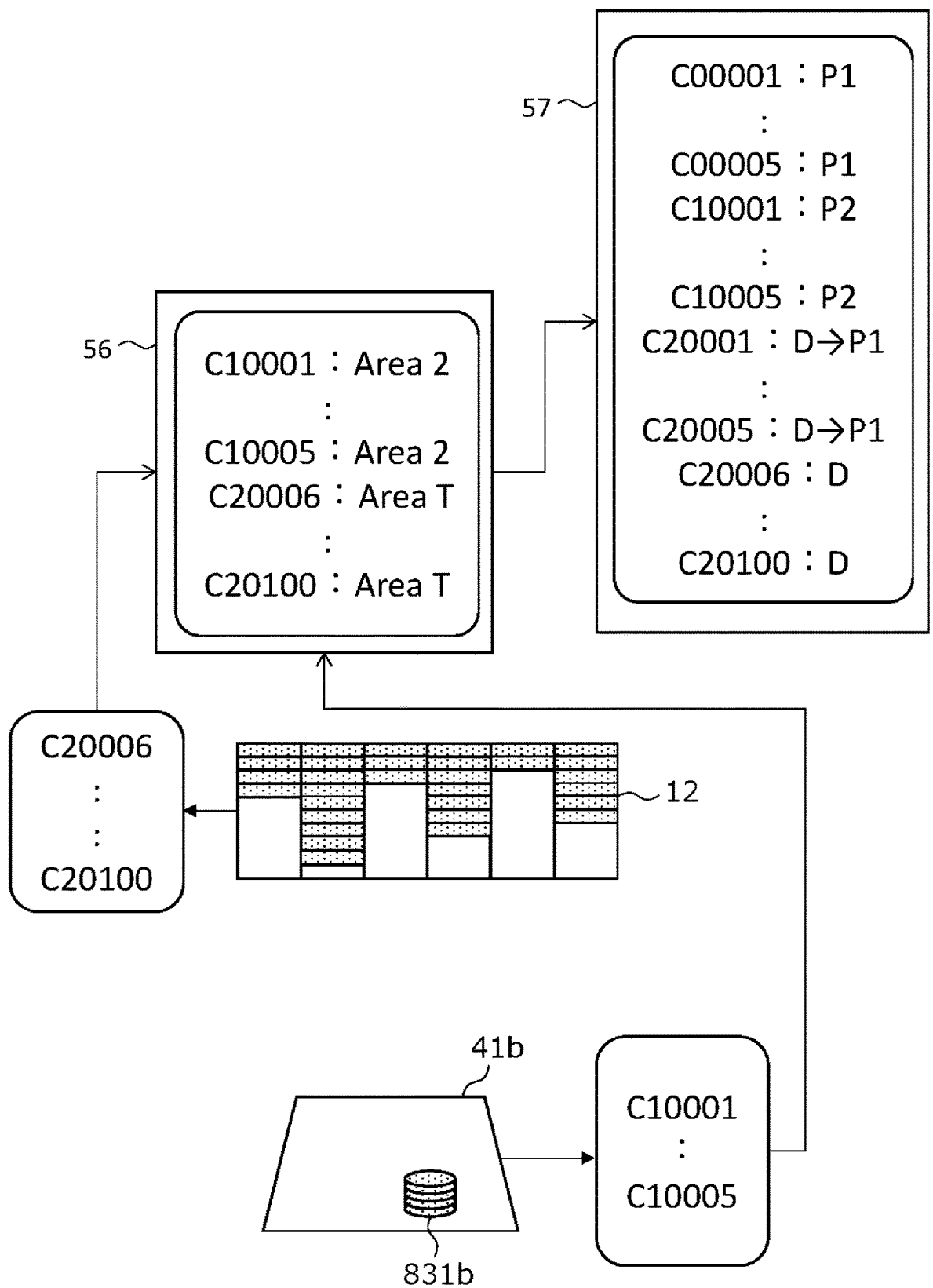
FIG. 42 shows an example of updating the database according to the seventh example of the fourth embodiment.

Assuming that both of these players 82a and 82b win according to the game outcome, a payout is first made by the dealer for either bet chip 831a or bet chip 831b, as shown in FIG. 41. At this time, in addition to the chip IDs "C00001" to "C00005" for bet chips 831a and "C10001" to "C10005" for bet chips 831b, the chip IDs "C20001" to "C20005" for payout chips 832a are read from the betting area 41b and output to the management control device 56 as a combination with the area ID "Area 2" of the betting area 41.

At this stage, the management control device 56 cannot yet determine whether the payout chip 832a has been paid out to the bet chips 831a with chip IDs "C00001" to "C00005" or to the bet chips 831b with chip IDs "C10001" to "C10005." Therefore, the database 57 is not updated.

Next, when the player 82a takes the bet chips 831a and the payout chips 832a that were paid out to the bet chips 831a from the betting area 41b, as shown in FIG. 41, only the chip IDs "C10001" to "C10005" of the remaining bet chips 831b are read from the betting area 41b. Based on this change, the management control device 56 determines that the payout chips 832a with chip IDs "C20001" to "C20005" read from the betting area 41b have been paid out for the bet chips 831a with chip IDs "C00001" to "C00005" and stores them in the database 57 is rewritten from "D" to "P1," i.e., from "D" to the user ID associated with the bet chips 831a that were removed from the betting area 41b along with the payout chips 832a with chip IDs "C20001" to "C20005."

Figure 43:
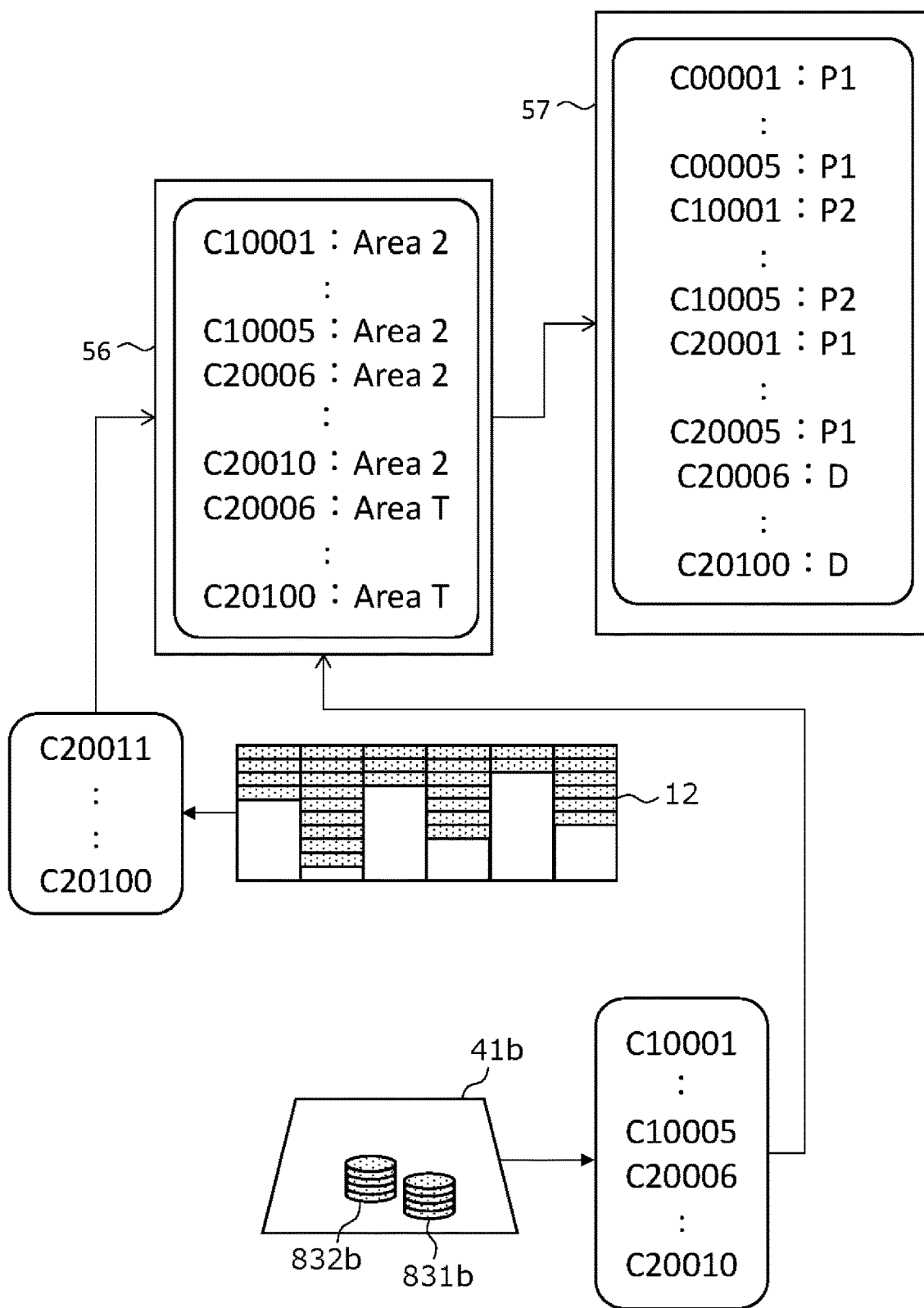
FIG. 43 shows an example of updating the database according to the seventh example of the fourth embodiment.

The dealer after confirming that the bet chip 831a and the payout chip 832a paid out to it are removed from the betting area 41b, as shown in FIG. 43, pays out the payout chips 832b to the bet chips 831b in the same betting area 41b. Thus, the chip IDs "C10001" to "C10005" of the bet chips 831b and the chip IDs "C20006" to "C20010" of the payout chips 832b are read from the betting area 41b and recorded in the management control device 56 in combination with the area ID "Area 2" of the betting area 41.

Figure 44:
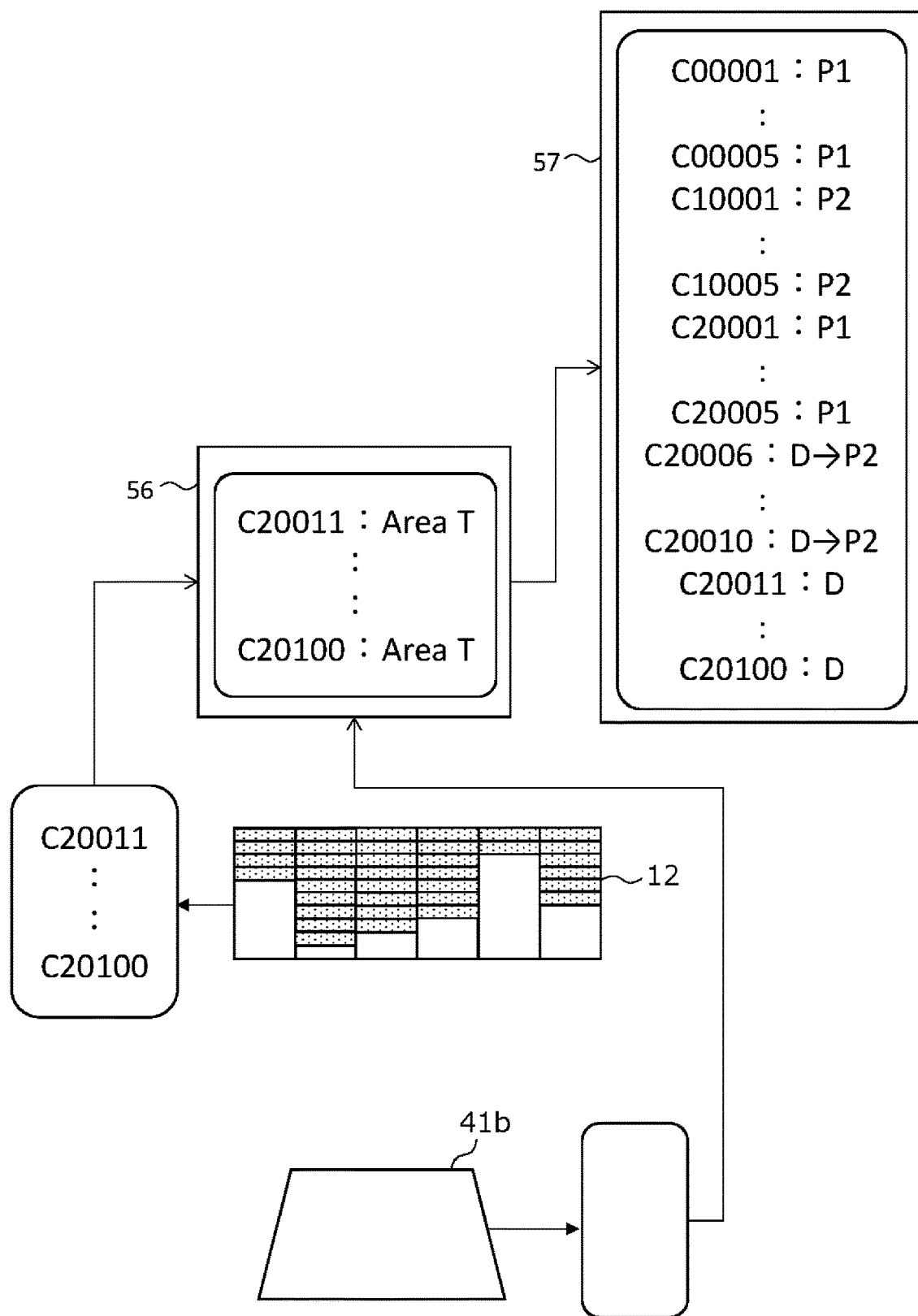
FIG. 44 shows an example of updating the database according to the seventh example of the fourth embodiment.

Thereafter, when player 82b takes this bet chip 831b and payout chip 832b, as shown in FIG. 44, no chip ID is read from betting area 41b, and only the chip ID read from chip tray 12 is input to the management control device 56. Based on this change, the management control device 56 determines that the payout chips 832b with the chip IDs "C20006" to "C20010" have been passed to the same players as those with the chip IDs "C10001" to "C10005," and updates the database 57 so that the user IDs associated with chip IDs "C20006" to "C20010" are the same as the user IDs associated with chip IDs "C10001" to "C10005."

As described above, according to the management system 170 in this example, the system detects that the bet chips 831 and the payout chips 832 have been removed from the betting area together and updates the database 57 so that the user IDs of the payout chips 832 are the same as the user IDs of the bet chips 831. Therefore, even when multiple players' game tokens 83 are bet in the same betting area 41, by paying out to those players in order, it is possible to determine to which player the payout chips 832 were paid out to update the database 57, making it possible to trace the holders of the game tokens.

Figure 45:
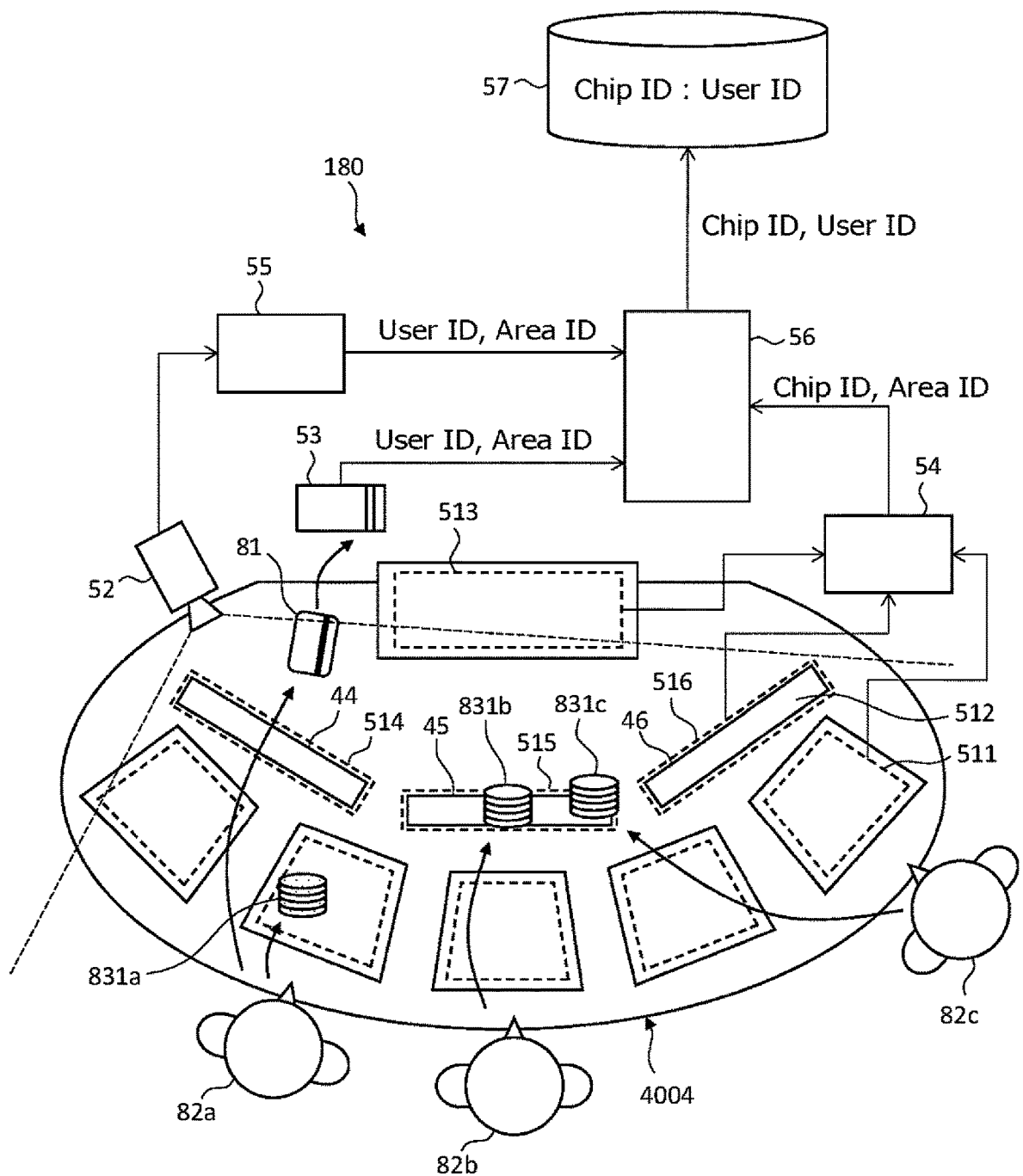
FIG. 45 shows the configuration of the management system according to an eighth example of the fourth embodiment.

FIG. 45 shows the configuration of the management system of the eighth example of the fourth embodiment. The management system 180 has the same configuration as the management system 140 of the fourth example. However, in the management system 180, a player pair area 44, a tie area 45, and a banker pair area 46 are provided as betting areas in the game table 4004. In addition, antennas 514, 515, and 516 are provided in the game table 4004 corresponding to the player pair area 44, tie area 45, and banker pair area 46.

Each of these areas 44 to 46 is divided into sections for each playing position, and when betting in these areas 44 to 46, a player places his/her betting chips in the position (section) corresponding to his/her playing position within these areas.

In other words, player pair area 44, tie area 45, and banker pair area 46 are each a shared betting area shared by multiple players. In the example of FIG. 45, players 82a to 82c are participating in the game, of which players 82b and 82c have placed bet chips 831b and 831c, respectively, in tie area 45.

In this example, the holders of the game tokens 83 can be traced in the same way as in the sixth or seventh example for the shared betting areas 44 to 46. Even if the management system 180 does not have the database 57, the tracing of the holder of the game token 83 can be performed in the same manner as in the sixth example, and even if the management system 180 does not have the player identification system, the tracing of the holder of the game token 83 can be performed in the same manner as in the seventh example for the shared betting area.

Figure 46:
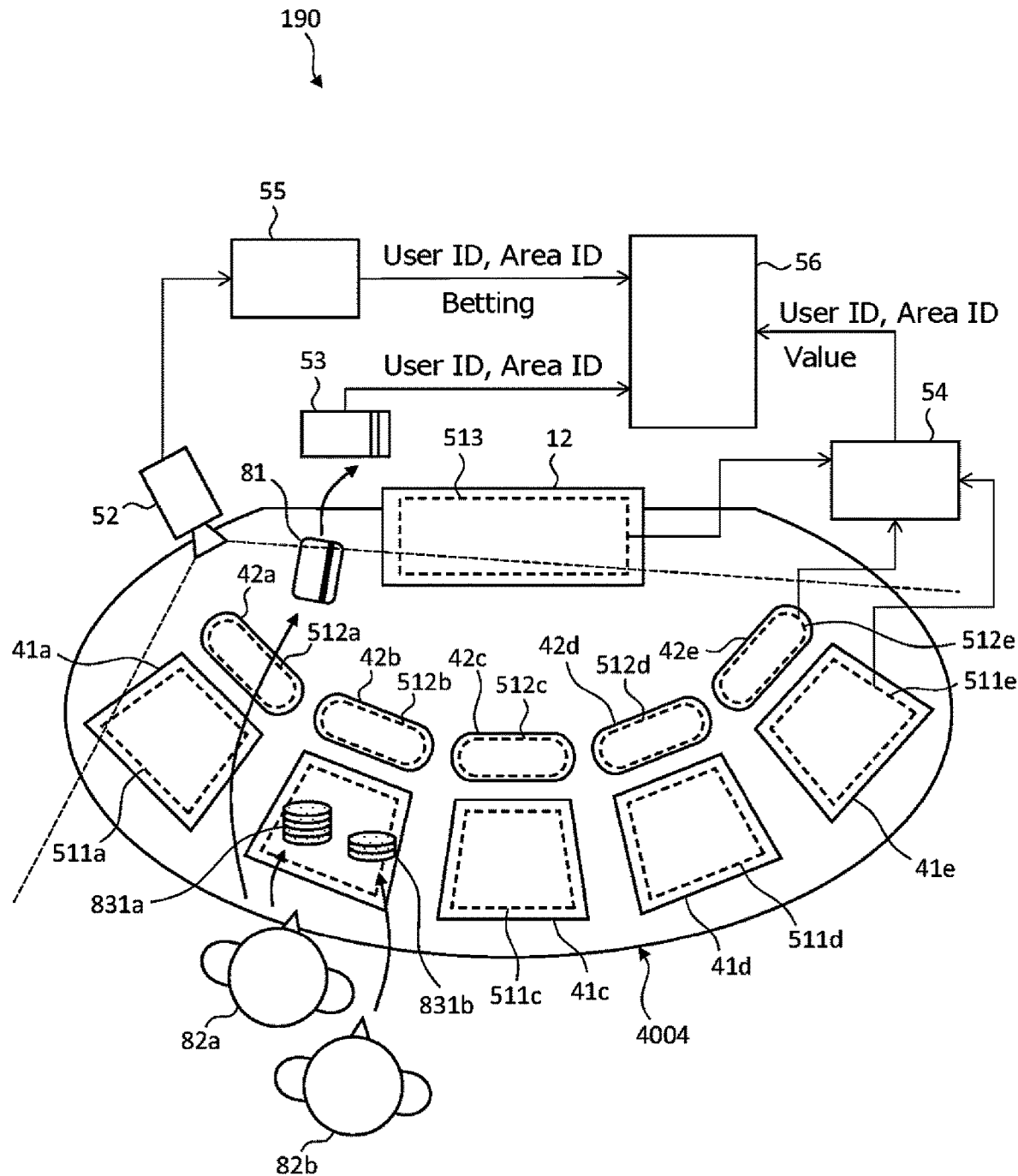
FIG. 46 shows the configuration of the management system according to a ninth example of the fourth embodiment.

FIG. 46 shows the configuration of the management system of the ninth example of the fourth embodiment. The management system 190 is equipped with a player identification system. In this example, the game tokens 83 is traced without using the database 57. The game table 4004 has pay areas 42a to 42e and their corresponding antennas 512a to 512e. In the fixed information 3 of the RFID tag 2 of the game token 83, information indicating the amount (value) of the game token 83 is stored, and the user ID of the holder is stored in the variable information 4.

In this example, the database 57 may be used, in which case the chip ID is stored in the game token 83, and the amount (value) of the game token 83 and the user ID of the holder are stored in the database 57 in association with the chip ID.

As shown in FIG. 47, when the bet chips 831a (five chips with the amount "100") of the player 82a and the bet chips 831b (two chips with the amount "1000") of the player 82b are placed in the betting area 41b, five bet chips 831a with the amount "100" and the user ID "P1" are read, and two game tokens 83 with the amount "1000" are read, from the betting area 41b, and those are output together with "Area 2" that is an area ID to the management control device 56.

The management control device 56 detects the betting amount for each player by calculating the total amount of betting chips for each betting area 41. In the case of FIG. 47, the management control device 56 detects that the bet amount for user ID "P1" is "500" and the bet amount for user ID "P2" is "2000."

Figure 48:
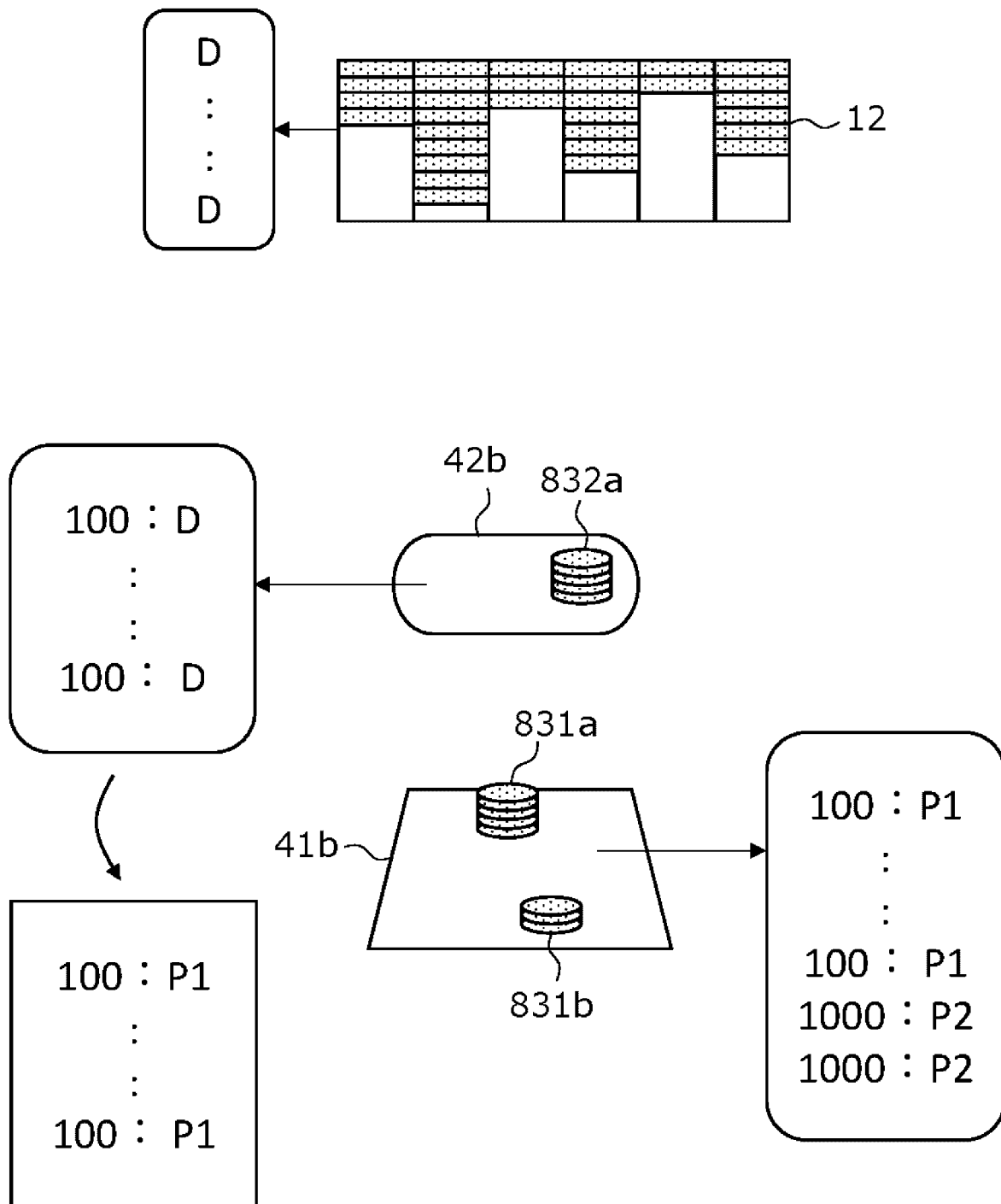
FIG. 48 shows an example of updating the variation information according to the ninth example of the fourth embodiment.

If both players 82a and 82b win as a result of the game, the dealer pays out (redeems) to each of the bet chips 831a and 831b in turn. As shown in FIG. 48, when paying out the payout chip 832a for the bet chip 831a first, the dealer places the payout chip 832a in the pay area 42b.

At this time, the RF control device 54 reads the game tokens 83 in the pay area 42b, reads that there are five game tokens 83 with the amount "100," and outputs this information to the management control device 56. The management control device 56 detects the payout amount by calculating the total amount of the payout chips 832a read in the pay area 42b.

The management control device 56 compares the payout amount of the payout chips 832a with the bet amount for each player in the betting area 41b to identify the player whose bet amount matches the payout amount. In the case of FIG. 48, five payout chips 832a with the amount "100" are read from the pay area 42b, and the payout amount is detected to be "500." The management control device 56 determines that this payout amount "500" matches the bet amount "500" of the bet chip 831a with the user ID "P1," and rewrites the user ID of the payout chip 832a to "P1."

Figure 49:
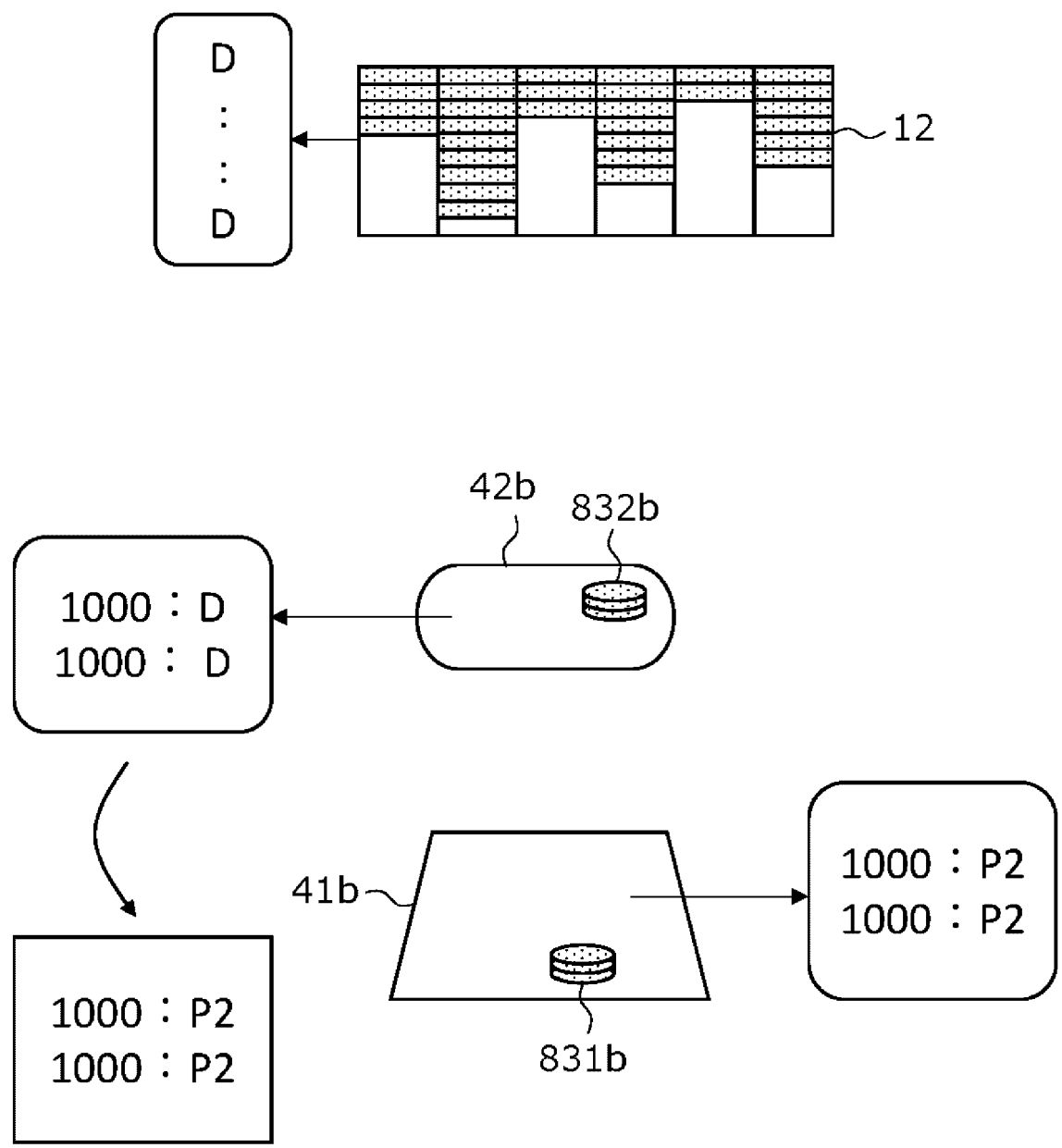
FIG. 49 shows an example of updating the variation information according to the ninth example of the fourth embodiment.

Then, when player 82a takes the payout chip 832a and the bet chip 831a, the bet chip 831b of the player 82b remains in the betting area 41b, as shown in FIG. 49. When the dealer places the payout chip 832b in the pay area 42b for paying out for the bet chip 831b, the management control device 56 detects the payout amount of the payout chip 832b by calculating the total amount of the payout chip 832b.

The management control device 56 compares the payout amount of the payout chip 832b with the bet amount for each player in the betting area 41b, and identifies the player whose bet amount matches the payout amount. In the case of FIG. 49, two payout chips 832b with the amount "1000" are read from the pay area 42b, and the payout amount is detected to be "2000." The management control device 56 determines that this payout amount "2000" matches the bet amount "2000" of the bet chip 831b with the user ID "P2," and rewrites the user ID of the payout chip 832b to "P2."

As described above, even if multiple players have placed bets in the same betting area 41, when their betting amounts are different, the management and control system 190 of this example determines which player the payout chips are being paid out to based on the betting amount and the payout amount of the payout chips.

In the above first to ninth examples, if the player 82 is a non-member who is not registered as a member, the player 82 cannot be identified by the player identification system because such a non-member is not assigned a user ID. In addition, as described above, "Unknown" is recorded as the user ID for the game token 83 owned by the non-member, because a valid user ID cannot be stored in the RFID tag 2 or the database 57.

When paying out the payout chips 832 to a non-member player, the management system makes the user ID of the payout chip 832 to be "Unknown," and when the bet chips 831 are collected from a non-member player, the management system makes the user ID of the bet chip 831 being collected to be "D."

When a player who is a member and a player who is a non-member bet on the same betting area 41, if both players win the game, the dealer may perform pay out under a rule in which the payout chips are always paid out from the non-member first or always paid out from the member first.

For example, if the rule of always paying out non-members first is in operation, the management system rewrites the user ID as "Unknown" for the first payout chips 832 that is paid out, and rewrites the user IDs of the payout chips 832 that are later paid out to the user ID of the player who is a member, using the above example.

For example, if the rule of always paying out members first is in operation, the management system rewrites the user ID of the first payout chip 832 to the user ID identified from the bet chips 831, and for payout chips 832 that are paid out later, the user ID is rewritten as "Unknown."

When the dealer identifies a player using the card identification system, the dealer scans the member's card 81 by himself/herself and can know which player is a member, but when the player is identified using the face recognition system, the dealer cannot know which player is a member. Therefore, as a result of recognition by the face recognition system, visual information indicating the playing position or betting area where the user ID was recognized may be shown to the dealer by a monitor or the like.

Figure 50:
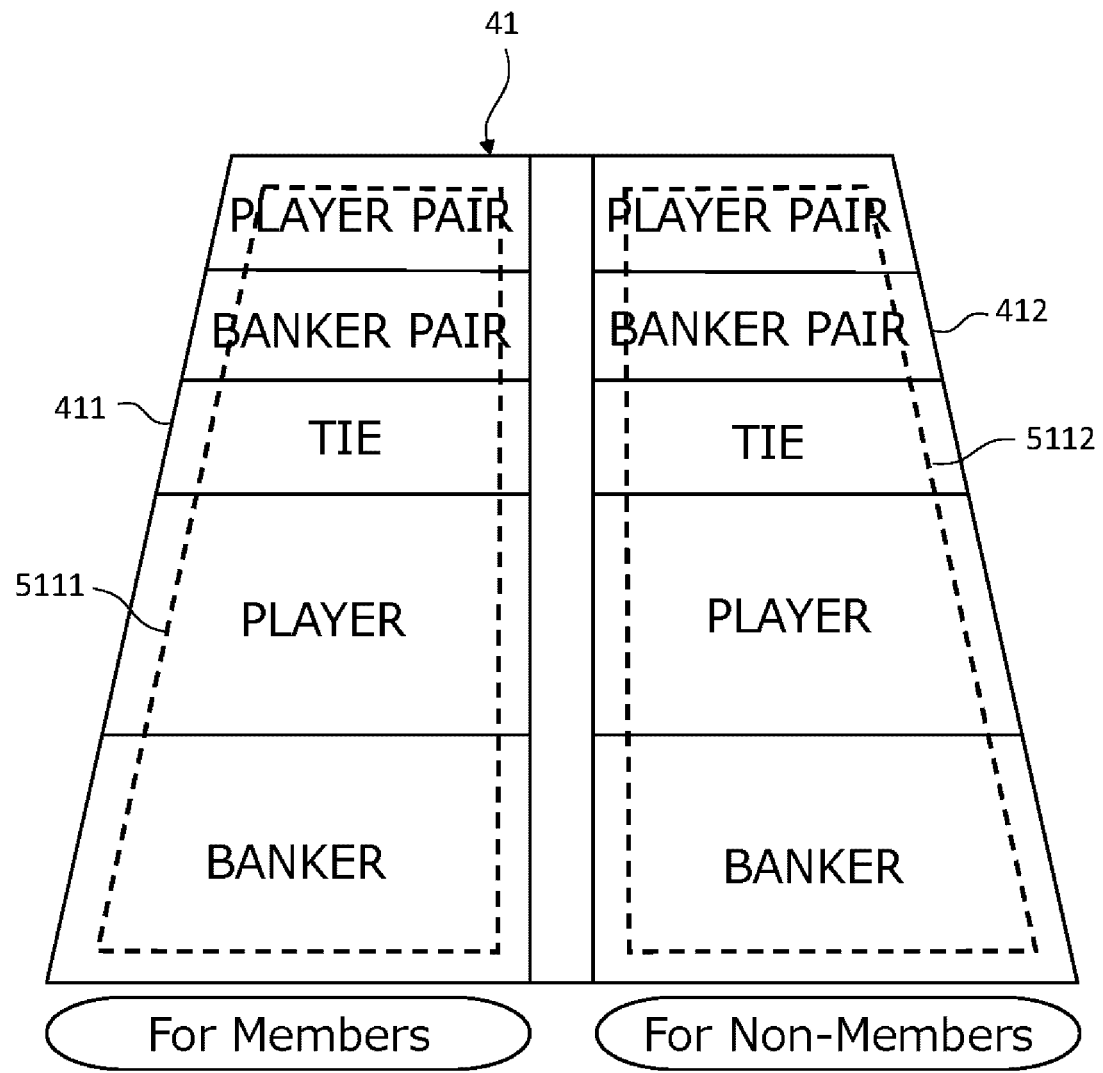
FIG. 50 shows an example of a betting area according to an eleventh example of the fourth embodiment.

FIG. 50 shows an example of a betting area in the eleventh example of the fourth embodiment. In this example, the betting area 41 of each playing position is divided into a betting area 411 for members and a betting area 412 for non-members, and the antennas are also divided into antennas 511 for members and antennas 5112 for non-members.

By controlling the RF control device 54, the management control device 56 rewrites the user ID of the game token 83 as in the first to ninth examples above for the bet chips 831 bet in the betting area 411 for members, and for the bet chips 831 bet in the betting area 412 for non-members. The user IDs of all payout chips 832 that are paid out to the bet chips 831 are rewritten to "Unknown."

According to this example, the game token 83 whose user ID assigned to the player is stored in itself or in the database 57 and the game token 83 whose user ID assigned to the player is not stored in itself or in the database 57 (the user ID is "Unknown") will not be mixed and read, thereby the game token 83 whose user ID assigned to the player is stored in itself or in the database 57 can be traced effectively.

Figure 51A:
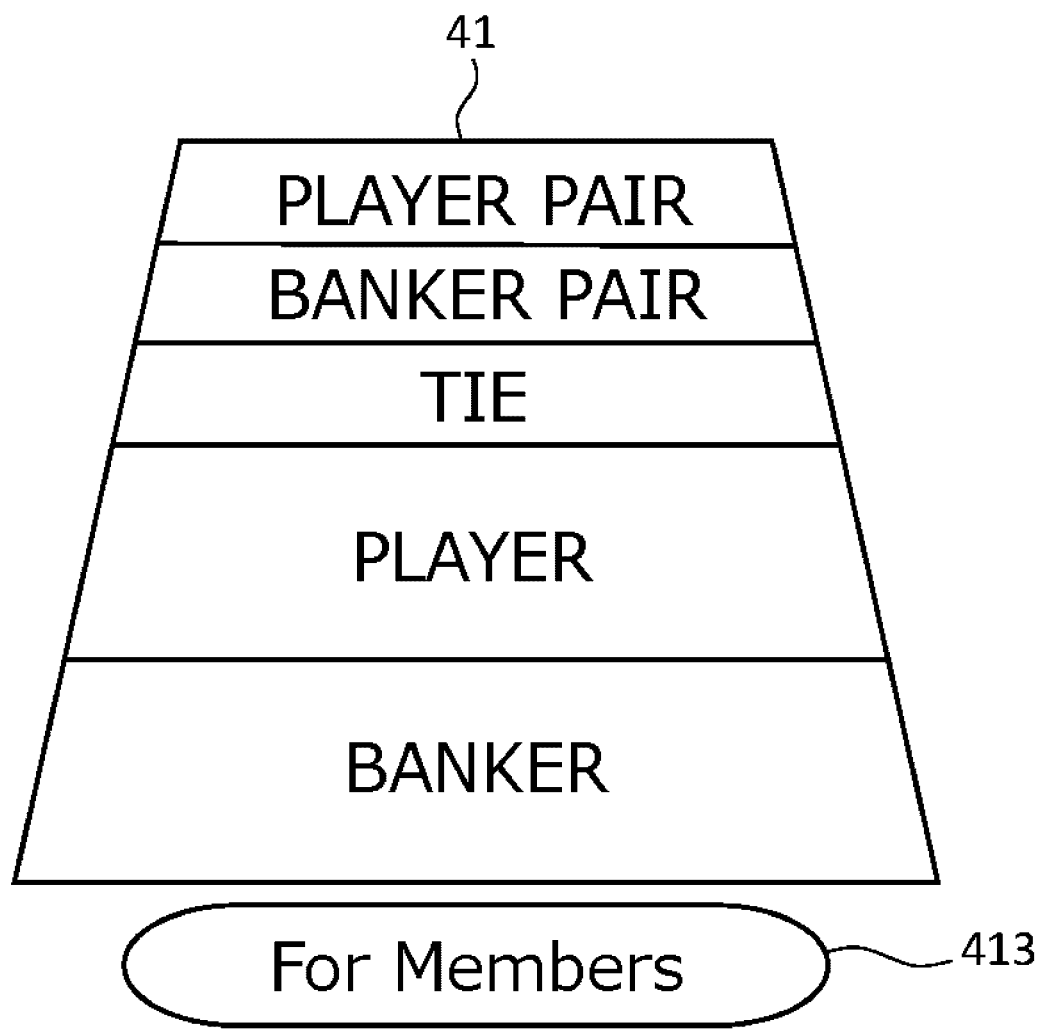
FIG. 51A shows another example of the betting area according to the eleventh example of the fourth embodiment.
Figure 51B:
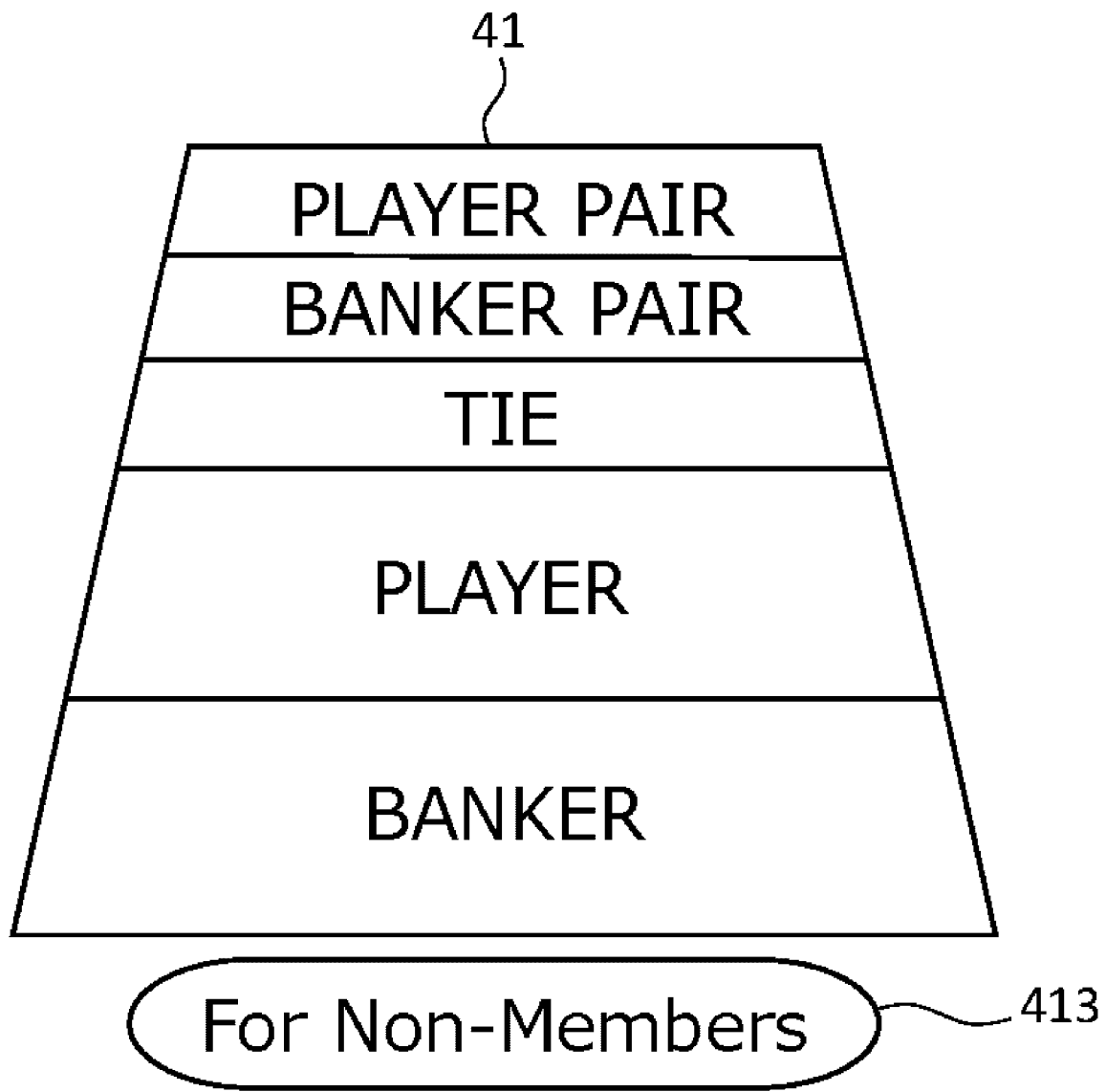
FIG. 51B shows another example of the betting area according to the eleventh example of the fourth embodiment.

FIGS. 51A and 51B show other examples of betting areas in the eleventh example of the fourth embodiment. In this example, the betting area 41 for each playing position is selectively set to either the betting area 41 for members, as shown in FIG. 51A, or the betting area 41 for non-members, as shown in FIG. 51B.

In the vicinity of each betting area 41, there is a display 413 that variably indicates whether the betting area 41 is set for members or for non-members, respectively. This display section 413 is installed under the raxa of the game table 4004, and the displayed information is visible to the player through the raxa.

The means of visually indicating whether each betting area 41 is set for members or non-members is not limited to the display 413 embedded under the raxa of the game table 4004. For example, a monitor installed on the game table 4004 that is visible to the players may indicate whether each betting area 41 is set for members or non-members.

By controlling the RF control device 54, the management control device 56 rewrites the user IDs of the bet chips 831 that are bet in the betting area 41 as in the first to ninth examples above when the betting area 41 set for the members, and rewrites all the user IDs of the payout chips 832 that are paid out to the bet chips 831 that have been bet in the betting area 41 to "Unknown" when the betting area 41 set for the non-members.

According to this example, the game token 83 whose user ID assigned to the player is stored in itself or in the database 57 and the game token 83 whose user ID assigned to the player is not stored in itself or in the database 57 (the user ID is "Unknown") will not be mixed and read, thereby the game token 83 whose user ID assigned to the player is stored in itself or in the database 57 can be traced effectively.

In the first to ninth examples above, it is also possible to trace the holder of the game token 83 when the game token 83 is exchanged between the dealer and the player at the game table 4003. In this case, the management system is provided with means for determining the progress of the game (i.e., whether a game phase is "betting," "playing," or "settlement"). As such progress determination means, the card distribution device 4003 can be used, but any other means may be used.

In the management system of this example, the management control device 56 controls the RF control device 54 to cause each antenna to read periodically at predetermined time intervals during betting. During betting, the management control device 56 determines that the game tokens 83 is being exchanged when the game tokens 83 whose user ID is "D" is read at one of the betting areas 41 or one of the pay areas 42 (hereinafter referred to as the "reading area of the game table 4004"), and when the game tokens 83 whose user ID is the user ID assigned to the member is read at the chip tray 12.

This is because, in terms of baccarat operation, during betting, the game token 83 cannot be moved from the chip tray 12 to the game table 4003 except for exchange, and the game token 83 of the player on the game table 4003 cannot be moved to the chip tray 12. If the game phase is "playing,"

such movement of the game token 83 for game use is a fraudulent act, and the management control device 56 may output an alarm when it detects such a movement of the game token 83 during the "playing."

If a game token 83 whose user ID is the user ID assigned to a member or "Unknown" is read by the chip tray 12 during betting, the management control device 56 determines that the game token 83 is a game token 83 (chip before exchange) that was placed on the game table 4004 by the player for exchange between chips.

Specifically, when the user ID is stored in the game token 83 itself, the management control device 56 determines that it is an exchange when the user ID assigned to the member or "Unknown" is read from the chip tray 12 during betting. In the case that the user ID is stored in the database 57, the management control device 56 determines that an exchange is taking place when the number of game tokens 83 read from the chip tray 12 decreases during betting.

Alternatively, if the user ID is stored in the database 57, when the number of game token 83 read from the chip tray increases during betting, the management control device 56 may determines that an exchange is taking place.

In addition, if, a game token 83 whose user ID is "D," indicating that it is held by the casino or dealer, is read in the read area of the game table 4004 during betting, the management control device 56 determines that the game token 83 is a game token 83 (chip after the exchange) that is given to the player corresponding to the chip before the exchange.

Specifically, when the user ID is stored in the game token 83, the management control device 56 determines that it is an exchange when the user ID "D" is read from the reading area of the game table 4004 during betting, and when the user ID is stored in the database 57, the management control device 56 reads the reading area of the game table 4004 periodically during betting, and by referring to the database 57 at each reading, determines that the game token 83 whose user ID is "D" has been read from the reading area of the game table 4004.

The management control device 56 rewrites the user ID of the chip before exchange to "D" representing the casino or dealer, and rewrites the user ID of the chip after exchange to the user ID of the chip before exchange. Specifically, if the user ID is stored in the RFID tag 2 of the game token 83, the management control device 56 controls the RF control device 54 to rewrite the user ID stored in the corresponding chip before exchange and chip after exchange, and if the user ID is stored in the database 57 in association with the chip ID, the management control device 56 rewrites the user ID associated with the corresponding chip ID in the database 57.

After identifying the chip before exchange and chip after exchange, the management control device 56 may control the RF control device 54 to exchange their user IDs (if the user ID is stored in the game token 83) or update the database 57 to exchange their user IDs (if the user ID is stored in the database 57).

In the above embodiment, the member's card 81 is a magnetic card and the card reader 53 is a magnetic card reader that reads information from the magnetic stripe of the member's card 81, but alternatively, an RFID tag may be embedded in the member's card 81 and the user ID may be recorded in the RFID tag. In this case, an RFID reader consisting of an antenna and an RF control device 54 is used as the card reader 53. Such an antenna may also be provided at each playing position. In this case, the player does not hand his own member's card 81 to the dealer, but has it read at each playing position. From each antenna, the user ID read from the member's card 81 is transmitted to the RF control device 54, along with information identifying the playing position. Furthermore, the antennas 511 in the betting area 41 and the RF control device 54 may be used as RFID readers for reading the member's card 81. In this case, the player can have the antenna 511 read the user ID by placing the member's card 81 in the betting area 41 at his own playing position.

By the first to eleventh examples of the fourth embodiment described above, the following techniques are disclosed.

(A1) A management system that manages a game token, comprising: a holder identification device configured to, when the game token is used, identify a holder of the game token by referring to a memory device that stores a holder of the game token; a player identification device configured to, when the game token is used, identify a player who used the game token; and a control device configured to, for the game token used, store the player identified by the player identification device as the holder in the memory device when the holder identified by the holder identification device and the player identified by the player identification device do not match.

(A2) The management system according to (A1), wherein the control device stores the fact that there is a discrepancy in the memory device when, for the game token used, the holder identified by the holder identification device and the player identified by the player identification device do not match.

(A3) The management system according to (A1), wherein the player identification system identifies the player who used the game token by face recognition or by reading an ID card.

(A4) The management system according to (A1), wherein said memory device is a database or an RFID tag embedded in the game token.

(A5) A management system that manages a game token, comprising: a memory device configured to store a holder of the game token; a player identification device configured to identify a player who receives payout of the game token; and a control device configured to store the player as the holder in the memory device for the game token paid out.

(A6) The management system according to (A5), further comprising an identification device configured to a betting area assigned to the player, wherein the control device determines to which player the game token is paid out by identifying to which betting area the game token to be paid out is paid out.

(A7) The management system according to (A5), wherein in case that in the betting area, the game token for which the player identified by the identification device is stored as the holder and the game token in which the player identified by the identification device is not stored as the holder are wagered, the control device stores, in the memory device, the player identified by the identified device as the holder of the game token which is paid out to the game token for which the player identified by the identification device as the holder.

(A8) The management system according to (A5), further comprising a detection device configured to detect amount of the game token paid out, wherein in case that in the betting area, the game token for which the player identified by the identification device is stored as the holder and the game token in which the player identified by the identification device is not stored as the holder are wagered, the control device stores the player identified by the identification device as the holder of the game token paid out in the betting area after detecting, by the detection device, an amount corresponding to payout to the game token for which the player identified by the identification device is not stored as the holder.

(A9) The management system according to (A5), further comprising a detection device configured to detect amount of the game token paid out, wherein in case that in the betting area, the game token for which the player identified by the identification device is stored as the holder and the game token in which the player identified by the identification device is not stored as the holder are wagered, the control device stores in the memory device the player identified by the identification device as the holder of the game token first detected by the detection device for the betting area.

(A10) The management system according to any of (A6) to (A9), wherein the betting area comprises: an area for betting the game token for which the player identified by the identification device is stored as the holder; and an area for betting the game token for which the player identified by the identification device is not stored as the holder.

(A11) The management system according to any of (A6) to (A10), further comprising an output device configured to output visual information for distinguishing the betting area in which the game token for which the player identified by the identification device is stored as the holder is bet and the betting area in which the game token for which the player identified by the identification device is not stored as the holder is bet.

(A12) A management system that manages a game token, comprising: a memory device configured to store a holder of the game token; and a player identification device configured to identify a plurality of candidate players who may receive a stack of the game tokens to be paid out; and a control device configured to store the plurality of candidate players as the holders for each of the gaming tokens constituting the stack to be paid out.

(A13) The management system according to (A12), wherein the player identification device identifies a plurality of players who receive the payouts as a result of betting on the same betting area as the plurality of candidate players.

(A14) The management system according to (A12), wherein the player identification device configured to identify a player betting the game token, the management system further comprises a holder identification device configured to identify the plurality of candidate players stored as the holder in the memory device for the bet game tokens, wherein the control device, when the betting player identified by the player identification device matches any of the plurality of the candidate players identified by the holder identification device, determine and stores it in the memory the matched candidate player as the holder.

(B1) A management system that manages chips storing identification information, which are used in games on a game table, comprising: a first identification device configured to read the identification information stored in betting chips placed in a betting area on the game table; a second identification device configured to acquire the identification information stored in the payout chips that are paid out for the betting chips; a memory device configured to store the identification information in association with the holder of the chip that stored the identification information; and a control device configured to store in the memory device the holder associated with the identification information read from the bet chip by said first identification device as the holder associated with the identification information of the payout chip acquired by the second identification device.

(B2) The management system according to (B1), wherein the second identification device is the first identification device, and acquires the identification information stored in the payout chip by reading the identification information stored in the payout chip placed in the betting area.

(B3) The management system according to (B1), wherein the second identification device is a device configured to read the identification information stored in the plurality of chips in the chip tray of the dealer, and is configured to obtain the identification information stored in the payout chips from the difference between the plurality of identification information read before the payout chips are dispensed and the plurality of identification information read after the payout chips are dispensed.

(B4) The management system according to (B1), wherein the second identification device acquires the identification information stored in the payout chip by reading the identification information stored in the payout chip placed in a payout area different from the betting area on the game table.

(B5) The management system according to (B1), wherein the first identification device periodically reads the identification information, and when the first identification device no longer reads the identification information read from the betting chip by the first identification device, the control device stores the holder associated with the identification information no longer read by the first identification device in the memory device as the holder associated with the identification information of the payout chip acquired by the second identification device.

(B6) The management system according to (B1), wherein the second identification device acquires the identification information by periodically reading the identification information stored in the payout chip, and when the second identification device no longer reads the identification information that the second identification device has read from the payout chip, the control device changes the holder associated with the identification information that the first identification device has read from the bet chip to the holder associated with the identification information that is no longer read.

(B7) A management system that manages chips that store identification information used in games at a game table, comprising: a first identification device configured to acquire the identification information stored in chips before the exchange that are placed on the game table by a player for exchange between chips; and a second identification device configured to acquire the identification information stored in the chips after the exchange that are given to the player corresponding to the chips before the exchange; a memory device configured to store the identification information in association with the holder of the chip that stored the identification information; and a control device configured to store the holder associated with the identification information of the chip before the exchange obtained by the first identification device in the memory device as the holder associated with the identification information of the chip after the exchange obtained by the second identification device.

(B8) The management system according to (B7), wherein the control device further stores the holder associated with the identification information of the chip before the exchange obtained by the second identification device in the memory device as the holder associated with the identification information of the chip after the exchange obtained by the first identification device.

(B9) The management system according to (B7), wherein the first identification device is a reader configured to read the identification information of a plurality of the chips in a chip tray of a dealer and acquire increased identification information as the identification information stored in the chips before the exchange.

(B10) The management system according to (B7), wherein the second identification device is a reader configured to read the identification information of the plurality of chips in the chip tray of the dealer and acquire decreased identification information as the identification information stored in the chips after the exchange.

(B11) A management system that manages an exchange of chips storing identification information used in a game at a game table, comprising: a reading device configured to read the identification information stored in the chips placed in a reading area on the game table for exchange; a memory device configured to store the identification information and the holder of the chip that stored the identification information in association with each other; and a control device configured to, when associated with the identification information stored on a first chip read by the reading device is different from the holder associated with the identification information stored on a second chip, which is different from the first chip, read by the reading device, store the holder associated with the identification information stored on a first chip read by the reading device as the holder associated with the identification information stored on a second chip, in the memory device.

Figure 52:
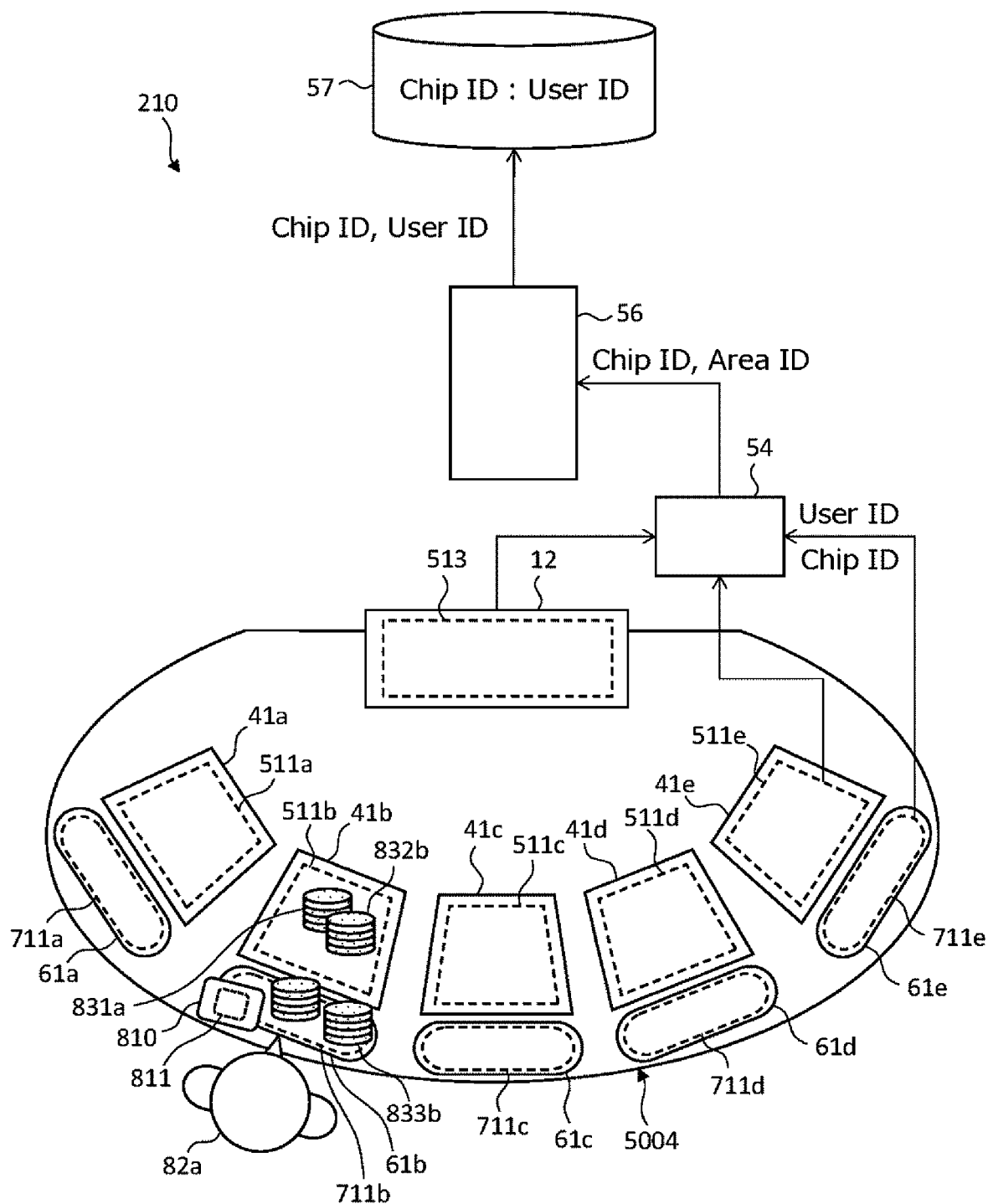
FIG. 52 shows the configuration of the management system according to a fifth embodiment.

FIG. 52 shows a structure of the management system of the fifth embodiment. The management system 210 of this embodiment can be used in addition to or in place of the system for identifying players of any of the first to fourth embodiments described above. In other words, as a player identification system, a system that identifies a player by face recognition and a system that identifies a player by scanning a member's card are explained in the above embodiments, and the player identification system in this embodiment can be used in addition to or instead of those systems.

As shown in FIG. 52, in each play position of the play table 5004 of this embodiment, card reading areas 61a to 61e (hereinafter collectively referred to as "card reading areas 61") for reading the member's card 810 are provided in front of the betting area 41.

A card RFID tag 811 is built into the member's card 810. The user ID is stored in this card RFID tag 811.

In the card reading area 61, card reading antennas 711a to 711e (hereinafter collectively referred to as "card reading antennas 711") are embedded to read the card RFID tag 811 of the member's card 810 placed therein. The card reading antennas 711 are connected to the RF control device 54, which controls the card reading antennas 711 to read information from the card RFID tag 811.

The present example eliminates the need for the casino operator, such as a dealer or pit operator, to scan the member's card and specify the play position, as in the above embodiments, in order to map a play position to the member, even when the member's card is used to identify the player. The player only needs to place his or her member's card 810 on the card reading area 61 in front of the betting area 41 of the game table 5004 to map the play position to the member.

In this embodiment, the card reading area 61 also reads the game token 83 that is in the possession of the player and that has not been bet in the betting area 41 (hereinafter also referred to as "reserve chip 833"). In this embodiment, the game token 83 has a built-in RFID tag 2 (hereinafter referred to as "chip RFID tag 2" to distinguish it from the card RFID tag 811). The chip RFID tag 2 stores information on the chip ID and/or value (amount) of the game token 83.

In the example of FIG. 52, when a player 82a wins a game and receives a payout, the payout chip 832b paid out is read in the betting area 41b. In the database 57, the holder of the payout chip 832b is updated from the dealer or casino to the player 82a. Specifically, in the database 57, the user ID associated with the chip ID of the payout chip 832b is changed from the user ID indicating the dealer or the casino, and the chip ID of the payout chip 832 is replaced by the user ID of user 82a, which is read from the member's card in the member's card reading area 61b.

Alternatively, when the payout chip 832b is read in the card read area 61b, the user ID associated with the payout chip 832b may be rewritten to the user ID read from the member's card 810 in the card read area 61b.

In addition, in case that the user ID and the value of the game token 83 possessed by the member of the user ID are associated and stored in the database 57, when the payout chip 832b is read in the betting area 41b or the card reading area 61b, the database 57 may be updated to associate the value of the payout chip 83b with the user ID read at the card reading area 61b.

The user ID may be associated with the chip ID and/or value of the game token 83 possessed by the member of the user ID, and stored in the card RFID tag 811 of the member's card 810 possessed by the member, instead of the database 57. In this case, in the card reading area 61, writing can be performed on the member's card 810 in addition to reading.

When the payout chip 832b is read in the betting area 41b or the card reading area 61b, the user ID stored in the member's card 810 is associated with the chip ID and/or value of the game token 83 possessed by the member of the user ID, by storing the chip ID and/or value of the payout chip 832b in the member's card 810.

The user ID and the chip ID and/or value of the game token 83 possessed by the member of the user ID may be associated and stored in the chip RFID tag 2 instead of the database 57. In this case, in the betting area 41 or card reading area 61, writing can be performed on the chip RFID tag 2 in addition to reading.

When the chip ID and or value of the payout chip 832b are read in the betting area 41b or the card reading area 61b, the chip RFID tag 2 of the payout chip 832b stores the user ID of the member's card 810 read in the card reading area 61b, thereby the user ID stored in the member's card 810 is associated with the chip ID and/or value of the game token 83 possessed by the member of the user ID.

In addition, it may be stored that the game token 83 having the chip ID that is no longer read by neither the card reading antenna 711 nor the antenna 511 of the betting area 41 (hereinafter referred to as the "chip reading antenna 511" to distinguish it from the card reading antenna 711) has been collected and is now in the possession of the dealer or casino. Alternatively, it may be stored that the value of the game token 83 that is no longer read by neither the card reading antenna 711 nor the antenna 511 of the betting area 41 has been transferred to the dealer or casino.

In addition, the database 57 may record not only information on the members and the game token held by the members, but also the betting performance of each member. In this case, when the game token 83 is bet in the betting area 41, the chip ID of the betting chip 831 is read in the betting area 41, and the value, that is, the bet amount, is determined by referring to the database 57. If the value is stored in the chip RFID tag 2, the bet amount can be determined by reading the value in the betting area 41. The amount of the bet is associated with the user ID of the member's card 810 that was read in the card reading area 61 of the play position, and is recorded in the database 57 as the betting results of the member.

In the above embodiment, in each play position, a card reading area 61 is provided separately from the betting area 41, and a chip reading antenna 511 is provided in the betting area 41 and a card reading antenna 711 is provided in the card reading area 61, respectively, but the card reading area 61 and the card reading antenna 711 may be omitted, and the chip reading antenna 511 in the betting area 41 may be used to read and write to the card RFID tag 811 of the member's card 810.

That is, in the above embodiment, the antenna for reading the chip RFID tag 2 of the game token 83 such as the payout chip 832 at each play position and the antenna for reading the member's card 810 may be the same antenna.

In the above embodiment, a back-bet player's card reading area 61 may be provided between each play position. As described above, since the back betting player shares the same betting area 41 as the sitting player, it is necessary to determine whether the payout chips 832 have been paid out to the sitting player or to the back betting player. This requirement can be fulfilled by using the above solution (e.g., associating both the sitting player's user ID and the back betting player's user ID with the chip ID of the payout chip 832).

Furthermore, in the above embodiment, even when a plurality of members' cards 810 are simultaneously read in one card reading area 61 and a plurality of stacks of betting chips 831 are bet in one corresponding betting area 41, the user ID and chip ID can be associated with the user ID.

In this embodiment, a member's card for non-members may be provided by the dealer at the game table 5004 to a player who has not registered as a member. Hereinafter, the member's card provided to a registered member is specifically referred to as the "regular member's card," and the member's card provided to an unregistered player is specifically referred to as the "non-regular member's card."

A temporary user ID indicating that the player is an unregistered player may be stored in the non-regular member's card as a user ID. In this case, the temporary user ID may be different from each other in the plurality of non-regular members' cards. This makes it possible to manage unregistered players by distinguishing them from each other, although it is not possible to identify individual players. In addition, when an unregistered player registers as a member, the information recorded on his or her non-regular member's card can be transferred to the regular member's card.

In this embodiment, the member's card 810 may be always placed in the card reading area 61 so that it is always read and written in the card reading area 61. Alternatively, in case that the association between the user ID of the player 82 and the chip ID or value of the game token 83 owned by the player 82 is stored in the database 57 or chip RFID tag 2, the database 57 and the chip RFID tag 2 can be updated under the assumption that the player 82 of the member's card 810 is playing, in the period from reading the member's card 810 at the card reading area 61 for the first time to reading another member's card 810, or until it is canceled by the dealer.

When a player arrives at the play position and places the member's card 810 and the game token 83 (reserve chip 833) that he/she possesses on the card reading area 61, the RF control device 54 uses the card reading antenna 711 to read the card RFID tag 811 of the member's card 810 and the chip RFID tag 833 of the reserve chip 833. On the other hand, the database 57 stores, for each member, the user ID and the game token 83 possessed by the member in association with each other.

The management control device 56 determines whether or not the combination of the user ID stored in the card RFID tag 811 and the chip ID stored in the chip RFID tag 2, read by the RF control device 54, is stored in the database 57. If the combination of the user ID and chip ID read by the RF control device 54 is not stored in the database 57, the management control device 56 outputs an alert.

The following techniques are disclosed by the fifth embodiment described above.

(C1) A management system of one embodiment is a management system 210 in a facility providing a game using a game table 5004 having a play position, and comprising: a member's card 810 having a card RFID tag 811 storing member information (user ID) built in; and a card RFID reader (card reading antenna 711 and RF control device 54) that is provided at the play position of the game table 5004, and configured to read member information (user ID) from the card RFID tag 811.

(C2) The management system 210 of (C1) above further may comprise: a chip determination device (chip reading antenna 511 and RF control device 54) configured to determine chip identification information (chip ID) of a payout chip (payout chip 832) to be paid out to a play position, and a chip reader (chip reading antenna 511 and RF control device 54) that reads member information (user ID) and member information (user ID); a storage medium (the database 57, chip RFID tag 2, or card RFID tag 811) configured to store member information (user ID) in association with the chip identification information (chip ID) of the chip (the game token 83) owned by the member corresponding to the member information (user ID); and a management control device 56 configured to store the member information (user ID) read at the play position with the chip identification information (chip ID) of the payout chip 832 determined at the play position in association with each other in the storage medium (the database 57, chip RFID tag 2, or card RFID tag 811).

(C3) The management system 210 of (C1) above may further comprise: a chip determination device configured to determine the value (amount) of the payout chip (payout chip 832) to be paid out to the play position (the chip reading antenna 711, an image recognition system to recognize the amount, or the management control device 56 which determines the value based on the bet contents and the game outcome); a storage medium (the database 57, the chip RFID tag 2, or the card RFID tag 811) that stores member information (user ID) and the value (amount) of the chip (the game token) owned by the member corresponding to the member information (user ID) in association with each other; and the management control device 56 configured to store the member information (the user ID) read at the play position and the value (amount) of the payout chip (the payout chip 832) determined in the play position in association with each other in the storage medium (the database 57, the chip RFID tag 2, or the card RFID tag 811).

(C4) The management system 210 of (C1) above may further comprise: a storage medium (database 57, chip RFID tag 2, or card RFID tag 811) configured to store the member information (user ID) and the bet amount corresponding to the member information (user ID) in association with each other; a chip determination device (the chip reading antenna 511 and RF control device 54) configured to determine chip identification information (chip ID) of the bet chip 831 bet at the play position; the database 57 configured to store corresponding relationship between the chip identification information (chip ID) and value (amount) of the bet chip 831; and a management control device 56 configured to determine value (amount) corresponding to the chip information (chip ID) determined in the play position by referring to the database 57 and update the bet amount associated with the member information (user ID) stored in the storage medium (the database 57, the chip RFID tag 2, or the card RFID tag 811) for the member information (user ID) read at the play position based on the value (amount).

(C5) The management system 210 of (C1) above may further comprise: a storage medium (the database 57, the chip RFID tag 2, or the card RFID tag 811) configured to store member information (user ID) associated with the bet amount corresponding to the member information (user ID); a chip determination device (the chip reading antenna 511 and database 57, chip reading antenna 511, or an image recognition system that determines the value of chips) configured to determine the value (amount) of bet chips 831 bet in the play position; and the management control device 56 configured to update the bet amount associated with the member information (user ID) stored in the storage medium (the database 57, the chip RFID tag 2, or the card RFID tag 811) for the member information (user ID) read at the play position based on the value (amount) of the bet chip 831 determined at the play position.

(C6) The management system of (C1) above may further comprise: a chip determination device (the card reading antenna 711 and RF control device 54) configured to determine chip identification information (chip ID) of the reserve chip 833 that is not bet at the play position; a storage medium (the database 57, the chip RFID tag 2, or the card RFID tag 811) configured to store the member information (user ID) and the chip identification information (chip ID) of the chip (game token 83) owned by the member corresponding to the member information (user ID) in association with each other; and the management control device 56 configured to store the member information (user ID) read at the play position and the chip identification information (chip ID) of the reserve chip 833 determined at the play position in association with each other in the storage medium (the database 57, the chip RFID tag 2, or the card RFID tag 811).

(C7) The management system of (C1) above may further comprises: a chip determination device (card reading antenna 711 and RF control device 54, or image recognition system that determines the value of reserve chips 833) configured to determine the value (amount) of reserve chips 833 that is not bet in the play position; a storage medium (the database 57, the chip RFID tag 2, or the card RFID tag 811) configured to store the member information (user ID) and the value (amount) of the chip (the game token 83) owned by the member corresponding to the member information (user ID) in association with each other; and the management control device 56 configured to store the member information (user ID) read at the play position and the value (amount) of the reserve chip 833 determined at the play position in association with each other in the storage medium (the database 57, the chip RFID tag 2, or the card RFID tag 811).

(C8) In the management system 210 of any of (C2), (C4), and (C6) above, the chip identification information (chip ID) of the chip (the game token 83) may be stored in the chip RFID tag 2 built into the chip (the game token 83), the chip determination device (the chip reading antenna 511 and the RF control device 54) and the card RFID reader (the card reading antenna 711 and the RF control device 54) may be the same device, and the device may be configured to read the chip RFID tag 2 and the card RFID tag 811.

(C9) In the management system 210 of (C3), (C5), or (C6) above, the value (amount) of the chip (the game token 83) may be stored in the chip RFID tag 2 built into the chip (the game token 83), the chip determination device (the chip reading antenna 511 and the RF control device 54) and the card RFID reader (the card reading antenna 711 and the RF control device 54) may be the same device, and the device may be configured to read the chip RFID tag 2 and the card RFID tag 811.

(C10) In the management system 210 of (C2) above, the management control device 56 may be configured to, when one card RFID reader (the card reading antenna 711 and the RF control device 54) reads a plurality of member information (user ID) from a plurality of members' cards 810 at the same time, store the plurality of member information (user ID) read and the chip identification information (chip ID) in association with each other in the storage medium (the database 57, the chip RFID tag 2, or the card RFID tag 811).

(C11) In the management system 210 of (C2) to (C7) above, the storage medium may be provided in the chip (the game token 83).

(C12) In the management system 210 of (C2) to (C7) above, the storage medium may be provided in the member's card 810.

In the management system 210 of (C2) to (C7) above, the storage medium may be provided in the database 57.

(C14) The management system 210 of (C1) above may further comprise in the play position: a card RFID reader (card reading antenna 711) for a sitting player; and a card RFID reader (card reading antenna) for a back betting player.

(C15) In the management system 210 of (C1) above, the member's card 810 may include: a regular member's card in which member information unique to the registered member is stored in the card RFID tag 811; and a non-regular member's card in which temporary member information is stored in the card RFID tag 811.

(C16) In the management system 210 of (C15) above, a plurality of the non-regular members' cards may have different temporary member information stored in the card RFID tag 811.

(C17) In the management system 210 of (C1) above, the game table 5004 may have a plurality of the play positions, and a card RFID reader (the card reading antenna 711 and the RF control device 54) may be provided at each of the plurality of play positions.

In some of the above embodiments, a database that stores information on the game token was used to manage game token. This embodiment describes an example of the use of a database that is constructed and updated as described above. The database in this embodiment may be updated by any of the methods described in the above embodiments, or by methods other than those described in the above embodiments.

Figure 53:
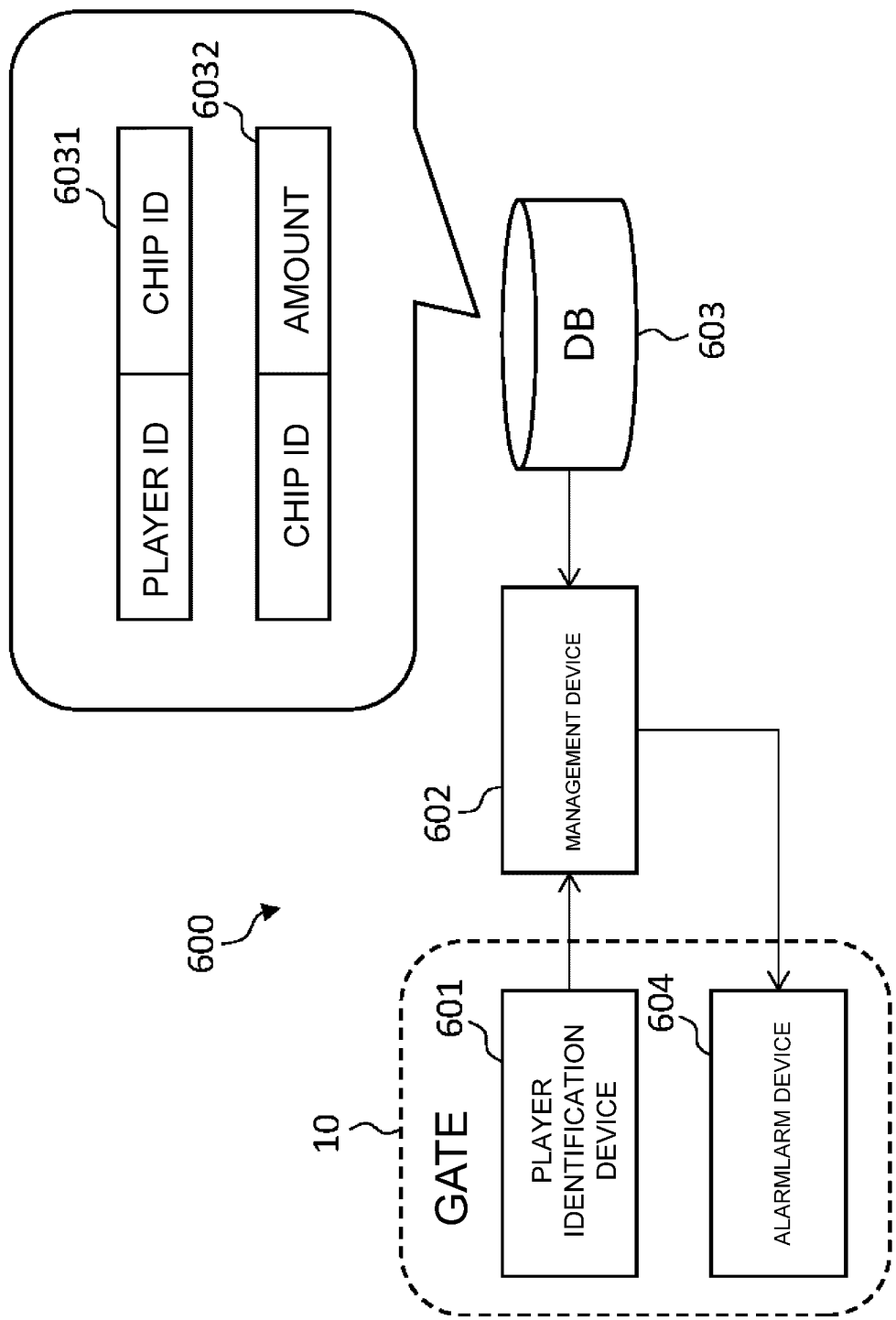
FIG. 53 shows the configuration of the management system according to a sixth embodiment.

FIG. 53 is a block diagram showing an example of a sixth embodiment of a management system for game token. This management system 600 for game token is a system for determining an abnormality in holder information by referring to a database in which holder information is stored. As shown in FIG. 53, the management system 600 for the game token comprises a database 603 that stores the holder information of the game token, a management device 602 that determines whether or not there is an abnormality in the holder information by referring to the database 603, a player identification device 601 that is installed at a predetermined location in the casino facility to identify the player and thus identify that the player is at the predetermined location, and an alarm device 604 that is installed to output an alarm when an abnormality is detected by the management device 602.

Specifically, the management system 600 determines an abnormality in the combination of the location of the player and the holder information. That is, the management system 602 determines whether there is an abnormality in the combination of the predetermined location where the player identified by the player identification device 601 is located and the holder information stored in the database 603.

In this embodiment, when it is restricted (including prohibited) to take the game token 1 out of or into the casino facility, the management system 600 determines whether the player is following the carry-out rule/carry-in rule at the gate, and determines a situation in which the player attempts to violate the restriction as abnormal. For this purpose, the player identification device 601 and the alarm device 604 are installed at the gate 10 of the casino facility. In other words, the player identification device identifies the player at the gate, and the alarm device outputs an alarm at the gate in a manner that is recognizable to the casino staff or the player.

The player identification device 601 identifies players entering and exiting the casino facility through the gate 10. The player identification device 601 identifies players by biometric authentication technology such as face recognition or ID cards such as casino member's cards or individual number cards.

The database 603 includes a table 6031 that stores information (chip ID) identifying the game token 1 in association with information (holder information: player ID) identifying the player holding the game token 1, and a table 6032 that stores information (chip ID) identifying the game token 1 in association with value information. By referring to these tables 6031 and 6032, it is possible to know which player has how much game token 1. When a player plays a game using the game token 1 at a casino facility, the amount of the game token 1 possessed by the player increases or decreases, and the table 6031 will be updated accordingly. In addition, instead of using two tables, table 6031, which stores the association between the chip ID and the player ID, and table 6032, which stores the association between the chip ID and the amount of money information, a single table that stores the association between the chip ID, the player ID, and the value information may be used.

The management device 602 determines whether or not there is an abnormality in accordance with the carry-out rule/carry-in rule for the game token 1 in a casino facility. In this embodiment, it is prohibited to take the game token 1 out of the casino facility and to bring the game token 1 into the casino facility. Therefore, the management device 602 determines that there is an abnormality when the player identified as being at the gate 10 is stored in the database 603 as the holder of the game token 1.

Specifically, for a player who passes through (enters or exits) the gate 10, the gate management device 602 refers to the database 603 using the player ID of the player identified by the player identification device 601 to determine whether or not the player is in possession of the game token 1. If the player identified by the player identification device 601 is in possession of the game token 1, the gate management device 602 outputs an alarm signal to the alarm device 604.

The alarm device 604 is provided at the gate 10 to receive the alarm signal and output an alert such as a buzzer sound. The alarm device 604 may be a device that transmits the alarm signal to a security room remote from the gate 10, or it may be a device that records this alarm signal so that it can be verified later.

According to the management system 600 of the above example, when the taking of the game token 1 out of the casino facility is prohibited, by identifying a player who is leaving the casino facility at the gate 10, it is possible to check whether or not the player has the game token 1 by referring to the database 603. It is possible to detect if a player is attempting to take the game token 1 out of the casino facility in violation of the rules. For this detection, the change of the holder of the game token 1 is recorded in the database 603 (trace) in the casino facility, and the database 603 is referred to at the gate 10 to check whether the player is in possession of the game token 1. It is not necessary to inspect the belongings of a player who is about to leave the casino facility to find the game token 1, and the player's exit can be facilitated.

Also, according to the management system 600 of the above example, when it is prohibited to bring the game token 1 into a casino facility, by identifying a player who intends to enter the casino facility at the gate 10, it is possible to check whether the player possesses the game token 1 by referring to the database 603. This makes it possible to detect whether the player is attempting to bring the game token 1 into the casino facility in violation of the rules. In addition, for the purpose of this detection, changes in the holder of the game token 1 are recorded (traced) in the database 603 in the casino facility, and the gates 10 checks whether the player is in possession of the game token 1 by referring to the database 603. This means that it is not necessary to inspect the belongings of a player who is about to enter a casino facility to find the game token 1, and the player's entry can be facilitated.

The management system 600 of the present embodiment can also be applied when the rules of a casino facility allow the taking out and/or carrying in of the game token 1 below a predetermined limit. In this case, the management device 602 refers to the database 603 to identify the total amount of the game token 1 associated with the player who is about to pass through (exit and/or enter) the gate 10, and determines an abnormality according to the identified amount. Specifically, the control device 602 determines that the amount is normal when the identified amount is less than or equal to the limit specified by the rules, and determines that the amount is abnormal when the identified amount exceeds the limit specified by the rules. If the amount is determined to be abnormal, the management device 602 outputs an alarm signal.

The management system 600 can also be applied to the case where the rules of the casino facility require a declaration at the gate 10 when the game token 1 is taken out and/or carried in. In this case, a chip reader (not shown) reads the chip ID from the game token 1 pertaining to the declaration of taking out or carrying in. The management device 602 refers to the database 603 to determine whether the combination of the chip ID read from the game token 1 pertaining to the declaration and the player identified by the player identification device 601 is stored in the database 603, i.e., whether the amount of the game token 1 pertaining to the declaration based on the reading by the chip reader and the player identified by the player identification device 601 are stored in the database 603. If the match is successful, the management device 602 determines that the match is normal, and if the match fails, it determines that the match is abnormal.

At this time, the chip reader may read the chip ID of the game token 1 pertaining to the declaration, and the management device 602 compares the read chip ID with the chip ID of the game token 1 stored in the database 603 as being possessed by the player identified by the player identification device 601. In other words, the management device 602 may compare the chip ID of the player identified by the player identification device 601 with the chip ID of the game token 1 stored in the database 603 as being possessed by the player identified by the player identification device 601, and determine that the chip ID is normal when they match, and determine that the chip ID is abnormal when there is a game token 1 that does not match. In other words, the management device 602 may determine an abnormality by comparing the declared amount of the game token with the amount the game token stored in the database 603.

By using such a management system 600, when a limit on the amount of game token 1 to be taken out of the casino facility and/or a limit on the amount to be taken into the casino facility is set, such a limit on the amount to be taken out and/or a limit on the amount to be taken into the casino facility can be achieved reliably.

In the above, an example in which the management system 600 manages game token 1 at the gate 10 is described. However, the management system 600 can identify a player at any other location where the player can be identified and check the database 603 to determine whether the player at the location has the game token 1 that the player should have, or whether the player at the location has the game token 1 that the player should not have, and output an alarm as necessary.

For example, in the management system 600, the player identification device 601 and the alarm device 604 may be installed in a cage for exchanging the game token 1 for cash (purchasing the game token 1 and exchanging the game token 1 for cash). In this case, the database 603 may be checked to detect abnormalities in the holder information of a player who intends to purchase the game token 1 or exchange the game token 1 for cash. For example, in case that the history of the holder is stored in the database 603 as the holder information as in the above embodiment, the management device 602 may detect an abnormality if the history of the holder is incorrect (e.g., if the holder is changed from the possession of one player to the possession of another player without passing through the possession of a dealer or a casino facility).

In addition, the management device 602 may, for example, determine that when the holder of the game token 1 has not been changed from a predetermined player for a certain period of time (e.g., 24 hours or more) and is still held by the same player, it means that the player has been in the casino facility for a certain period of time or more (e.g., 24 hours or more). In such a case, an alarm signal may be output for the player in question. For this purpose, when the holder of the game token 1 is changed, the database 603 shall be updated with the holder and the time of the change shall be recorded.

Further, the management device 602 may, for example, determine that there is an abnormality when the number of game tokens 1 possessed by the same player exceeds a predetermined threshold by referring to the database 603. That is, the management device 602 may determine that there is an abnormality when the number of the game tokens 1 possessed by a player exceeds a predetermined number (e.g., 10,000 chips) that is set as a number that the player is able to carry around in the casino facility.

REFERENCE SIGNS LIST

1, Game token
2, RFID tag
3, Fixed information
4, Variable information
5, Block chain information
6, Factory
7, Backyard
8, Warehouse
9, Cage
10, Gate
11, Betting area
12, Chip tray
13, Reader
14, Writer
15, Management controller
16, RFID antenna
17, Database
21, Data non-rewritable area
22, Data rewritable area
41, Betting area
42, Pay area
44, Player area
45, Tie area
46, Banker area
53, Card reader
54, RE control device
55, Image recognition device
56, Management control device
57, Database
61, Card reading area
81, Member's card
82, Player
83, Game token
110-210, Management system
220, Location information
221, Date/time information
222, Place/event information
223, Owner information
511-513, Antenna
711, Card reading antennas
810, Member's card
811, Card RFID tag
831, Bet Chip
832, Payout chip
833, Reserve chip
1001, Game token
1002, Chip reader
1003, Controller
1004, Game table
1009, Chip tray
1025, Chip placement area
1026, Payment area
2002, Camera
2003, Card distributor
2004, Game table
2005, Dealer
2006, Guest (game participant/player)
2007, Chair
2008, Betting area
2009, Chip
2010, Area
2010P, Player area
2010B, Banker area
2011, Game recorder
2012, Image analyzer
2013, Result display lamp
2014, Controller
5004, Game table

The invention claimed is:

1. A management system for game token, the management system comprising:
    a database configured to store holder information of the game token;
    a management device configured to determine whether or not there is an abnormality in the holder information by referring to the database; and a player identification device installed at a predetermined location of a casino facility, and configured to identify a player, and wherein the management device is configured to determine whether or not there is an abnormality in the combination of the predetermined location where the player is located as identified by the player identification device and the holder information stored in the database.

2. The management system according to claim 1, wherein:
the player identification device is installed at a gate of the casino facility and is configured to identify the player as being at the gate as the location, and
the management device is configured to determine whether or not there is the abnormality in accordance with a rule for taking out and/or a rule for carrying in the game token in the casino facility.

3. The management system according to claim 2, wherein the management device is configured to determine that there is an abnormality when the player identified as being at the gate is stored in the database as the holder of the game token.

4. The management system according to claim 3, wherein the management device is configured to determine whether the amount of the game token having been taken out of the gate by the player matches the amount of the game token that the player is bringing in from the gate.

5. The management system as described in claim 2, wherein:
the database is further configured to store information on amount of the game token, and
the management device is configured to refer to the database to identify the amount of the game token possessed by the player identified by the player identification device and determine the abnormality according to the identified amount.

6. The management system according to claim 5, wherein the management device is configured to compare the amount of the game token declared by the player identified by the player identification device with the amount identified by referring to the database and determine the abnormality based on the result of the comparison.

7. The management system according to claim 5, further comprising:
a player identification device installed at a predetermined location in a casino facility, and configured to identify a player who receives the game token by purchase, payout, or exchange, and
wherein the database is configured to store information of the player identified by the player identification device as the holder information of the game token.

8. The management system according to claim 2, wherein the management device is configured to record in the database that the game token is taken out of the casino facility and determine whether the game token brought into the casino facility is recorded in the database as a game token taken out.

9. The management system according to claim 2, wherein the management device is configured to determine whether the player identified by the player identification device as a player who brings the game token from the gate to the casino facility matches the holder information of the game token stored in the database.

10. The management system according to claim 1, wherein:
the game token includes readable identification information,
the database is configured to store the holder information of the game token and the identification information in association with each other, and
the management system further comprises:
a player identification device configured to identify a player; and
a reading device configured to read the identification information of the game token possessed by the player identified by the player identification device, and
wherein the management device is configured to determine that there is an abnormality when the player identified by the player identification device and the identification information read by the reading device are not associated in the database.

11. The management system according to claim 1, wherein:
the database is configured to store, as information on the holder, possession time information indicating a time at which the holder acquired the game token or the time at which the holder is in possession of the game token, and
the management device is configured to determine whether or not there is an abnormality in the possession time information.

12. The management system according to claim 11, wherein the management device is configured to determine that there is an abnormality when a consecutive possession time of the same holder obtained by the possession time information exceeds a predetermined threshold.

13. The management system according to claim 1, wherein:
the database is configured to store a history of the holder as the information of the holder, and
the management device is configured to determine an abnormality of the history of the holder.

14. The management system according to claim 1, wherein the management device is configured to determine that there is an abnormality when a number of game tokens possessed by the same holder exceeds a predetermined threshold.

15. The management system according to claim 1, wherein a memory device is configured to store information of one or more game tokens used in the casino facility; and the management device is configured to:
store game token taken out information of at least one game token taken out of the casino facility in the memory device, and
detect unauthorized entry by determining whether or not a first game token brought into the casino facility is stored in the memory device as a game token brought out.

* * * * *